US008254391B2

(12) United States Patent
Singh et al.

(10) Patent No.: US 8,254,391 B2
(45) Date of Patent: Aug. 28, 2012

(54) METHOD AND SYSTEM FOR PERFORMING BLOCKING OF MESSAGES ON ERRORS IN MESSAGE STREAM

(75) Inventors: Atul Singh, Gorakhpur (IN); Maneesh Joshi, Palo Alto, CA (US); Ashwin Patel, Sunnyvale, CA (US); Rakesh Saha, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 167 days.

(21) Appl. No.: 12/418,583

(22) Filed: Apr. 4, 2009

(65) Prior Publication Data

US 2010/0254259 A1 Oct. 7, 2010

(51) Int. Cl.
*H04L 12/28* (2006.01)

(52) U.S. Cl. ...................................... 370/394
(58) Field of Classification Search .................. 370/394, 370/229, 230, 235, 390, 238, 241, 351, 392, 370/389, 242, 252
See application file for complete search history.

(56) References Cited

U.S. PATENT DOCUMENTS

| 5,761,659 | A | 6/1998 | Bertoni |
| 5,892,954 | A | 4/1999 | Tomas et al. |
| 6,594,774 | B1 | 7/2003 | Chapman et al. |
| 6,691,194 | B1 | 2/2004 | Ofer |
| 6,744,765 | B1 | 6/2004 | Dearth et al. |
| 6,775,305 | B1 | 8/2004 | Delvaux |
| 6,832,261 | B1 | 12/2004 | Westbrook |
| 7,454,696 | B2 * | 11/2008 | Kuznetsov et al. ........... 715/239 |
| 7,554,920 | B2 | 6/2009 | Alam et al. |
| 7,633,944 | B1 | 12/2009 | Chang et al. |
| 7,715,314 | B2 | 5/2010 | Igarashi et al. |
| 7,814,218 | B1 | 10/2010 | Knee et al. |
| 2002/0165929 | A1 | 11/2002 | McLaughlin et al. |
| 2003/0069902 | A1 | 4/2003 | Narang et al. |
| 2003/0126514 | A1 | 7/2003 | Alam et al. |
| 2004/0028049 | A1 | 2/2004 | Wan |
| 2004/0076178 | A1 | 4/2004 | Botton |
| 2004/0186891 | A1 | 9/2004 | Panec et al. |
| 2004/0193993 | A1 * | 9/2004 | Roy et al. ........... 714/746 |
| 2004/0230652 | A1 | 11/2004 | Estrada et al. |
| 2005/0050109 | A1 | 3/2005 | Klein |
| 2005/0149526 | A1 | 7/2005 | Wiser |
| 2005/0182856 | A1 | 8/2005 | McKnett |
| 2005/0209804 | A1 | 9/2005 | Basso et al. |
| 2005/0216669 | A1 * | 9/2005 | Zhu et al. ........... 711/118 |
| 2005/0273516 | A1 | 12/2005 | Patrick et al. |
| 2005/0273772 | A1 | 12/2005 | Matsakis et al. |
| 2006/0020911 | A1 | 1/2006 | Lyons |
| 2006/0106941 | A1 | 5/2006 | Singhal et al. |
| 2006/0274727 | A1 * | 12/2006 | Musayev et al. ........... 370/352 |

(Continued)

OTHER PUBLICATIONS

Non-Final Office Action dated Jan. 3, 2011 for U.S. Appl. No. 12/418,580.

(Continued)

*Primary Examiner* — Kwang B Yao
*Assistant Examiner* — Anh Ngoc Nguyen
(74) *Attorney, Agent, or Firm* — Vista IP Law Group, LLP

(57) ABSTRACT

Described is an improved method, system, and computer program product for implementing an improved resequencer, along with related mechanisms and processes. An improved error handling method and system for messages is also described.

24 Claims, 49 Drawing Sheets

100

U.S. PATENT DOCUMENTS

| | | |
|---|---|---|
| 2006/0282739 A1 | 12/2006 | Meyer et al. |
| 2007/0039049 A1 | 2/2007 | Kupferman et al. |
| 2007/0168301 A1 | 7/2007 | Eisner et al. |
| 2007/0177579 A1* | 8/2007 | Diethorn et al. ............. 370/352 |
| 2007/0192402 A1 | 8/2007 | Dean, Jr. |
| 2007/0214381 A1 | 9/2007 | Goyal et al. |
| 2007/0239881 A1* | 10/2007 | Schneider et al. ............ 709/231 |
| 2007/0266170 A1* | 11/2007 | Mockett ........................ 709/231 |
| 2007/0266386 A1 | 11/2007 | Kishan |
| 2008/0243579 A1 | 10/2008 | Dan |
| 2008/0243847 A1 | 10/2008 | Rasmussen |
| 2008/0263549 A1 | 10/2008 | Walker |
| 2009/0117925 A1 | 5/2009 | De Bonis et al. |
| 2009/0193286 A1 | 7/2009 | Brooks |
| 2009/0320030 A1 | 12/2009 | Ogasawara |
| 2010/0030911 A1 | 2/2010 | Fairbairn |
| 2010/0046519 A1 | 2/2010 | Dan et al. |
| 2010/0161573 A1 | 6/2010 | Chan et al. |
| 2010/0211682 A1 | 8/2010 | Capomassi et al. |
| 2010/0218033 A1 | 8/2010 | Safari et al. |

OTHER PUBLICATIONS

Non-Final Office Action dated Dec. 17, 2010 for U.S. Appl. No. 12/418,582.
Non-Final Office Action dated Nov. 24, 2010 for U.S. Appl. No. 12/418,585.
Non-Final Office Action dated Mar. 30, 2011 for U.S. Appl. No. 12/418,588.
Final Office Action dated Apr. 28, 2011 for U.S. Appl. No. 12/418,580.
Final Office Action dated May 6, 2011 for U.S. Appl. No. 12/418,585.
Final Office Action dated Nov. 9, 2011 for U.S. Appl. No. 12/418,588.
Advisory Action dated Jun. 30, 2011 for U.S. Appl. No. 12/418,580.
Final Office Action dated Jun. 9, 2011 for U.S. Appl. No. 12/418,582.
Final Office Action dated Nov. 25, 2011 for U.S. Appl. No. 12/418,580.
Non-Final Office Action dated Feb. 1, 2012 for U.S. Appl. No. 12/418,585.
Non-Final Office Action dated Mar. 7, 2012 for U.S. Appl. No. 12/418,588.
Final Office Action dated May 9, 2012 for U.S. Appl. No. 12/418,585.

* cited by examiner

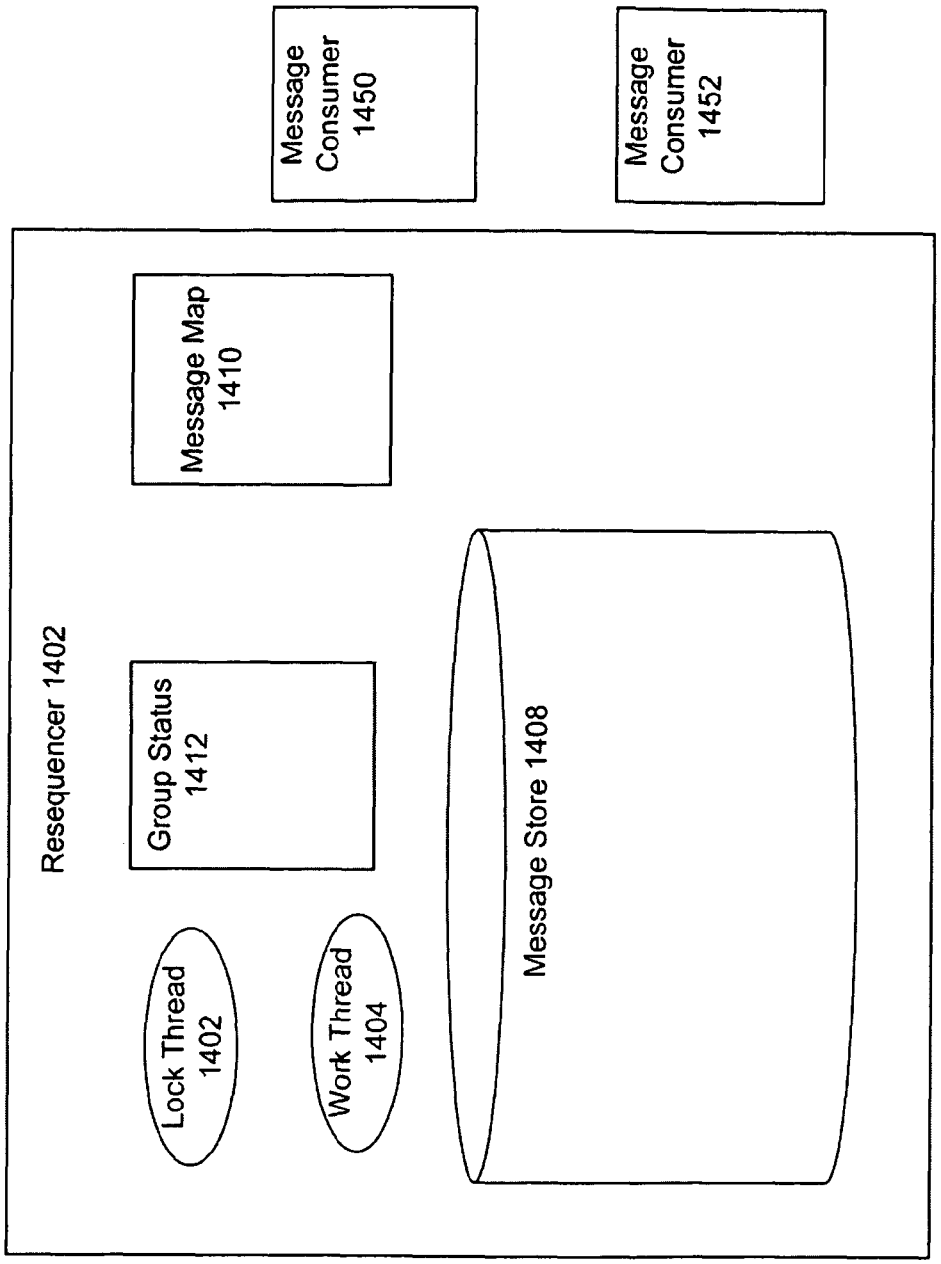
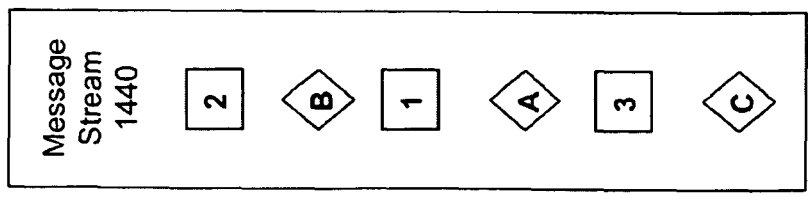
Figure 19B

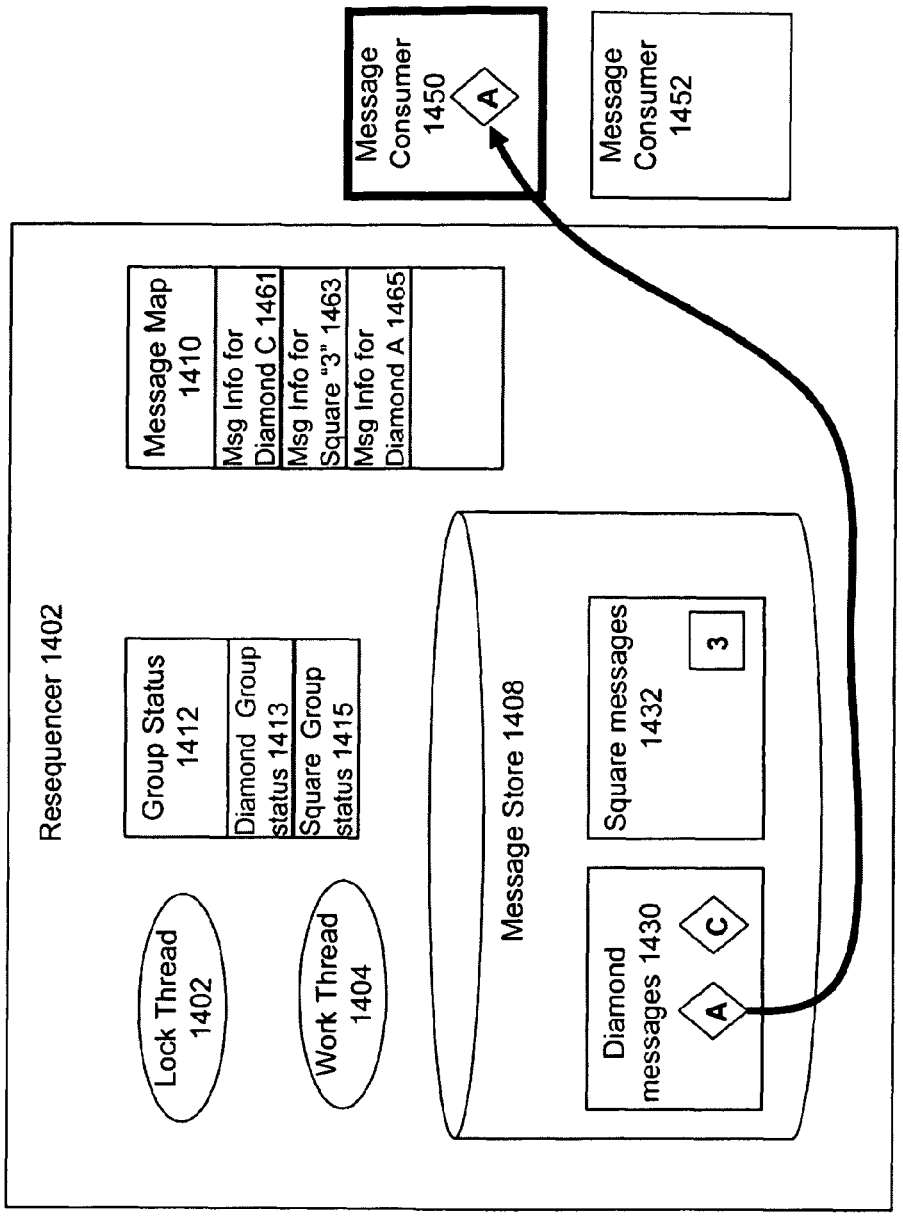
Figure 19I
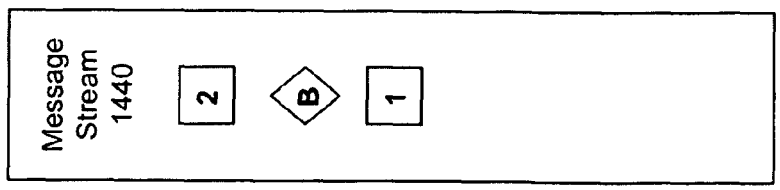

METHOD AND SYSTEM FOR PERFORMING BLOCKING OF MESSAGES ON ERRORS IN MESSAGE STREAM

CROSS-REFERENCE TO RELATED APPLICATIONS

The present application is related to (i) co-pending application Ser. No. 12/418,580, entitled "METHOD AND SYSTEM FOR APPLYING EXPRESSIONS ON MESSAGE PAYLOADS FOR A RESEQUENCER", (ii) application Ser. No. 12/418,582, entitled "METHOD AND SYSTEM FOR IMPLEMENTING SEQUENCE START AND INCREMENT VALUES FOR A RESEQUENCER", (iii) application Ser. No. 12/418,585, entitled "METHOD AND SYSTEM FOR IMPLEMENTING A BEST EFFORTS RESEQUENCER", and (iv) application Ser. No. 12/418,588, entitled "METHOD AND SYSTEM FOR IMPLEMENTING HIGH-PERFORMANCE AND FAULT-TOLERANT LOCKING MECHANISM", all filed on even date herewith, which are all hereby incorporated by reference in their entirety.

BACKGROUND AND SUMMARY

The invention is directed to an approach for implementing an improved resequencer, along with related mechanisms and processes. Also disclosed is an improved approach for preventing concurrent access and processing of data by multiple threads, e.g., as may be implemented by a resequencer. An improved error handling method and system for messages is also described.

Almost all types of computing systems use and implement the concept of messages. A message contains information which is sent from a source location or entity to a receiver location or entity. "Message passing" refers to a type of communications used by computing systems to send and exchange messages from sources to destinations.

When messages are sent from a source to a destination, it is possible that the messages may be delivered out of order. This may occur for many different reasons. For example, consider a set of messages to be delivered across the internet. Dynamic routing is often used to select the particular routes and intermediate nodes through which the messages are delivered from the source to the destination. Because of the dynamic nature of the routing, it is quite possible, and even likely, that the different messages within the set of messages are routed through different pathways, which cause the messages to be delivered at different times. As such, an earlier message in a set sequence may be delivered later in time than a later message within the sequence of messages. Multi-threaded processing may also correspond to messages in a stochastic order that are delivered or received.

If the messages are required to be delivered in a correct sequence to a downstream consumer, the easiest solution would be to make sure that they never get out of order in the first place. In effect, the message delivery patterns or the message paths are selected by the message originator or sender to guarantee that the messages will always be delivered in the correct order.

However, there are many circumstances in which it is not possible to provide this guarantee of ordering for the messages at delivery. For example, a developer of a downstream component may be just a consumer of messages created by upstream components controlled by other parties, and therefore may not be able to affect or have a choice of how the upstream components implement controls for the order of messages. Thus, the need to implement a component that will reorder messages may arise. In the database application space, this is particularly a problem where application semantics require the messages to be delivered in a particular order.

An example scenario in which there may be a need to reorder messages is in the implementation of an Oracle Enterprise Service Bus (ESB) architecture. The enterprise service bus is a relatively recent development in the computing industry, in which the ESB provides a message-based infrastructure for routing and passing messages between applications. The ESB can be used in conjunction with service-oriented architectures (SOA), which are architectures that define applications which provide functionality based upon re-usable services or applications. The SOA therefore allows very complex business functions to be performed based upon the interaction and interplay between multiple applications. The ESB supports SOA by including sufficient messaging and interconnectivity functionality to allow resources and applications to work together across wide networks.

The ESB architecture creates a situation in which there may exist multiple senders and multiple consumers of messages. Particularly relevant for the present application is the fact that the ESB architecture creates a situation in which the message consumer may not have control over the order in which the messages are sent from the message sender to the message consumer. This situation may exist with other types of middleware architectures as well.

Embodiments of the present invention provide an improved approach for implementing and configuring a resequencer that can efficiently and effectively order messages to be delivered to a message consumer. An improved error handling method and system for messages is described according to some embodiments. The present embodiments are particularly useful to provide message ordering for ESB architectures and systems. Other and additional objects, features, and advantages of the invention are described in the detailed description, figures, and claims.

BRIEF DESCRIPTION OF FIGURES FOR EMBODIMENTS OF THE INVENTION

Figure 12:
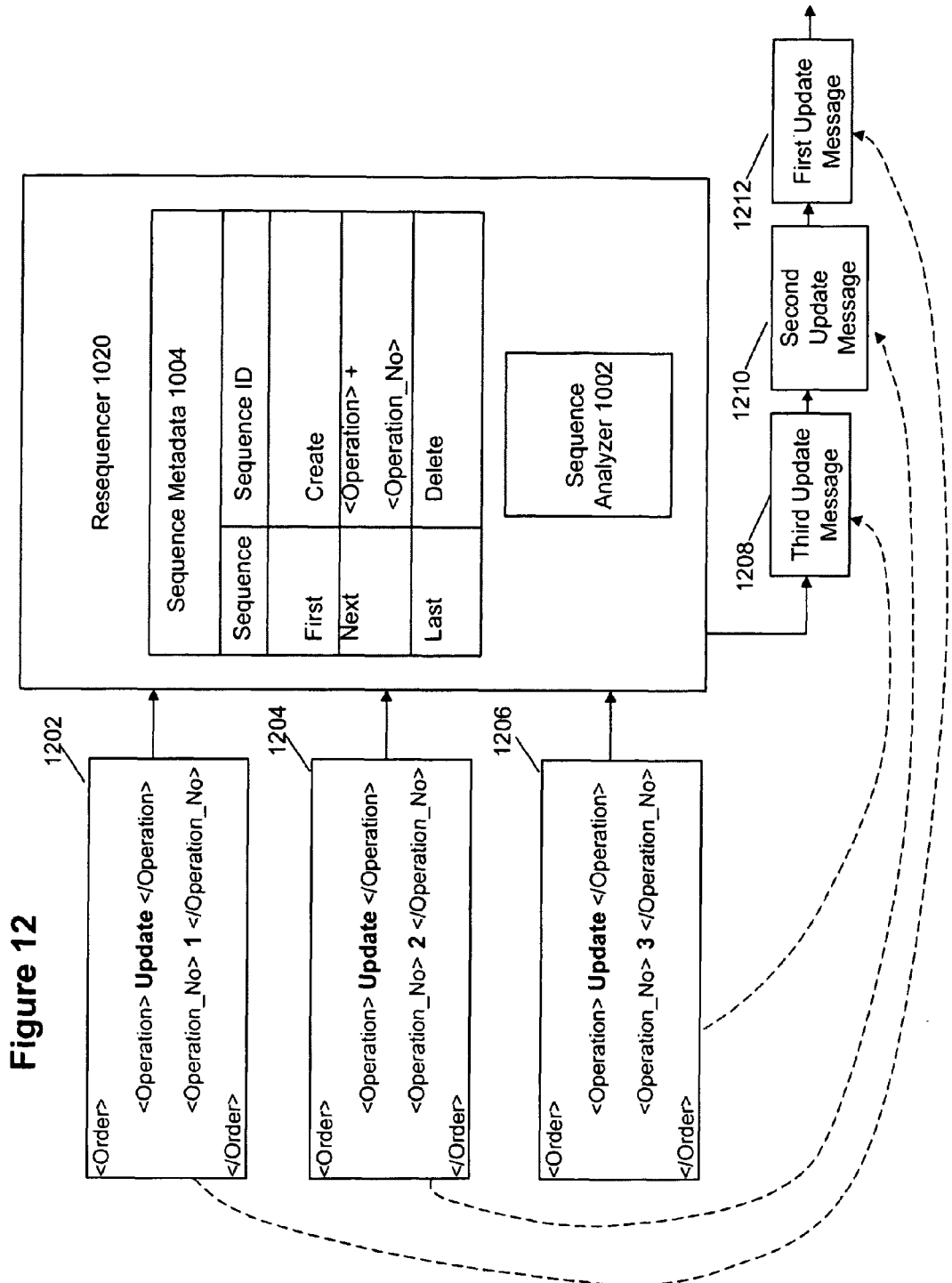

FIG. 12 provides another example of a message sequence according to some embodiments of the invention.

Figure 13:
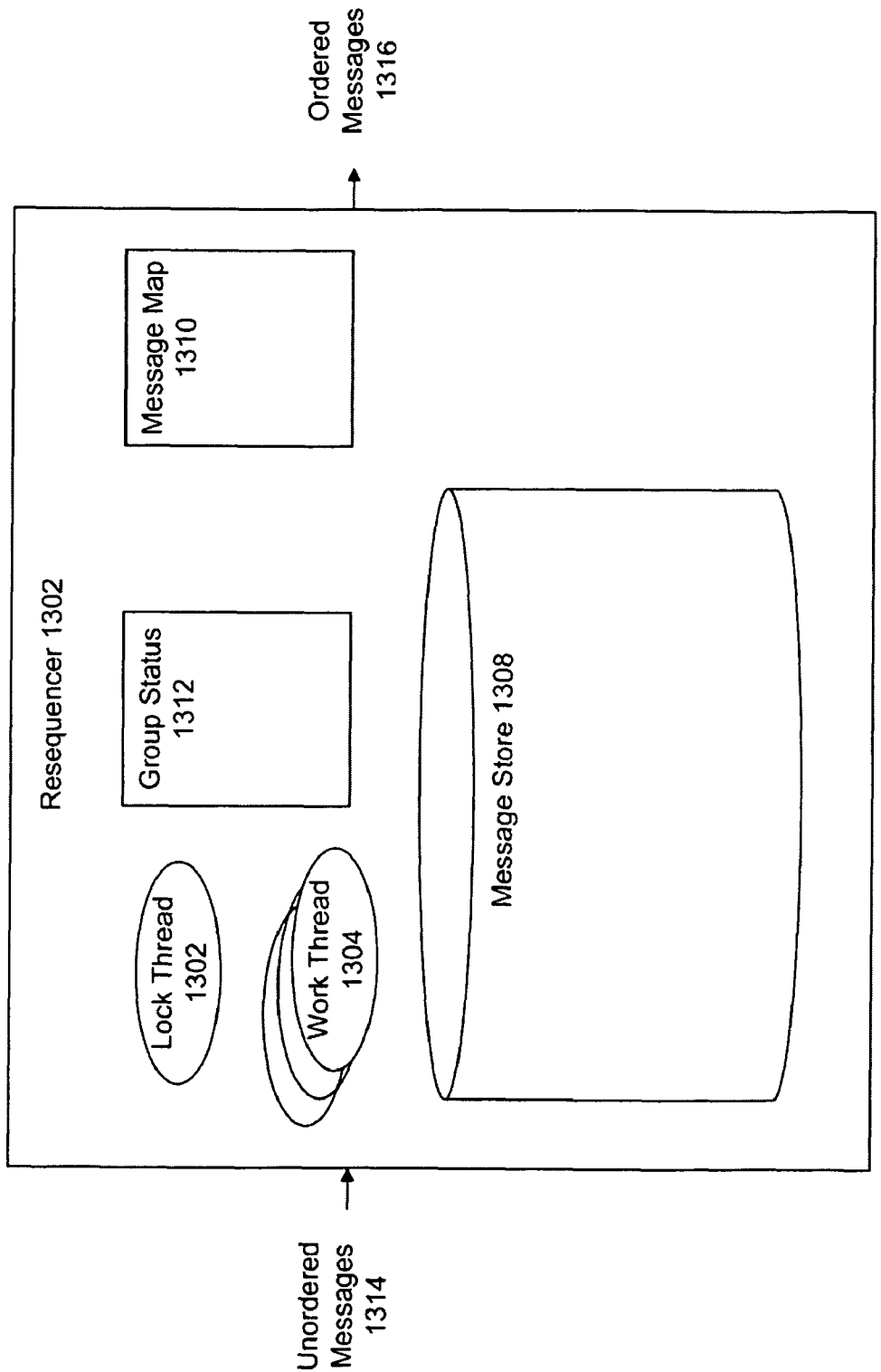

FIG. 13 illustrates internal structures for a resequencer according to some embodiments of the invention.

Figure 14:
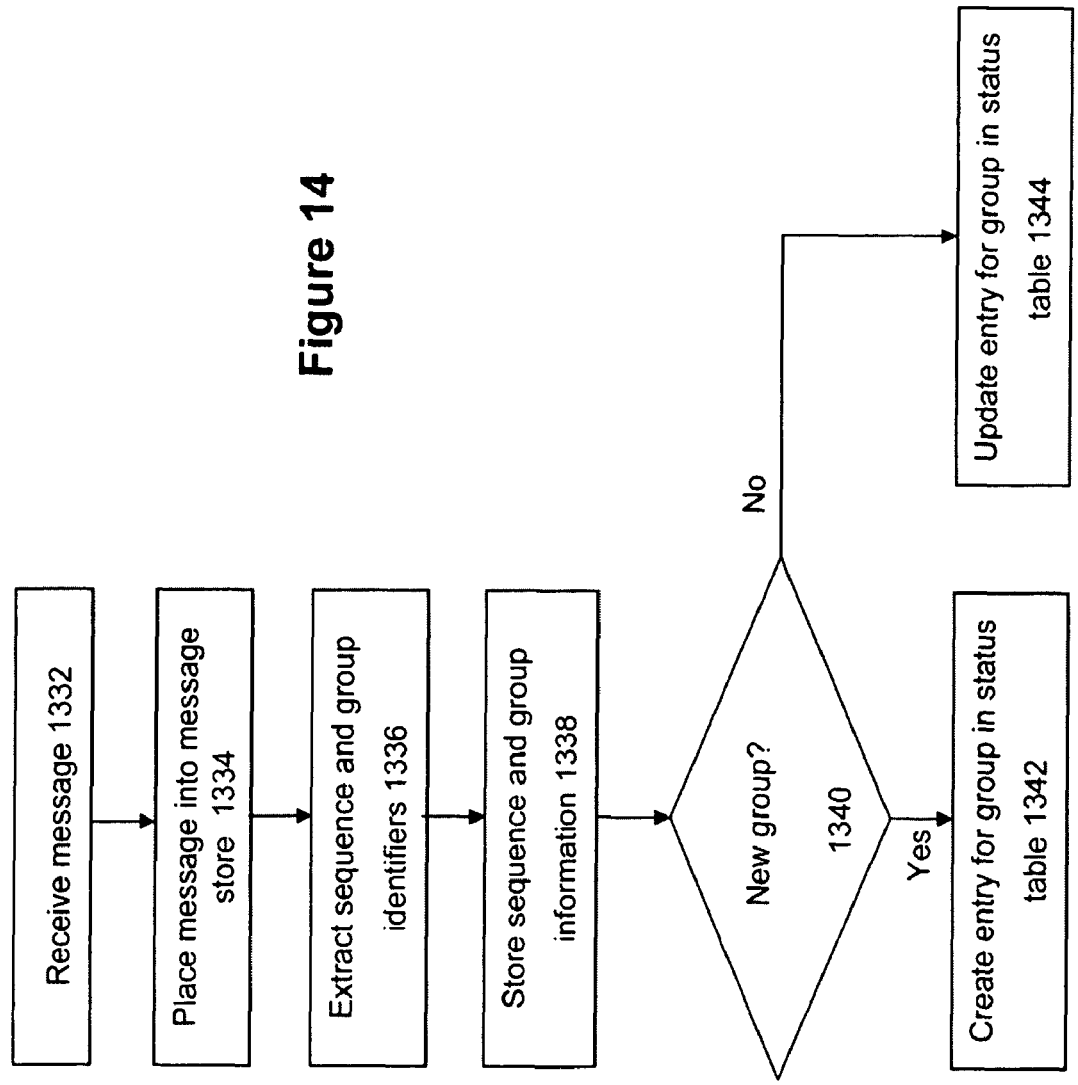

FIG. 14 shows a flow of a process for processing a message according to some embodiments of the invention.

Figure 15:
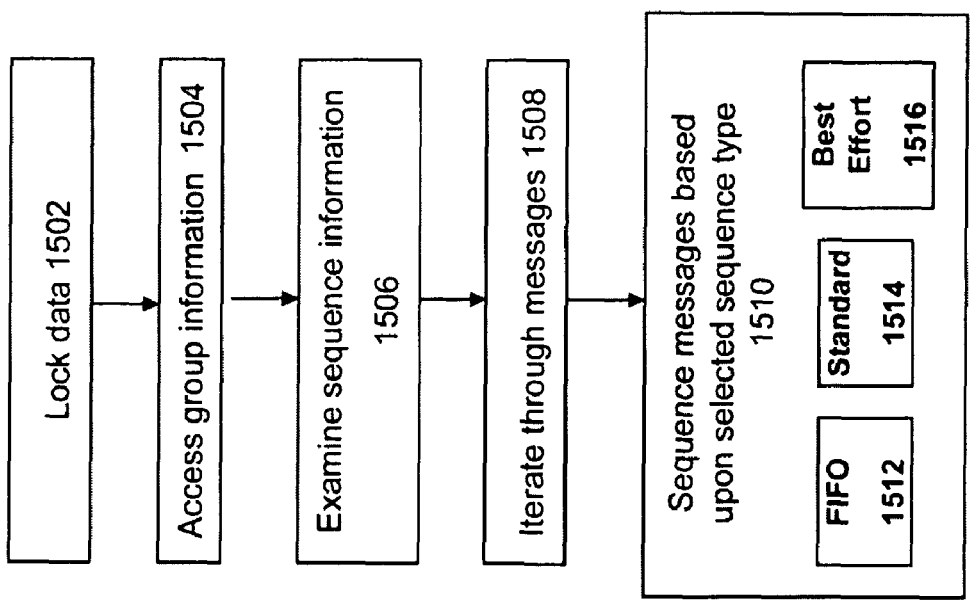

FIG. 15 shows a process for handling messages for sequencing according to some embodiments of the invention.

Figure 16:
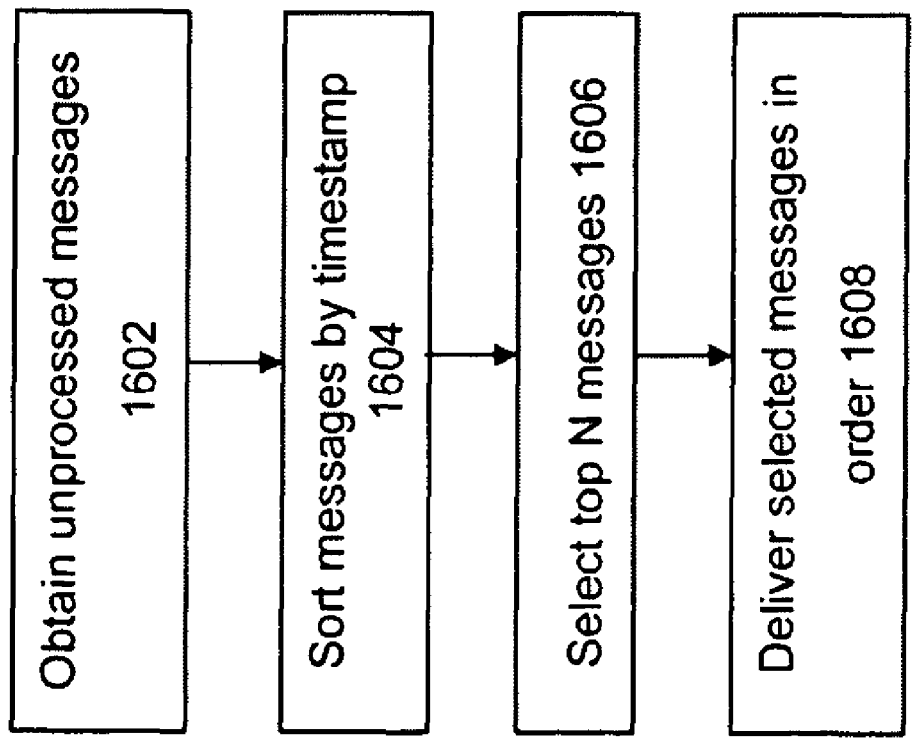

FIG. 16 shows a flow of a process for performing FIFO sequencing according to some embodiments of the invention.

Figure 17:
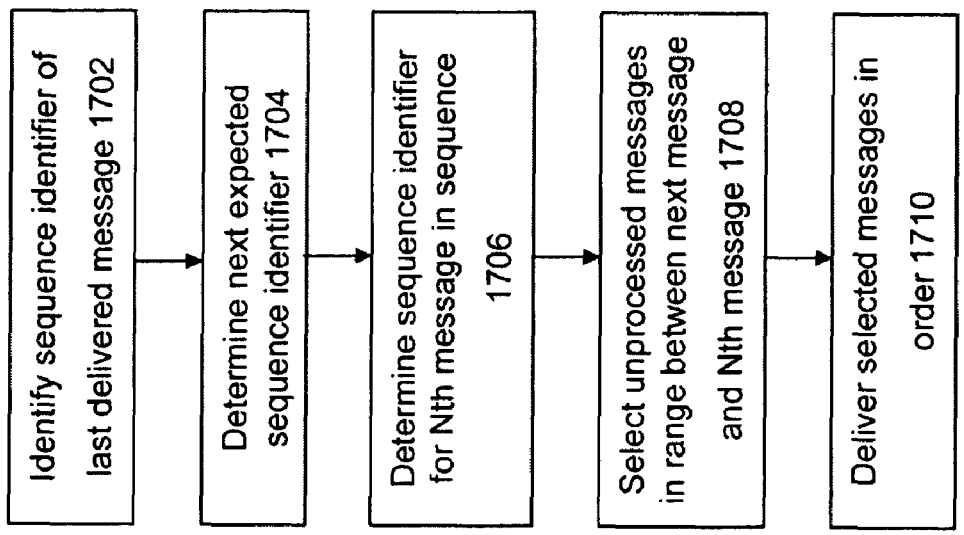

FIG. 17 shows a flow of a process for performing standard sequencing according to some embodiments of the invention.

Figure 18:
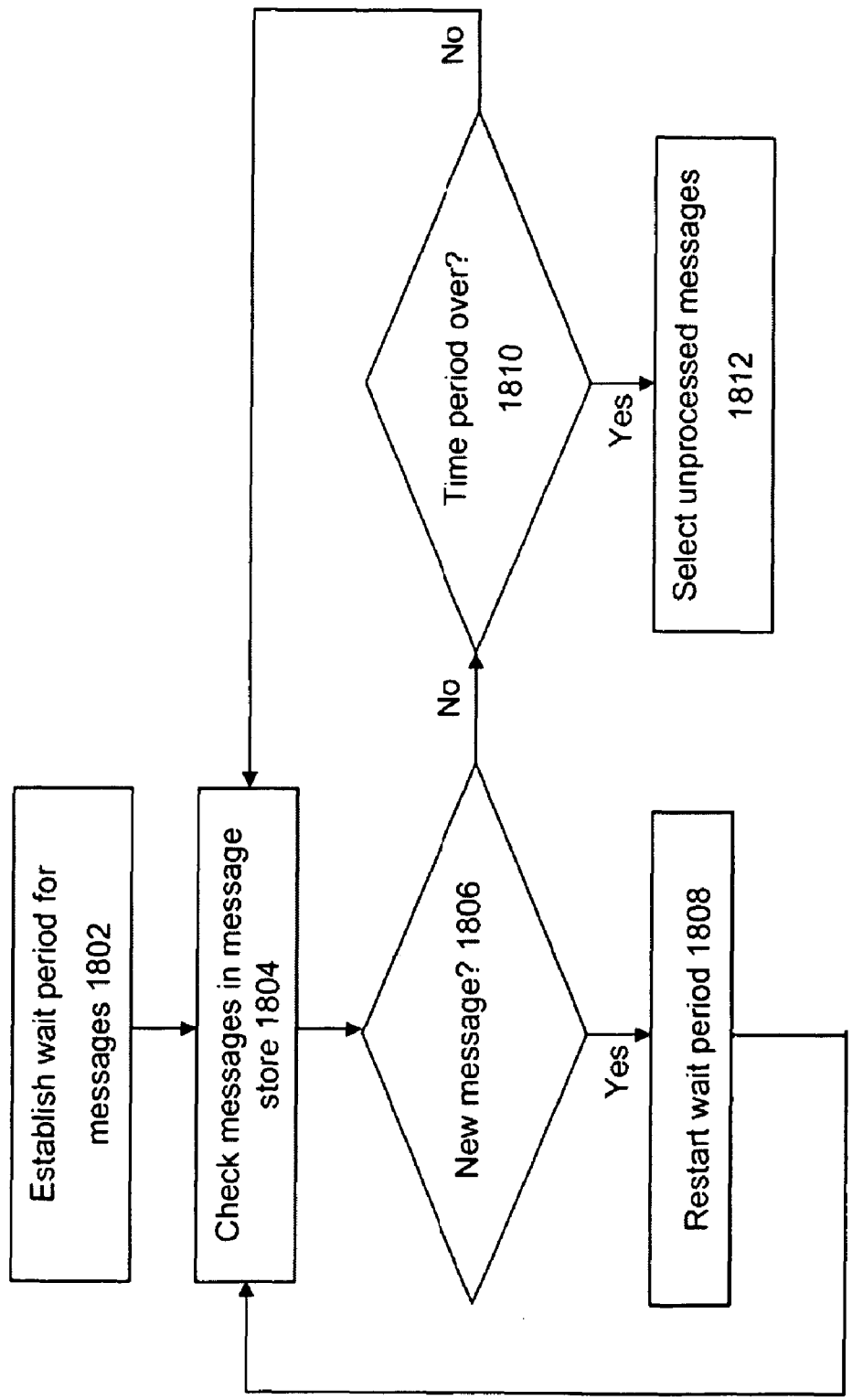

FIG. 18 shows a flow of a process for performing best efforts sequencing according to some embodiments of the invention.

Figure 19A:
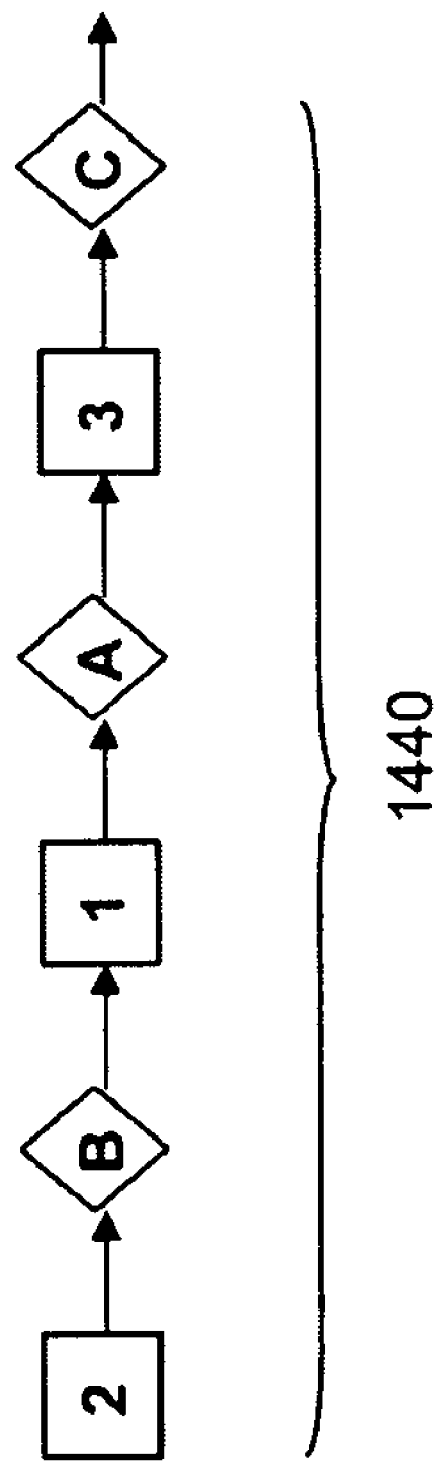
Figure 19C:
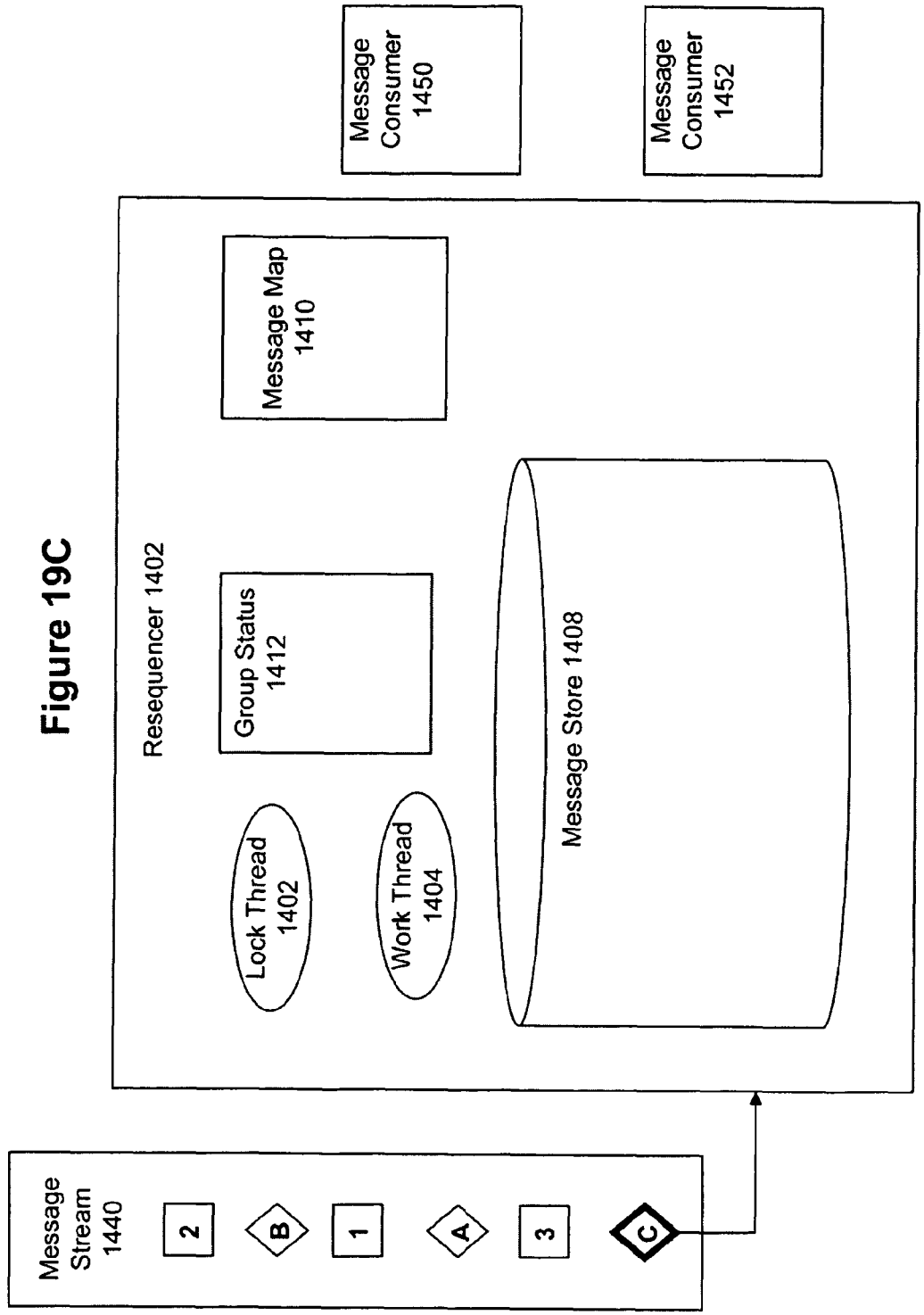
Figure 19D:
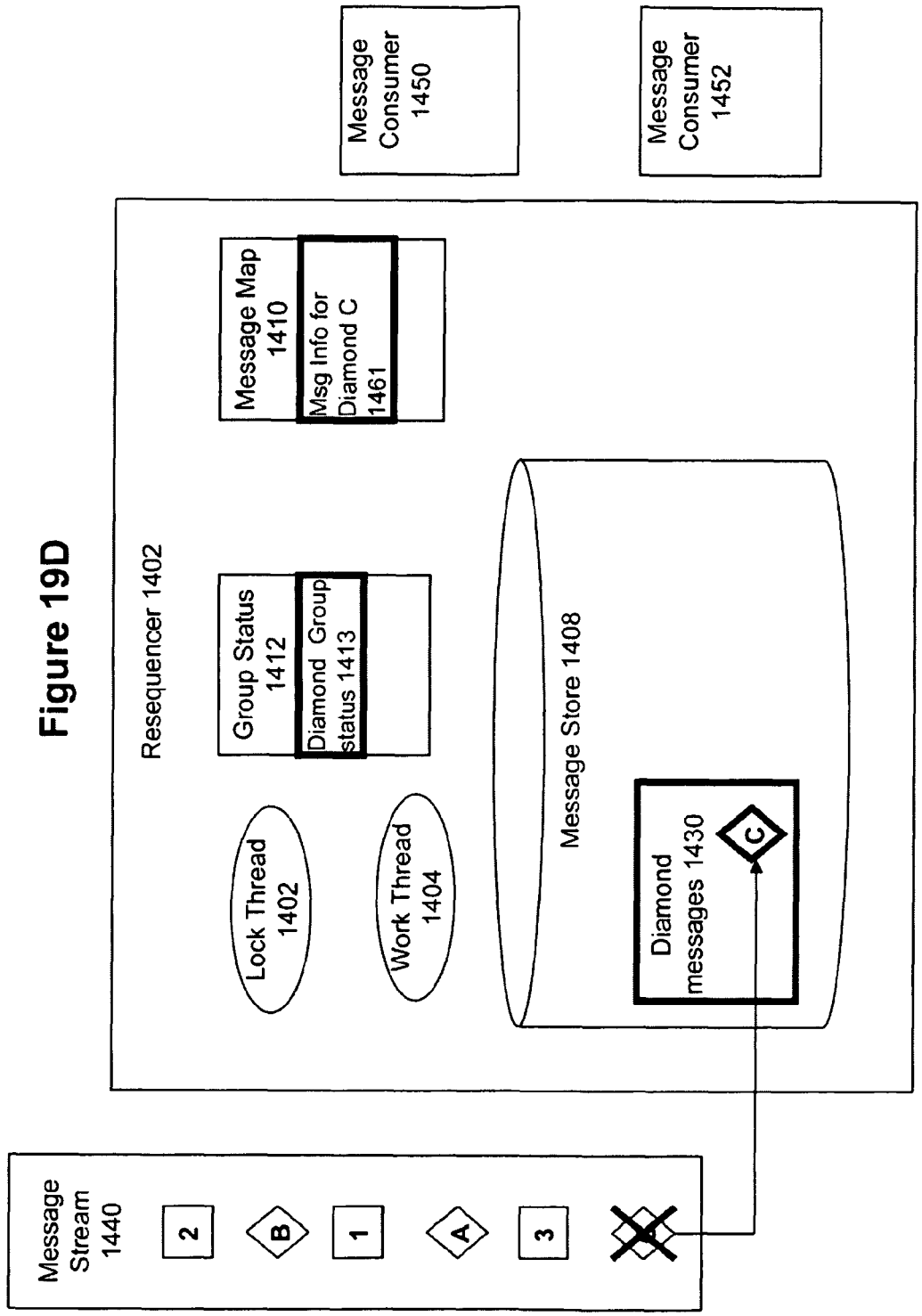
Figure 19E:
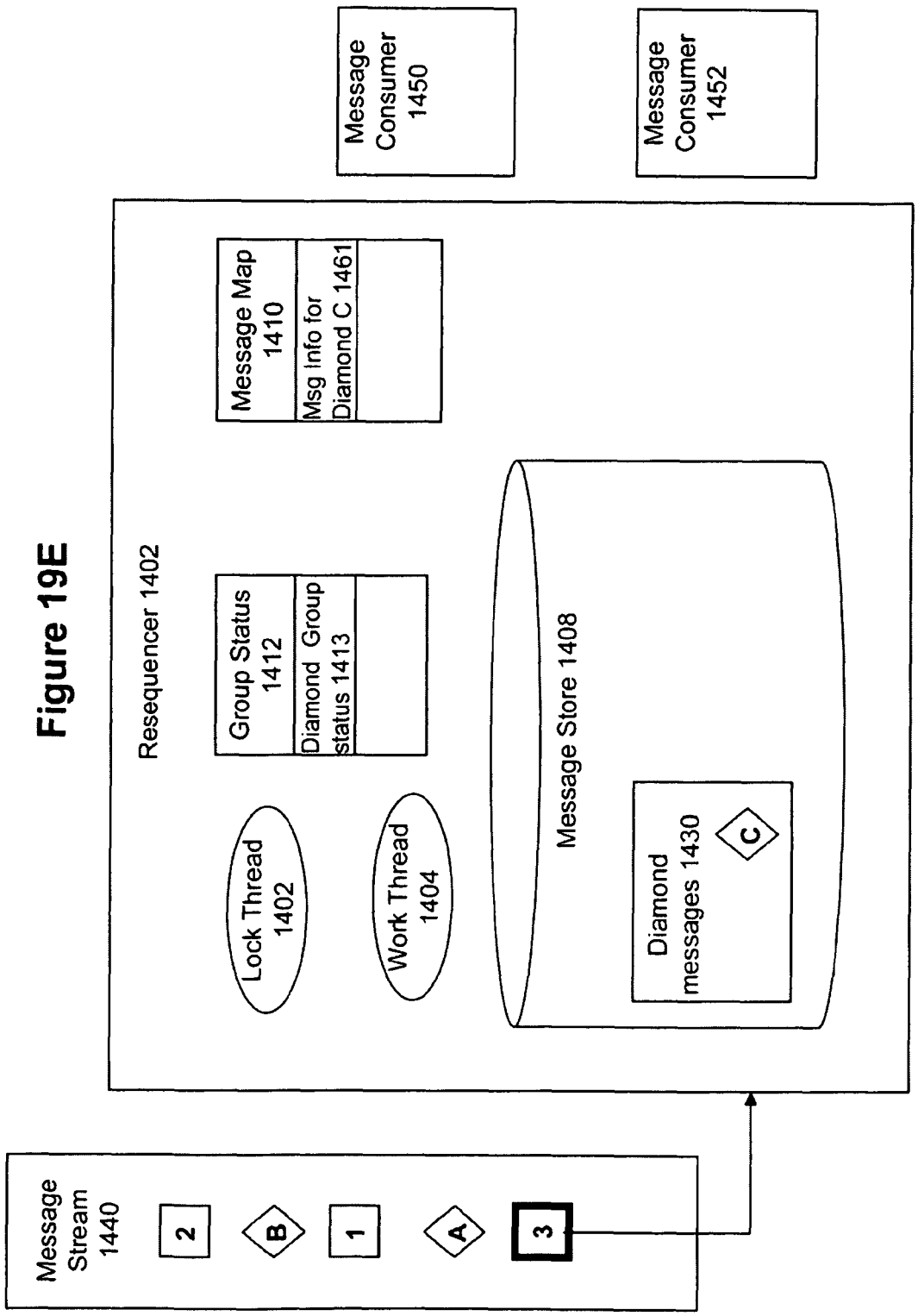
Figure 19F:
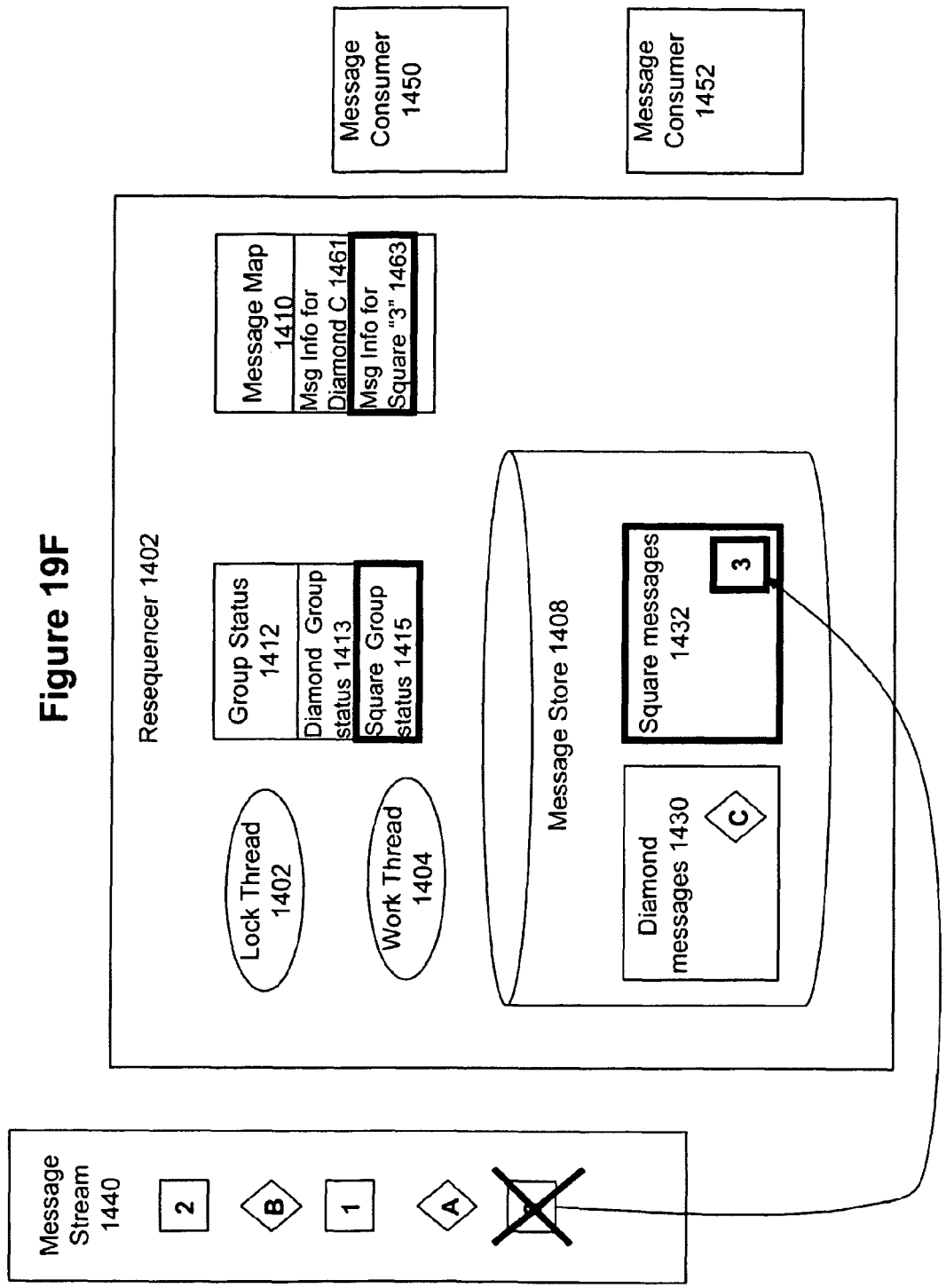
Figure 19G:
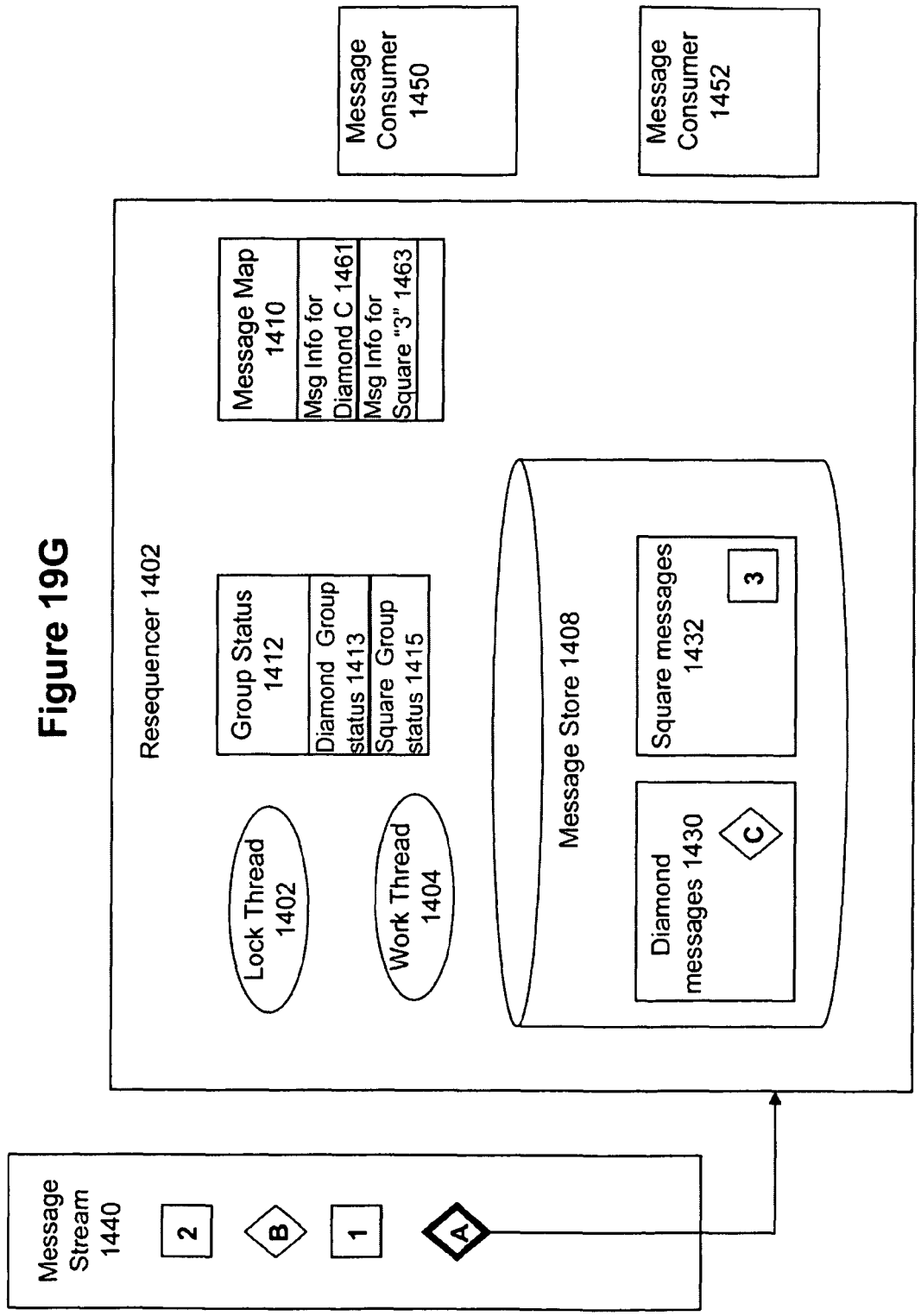
Figure 19H:
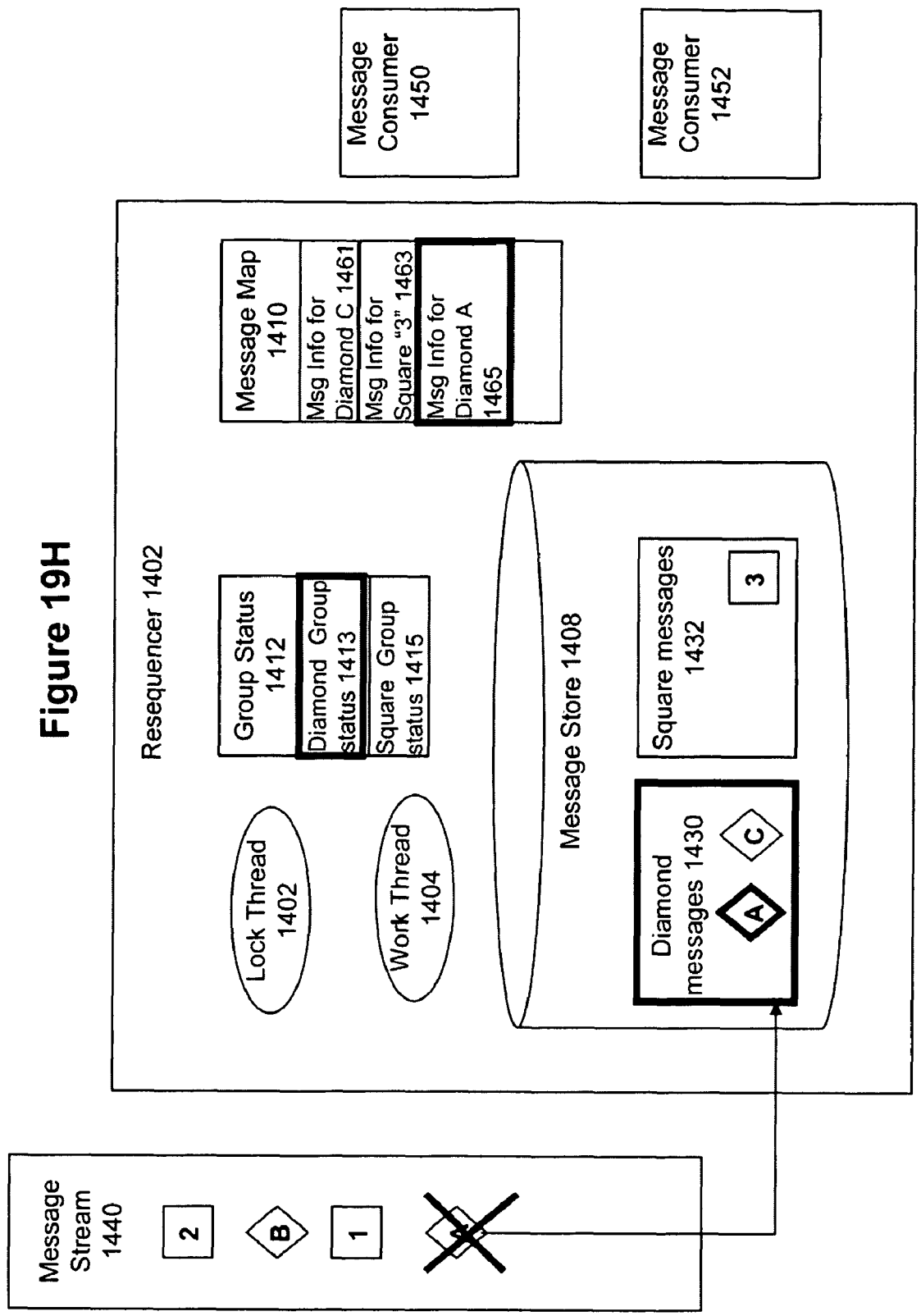
Figure 19J:
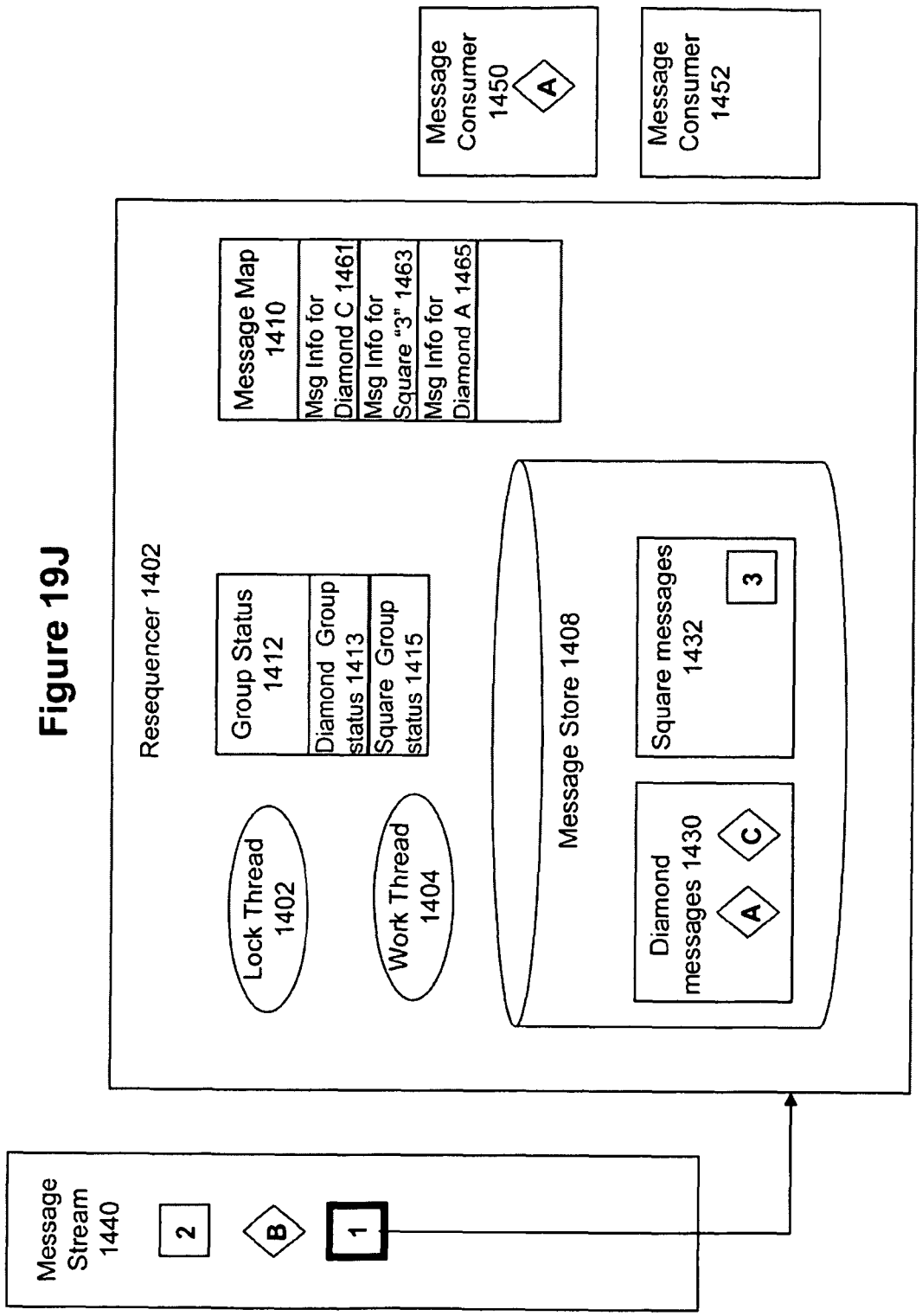
Figure 19K:
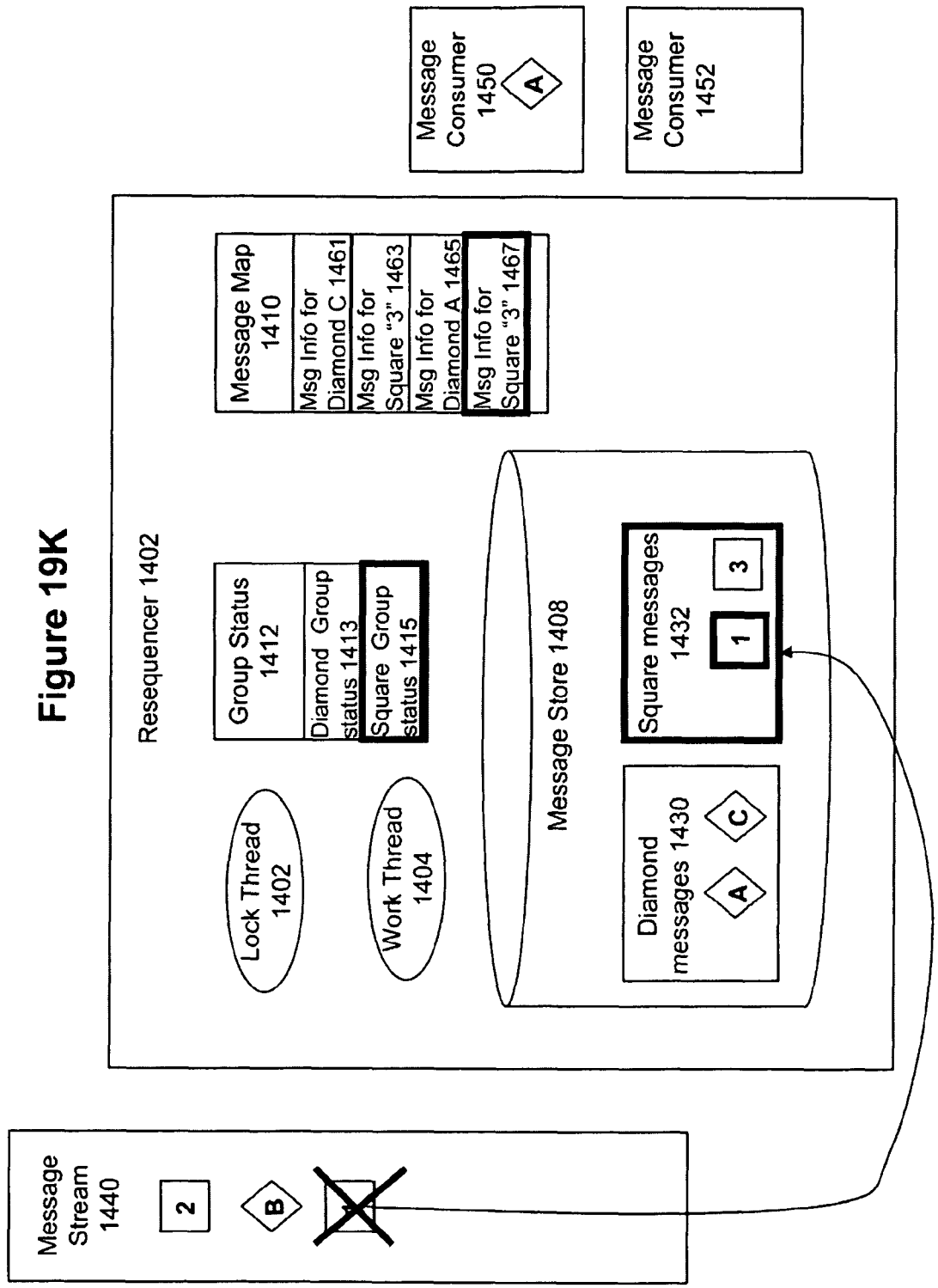
Figure 19L:
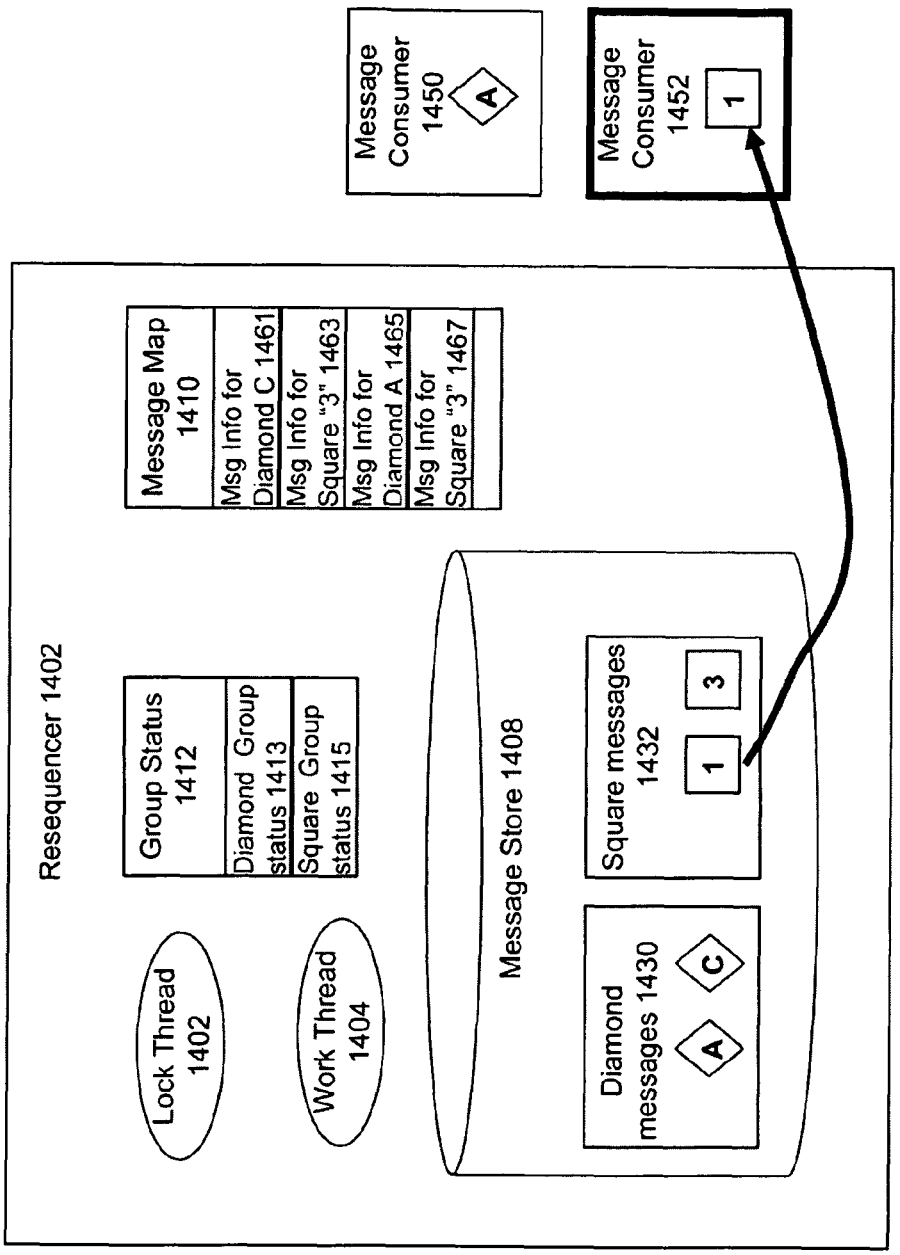
Figure 19M:
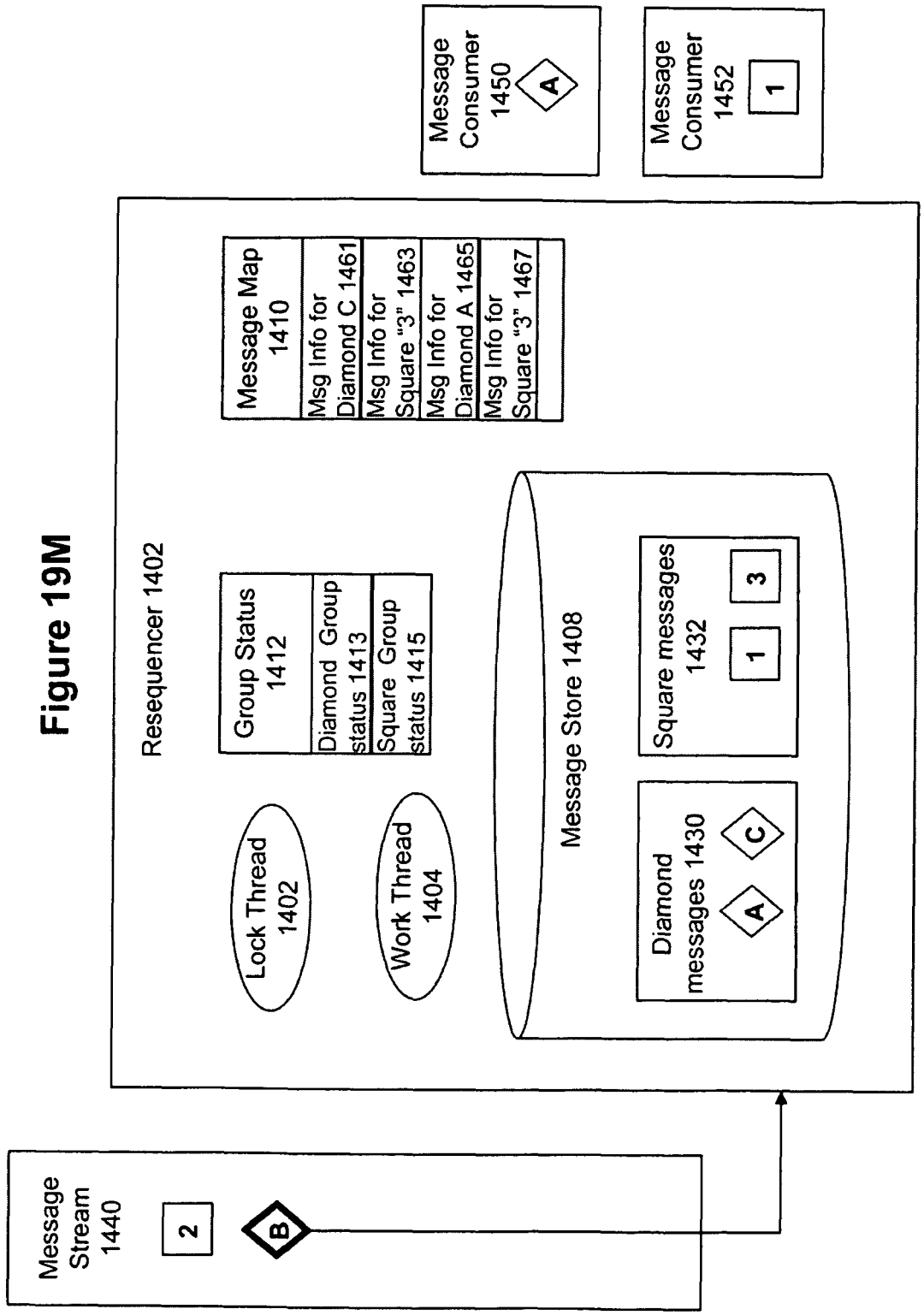
Figure 19N:
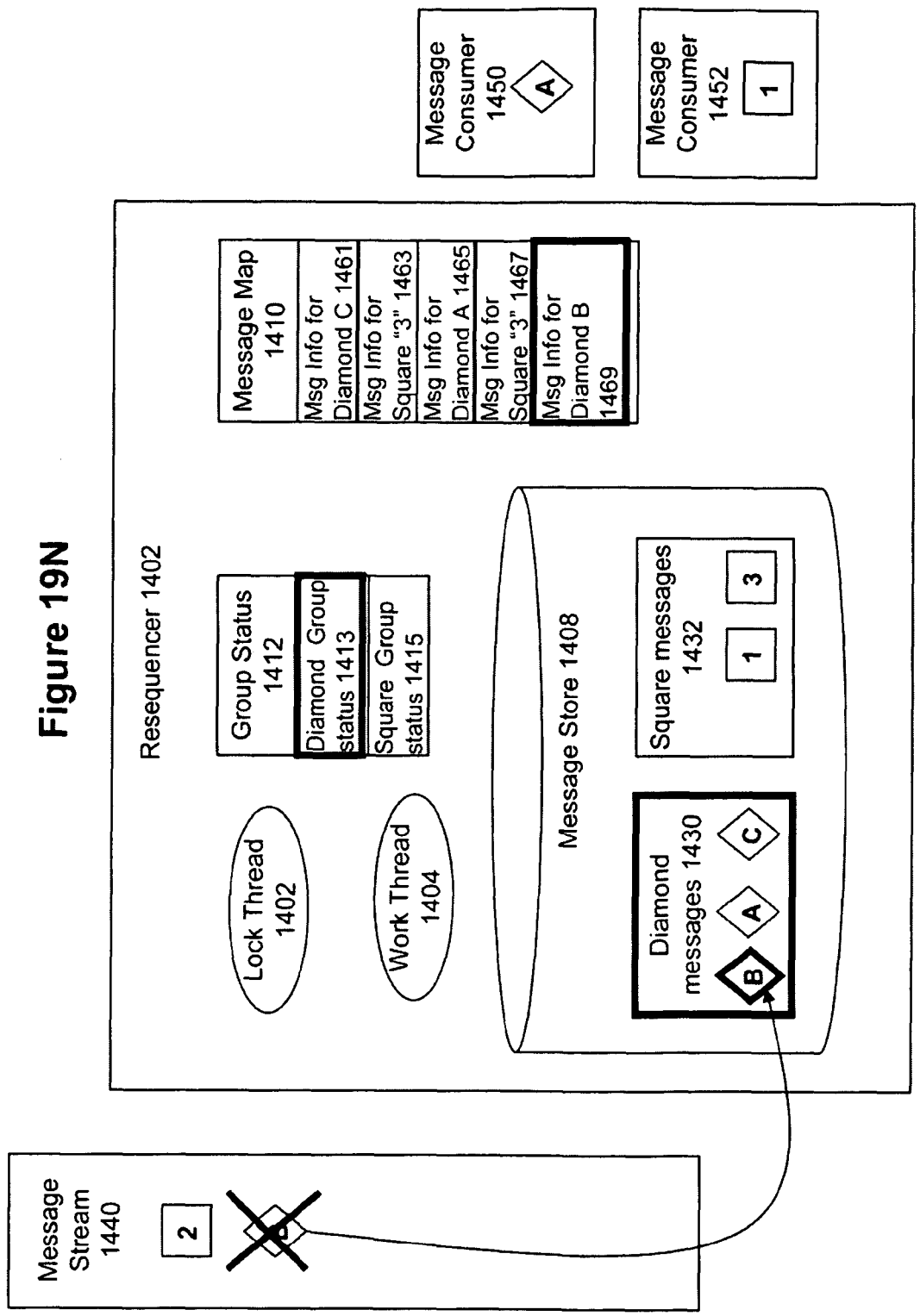
Figure 19O:
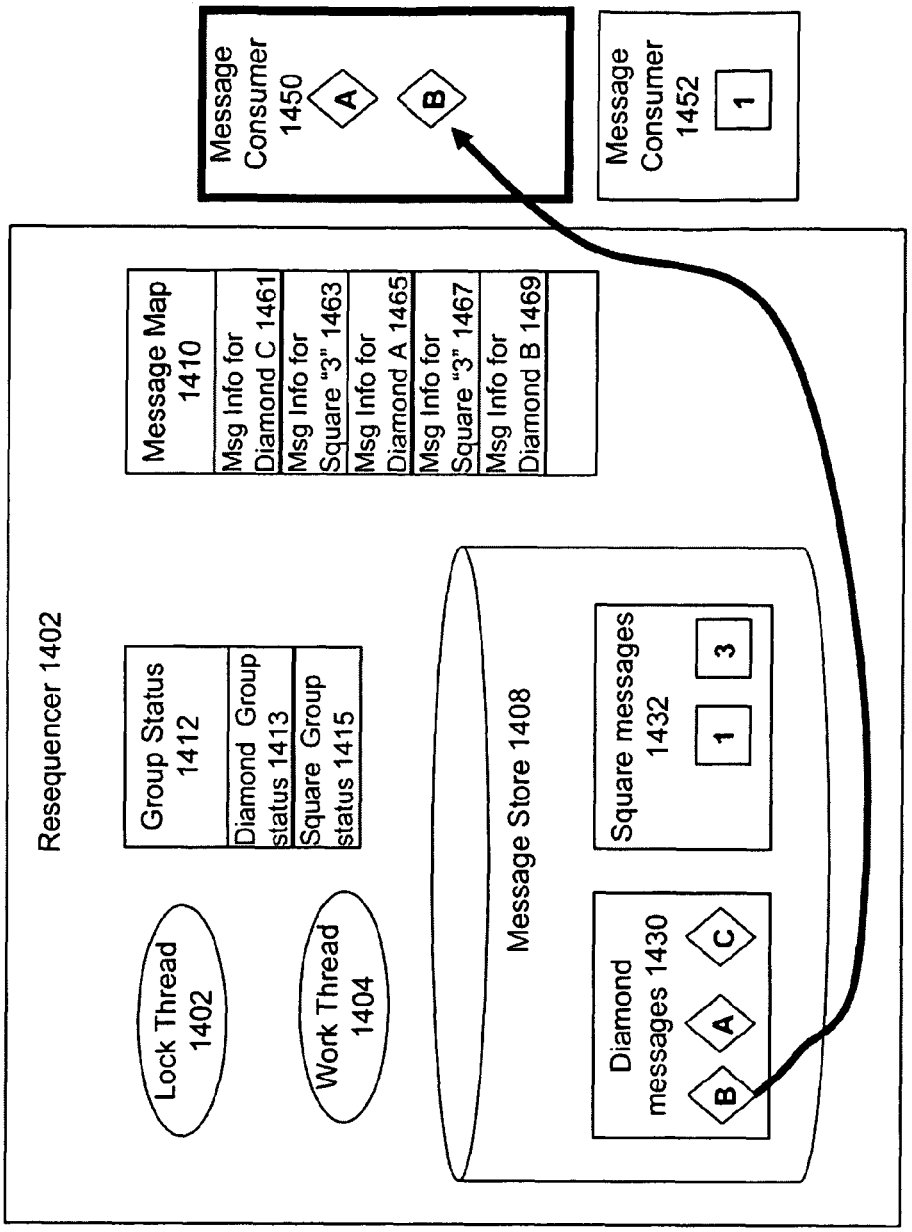
Figure 19P:
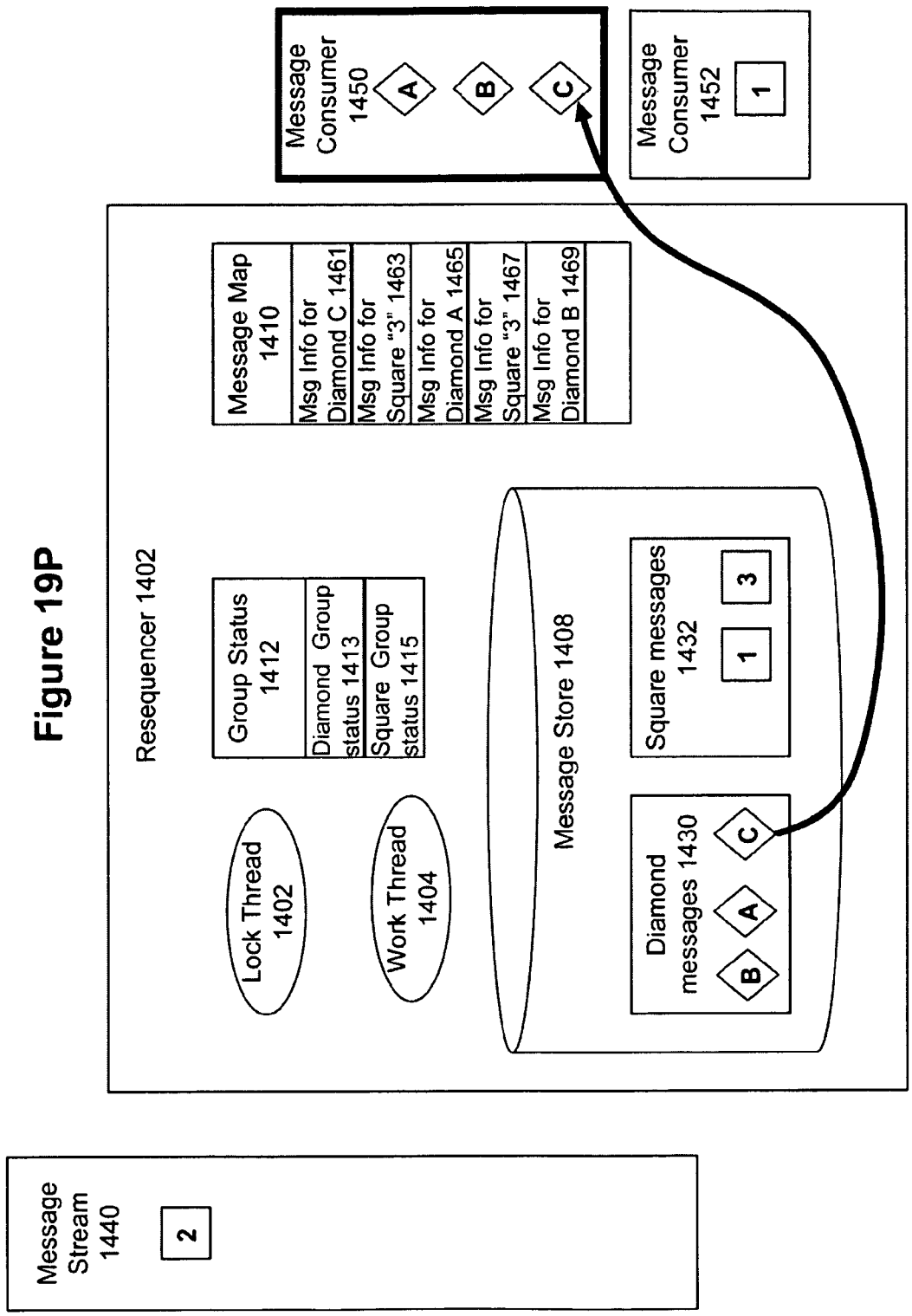
Figure 19Q:
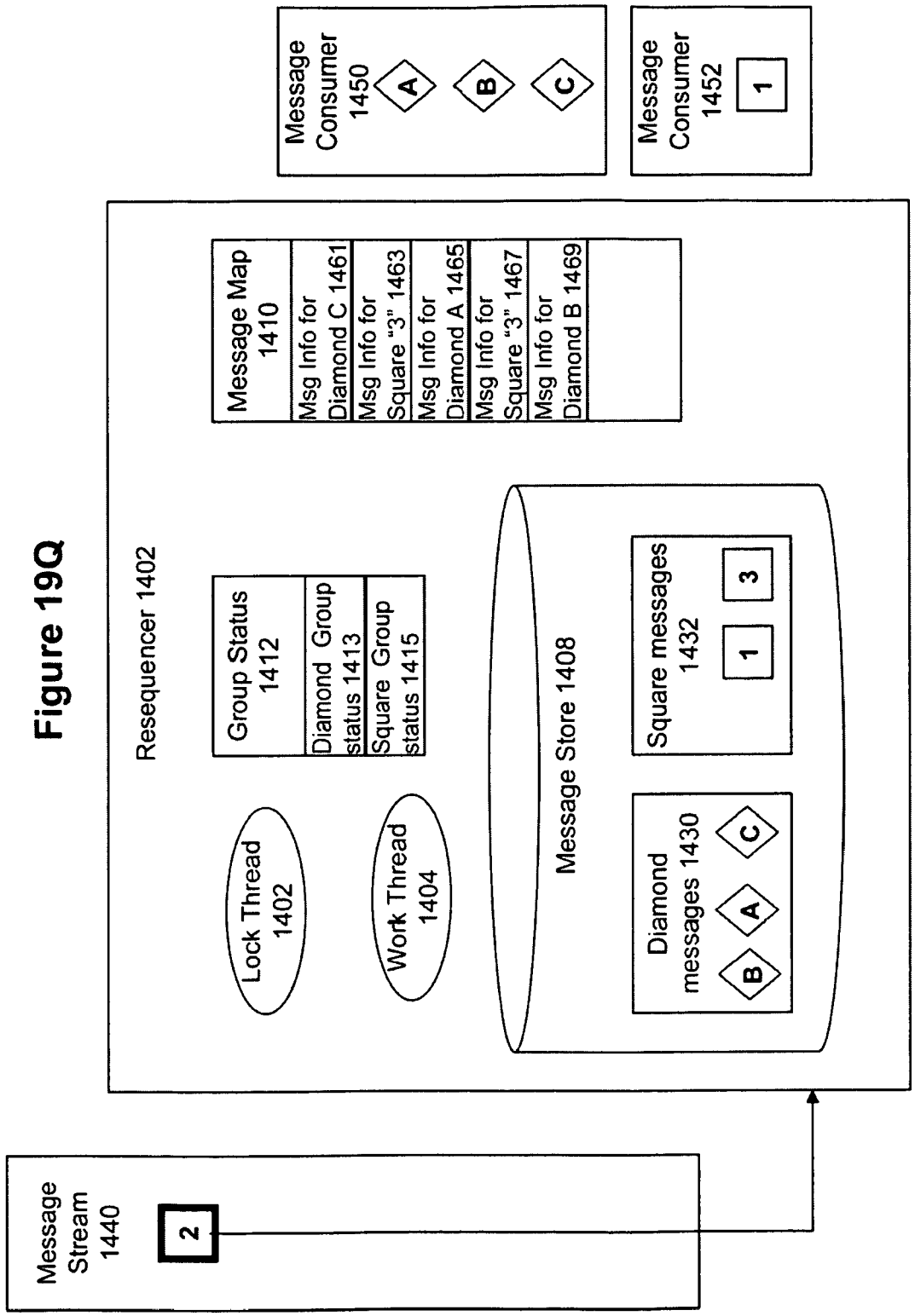
Figure 19R:
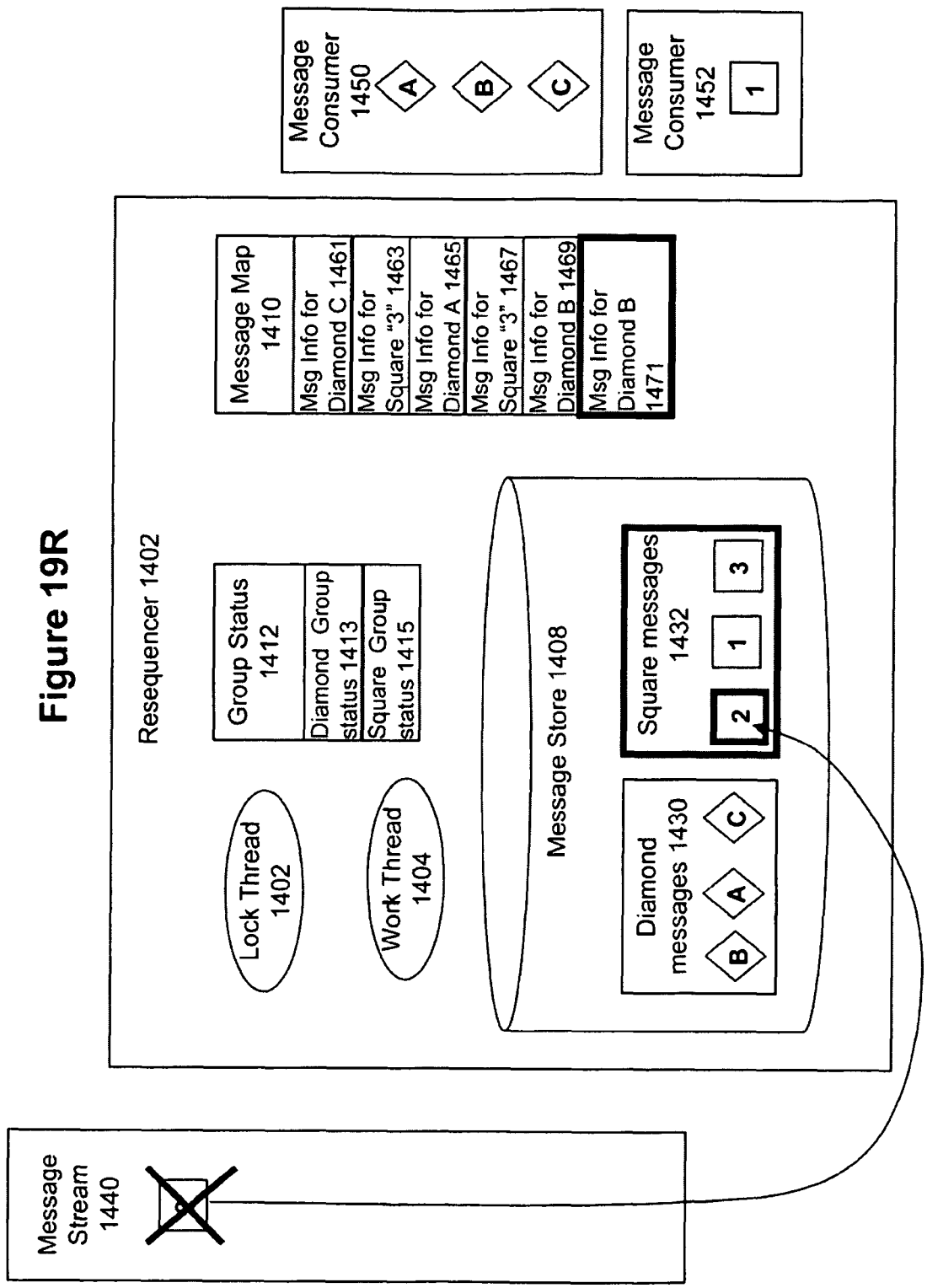
Figure 19S:
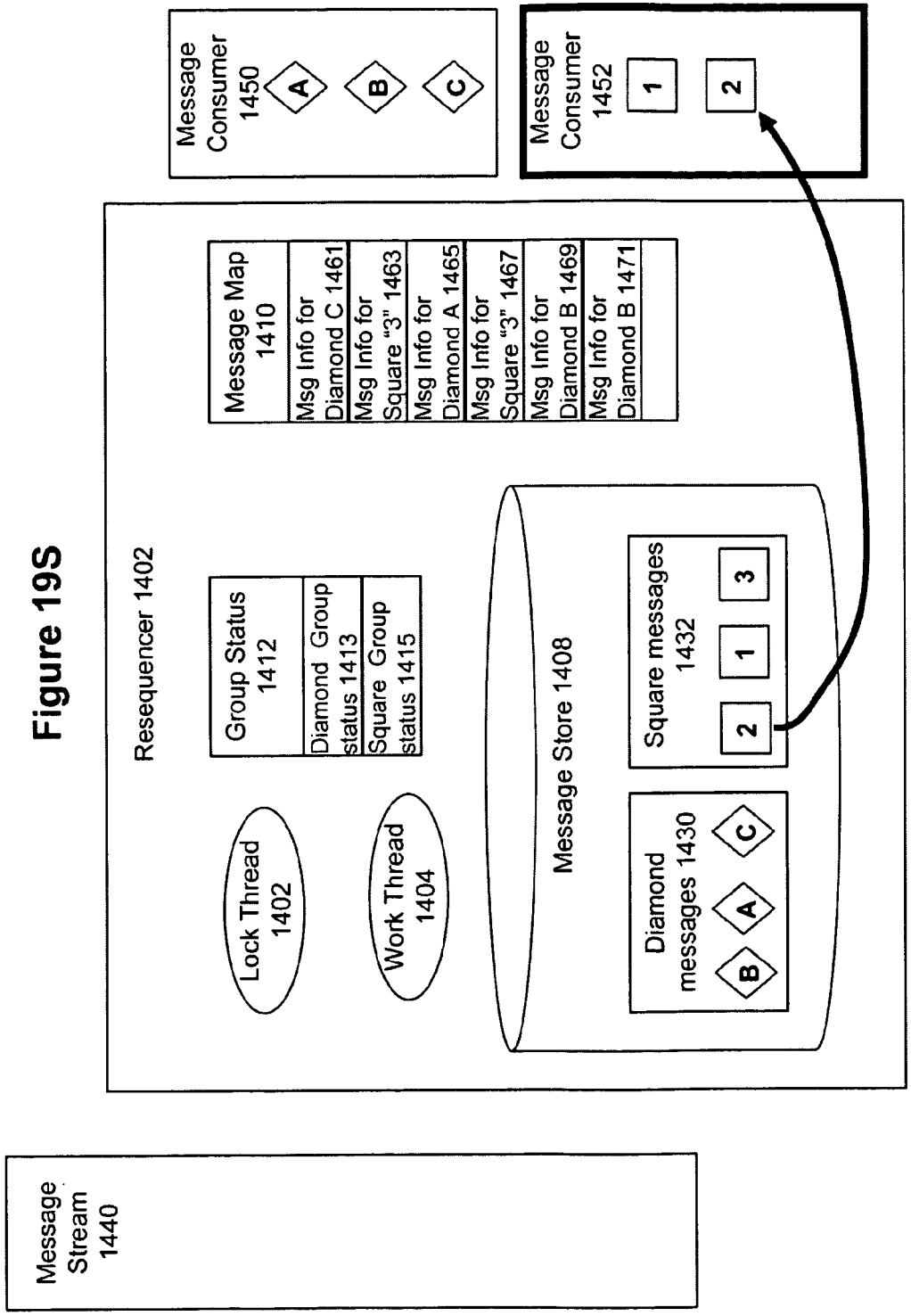
Figure 19T:
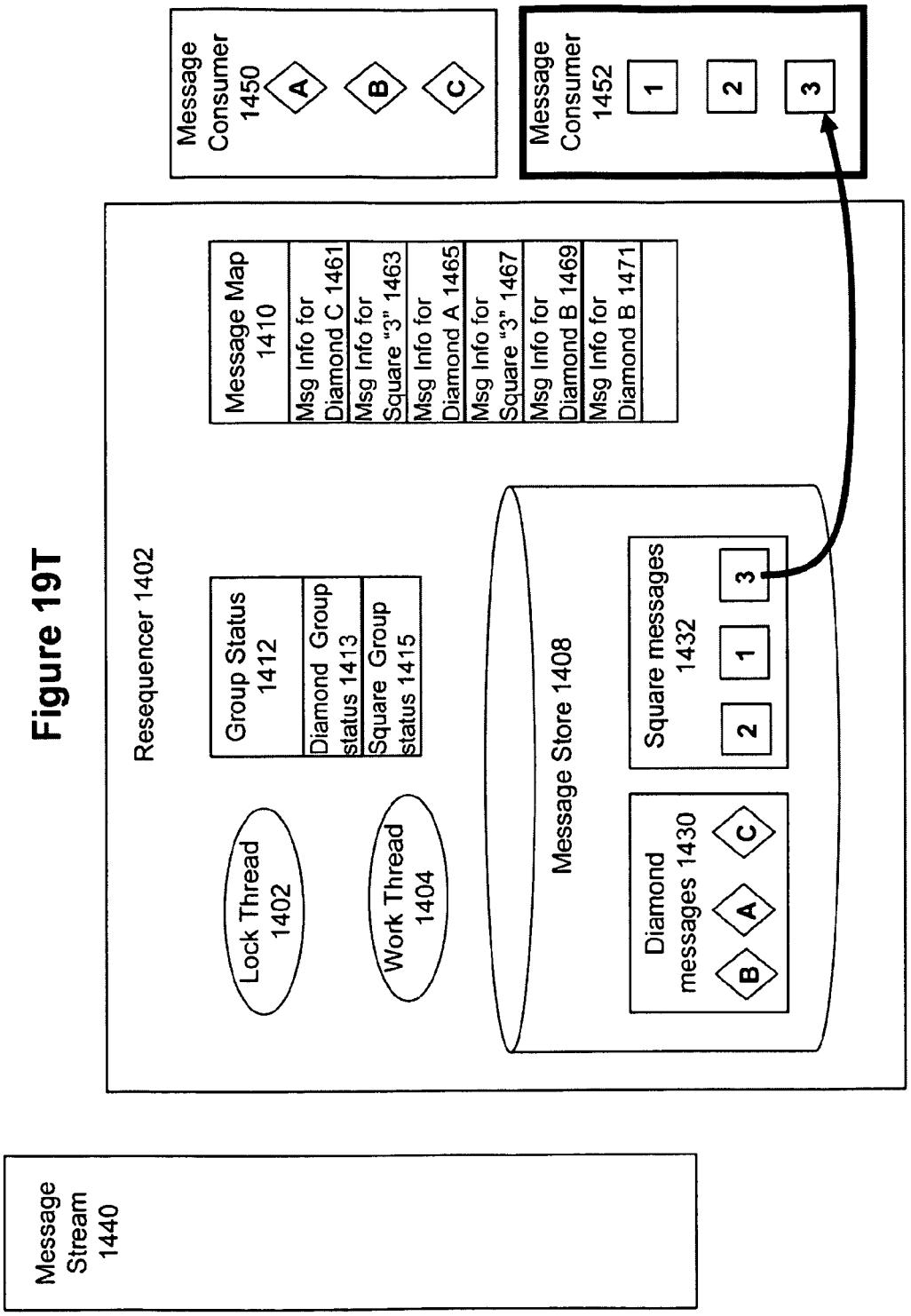
Figure 19U:
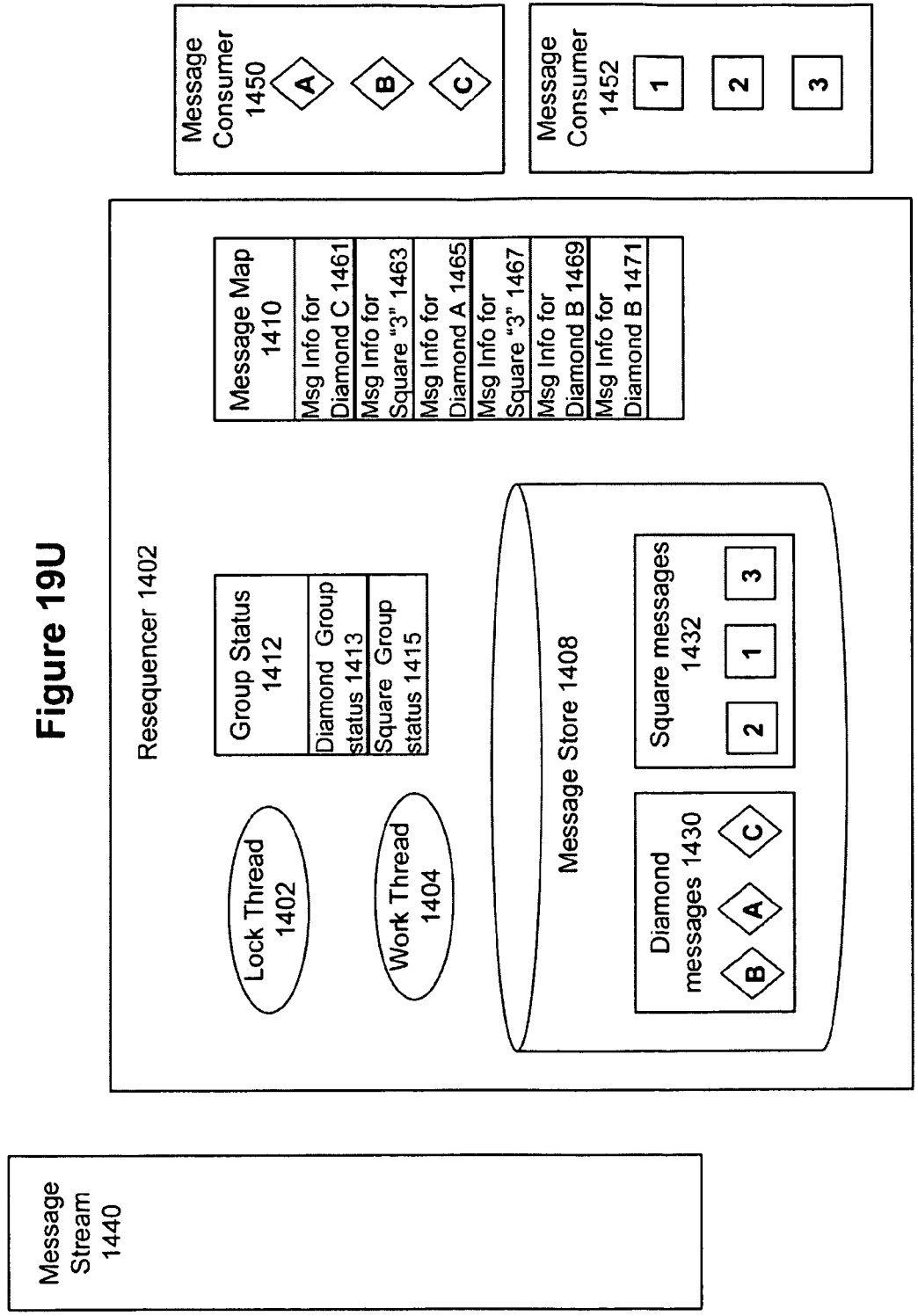

FIGS. 19A-U illustrate an example of a resequencing scenario according to some embodiments of the invention.

Figure 20:
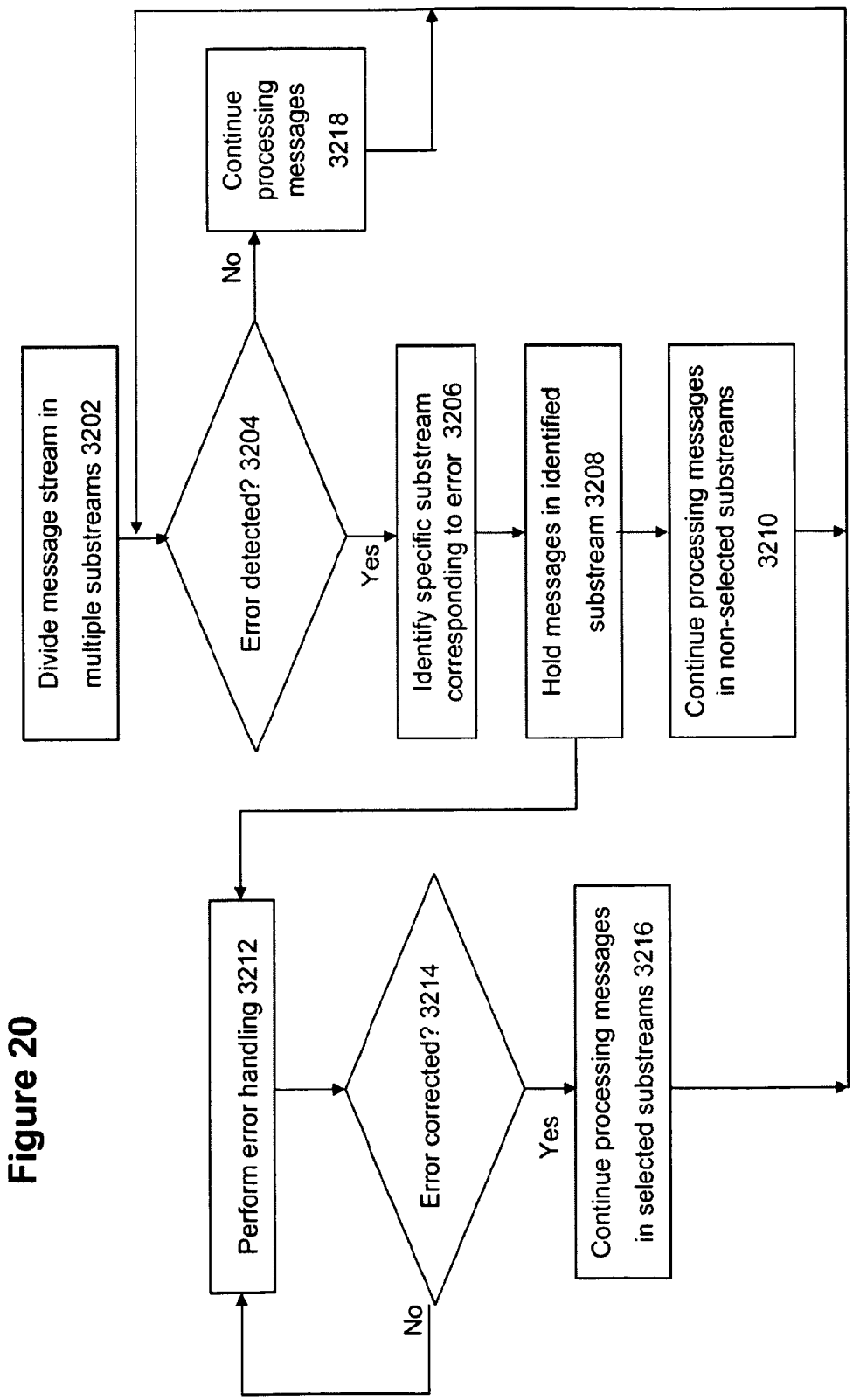

FIG. 20 shows a flow of a process for performing message error handling according to some embodiments of the invention.

FIGS. 21A-H illustrate message error handling according to some embodiments of the invention.

Figure 22:
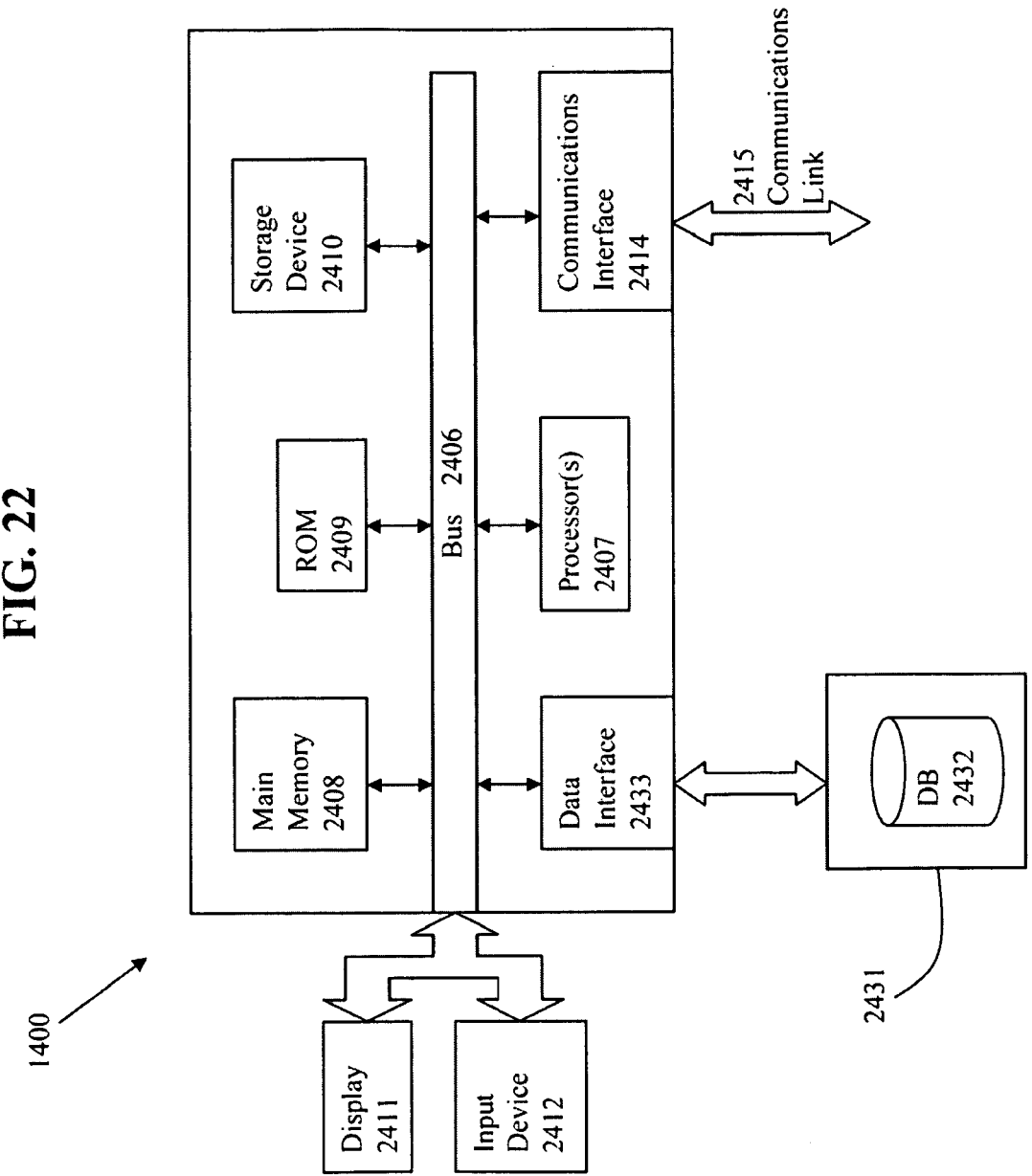

FIG. 22 shows an architecture of an example computing system with which the invention may be implemented.

DETAILED DESCRIPTION OF EMBODIMENTS

As noted above, in many message-based systems, it is possible for messages to be sent from a message creator to a message consumer in a sequence where the messages are delivered out-of-order. If, however, the message consumer expects the messages to be in a particular order, then the out-of-order message sequence could cause computing errors or other failures to occur at or by the message consumer.

Embodiments of the present invention(s) provide approaches for efficiently and effectively ordering messages to be delivered to a message consumer. According to some of the embodiments that are illustrated below, a "resequencer" is provided to perform ordering of messages using the below-described inventive processes and mechanisms. A resequencer is an apparatus that may be used to deliver incoming messages in a user-specified order to the consumer. The user specifies the new order (or the correct sequence) of the incoming messages and the part of the incoming message that is the sequence identifier of the message. The sequence identifier and the correct sequence are used to decide on the position of the incoming message in the outgoing message stream. It is noted, however, that the inventive concepts described herein may be used in conjunction with many types of apparatuses and processes, and is not limited to their application to resequencers unless claimed as such.

Figure 1:
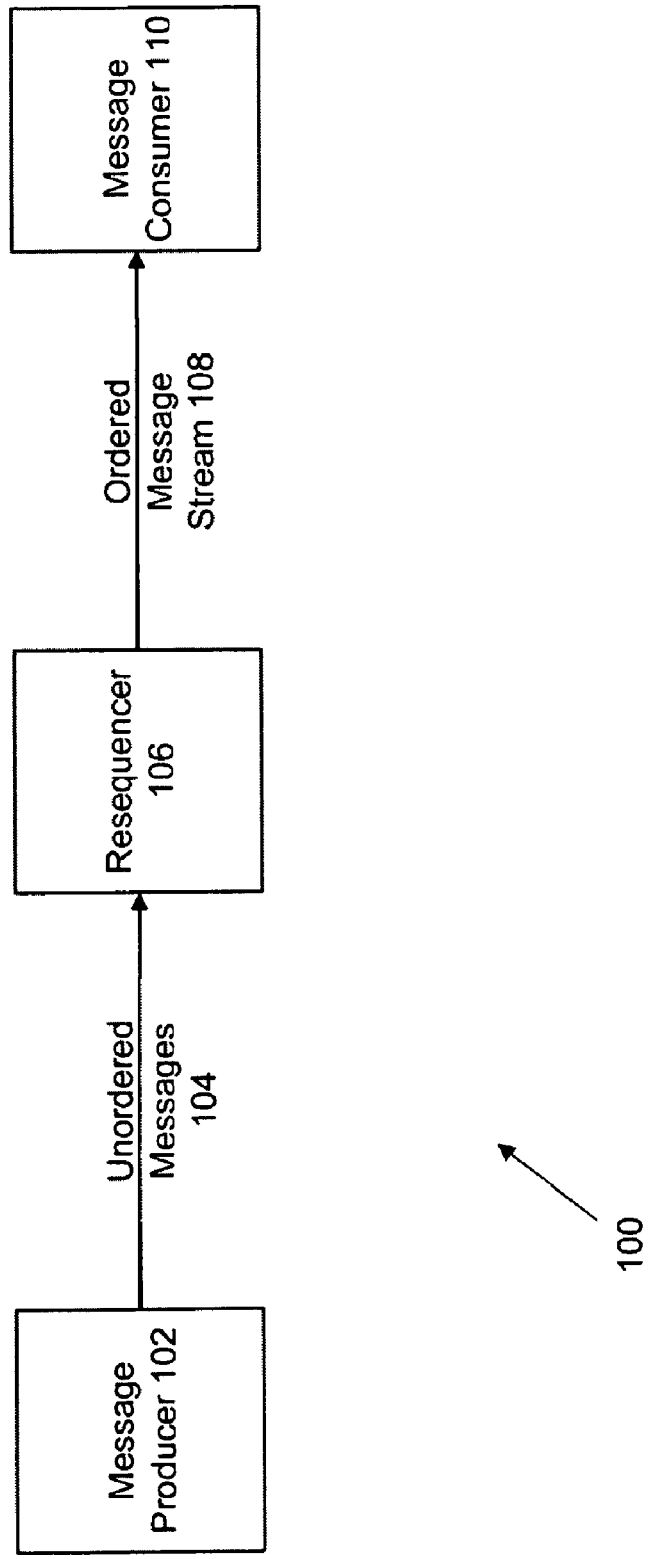
FIG. 1 illustrates a flow of un-ordered incoming messages to a resequencer, and the generation of an outbound ordered stream of messages from the resequencer according to some embodiments of the invention.

FIG. 1 shows an architecture 100 of an example system that uses a resequencer according to some embodiments of the invention. The system may be, for example, an ESB architecture comprising one or more middleware applications that interconnect applications to users of the applications, where messages are passed from upstream components to downstream components of the architecture 100.

A message producer 102 generates one or more messages 104 that may be sent from the message producer 102 in an unknown order in the direction of a message consumer 110. A resequencer 106 intercepts the unordered messages 104 for the message producer 102.

The resequencer 106 is an apparatus that can be used to deliver incoming messages in a user specified order. The resequencer 106 analyzes the unordered messages 104 to determine whether or not the messages 104 need to be resequenced. If so, then the resequencer 106 will re-order the messages 104 before sending the messages in order 108 to the message consumer 110.

Figure 2:
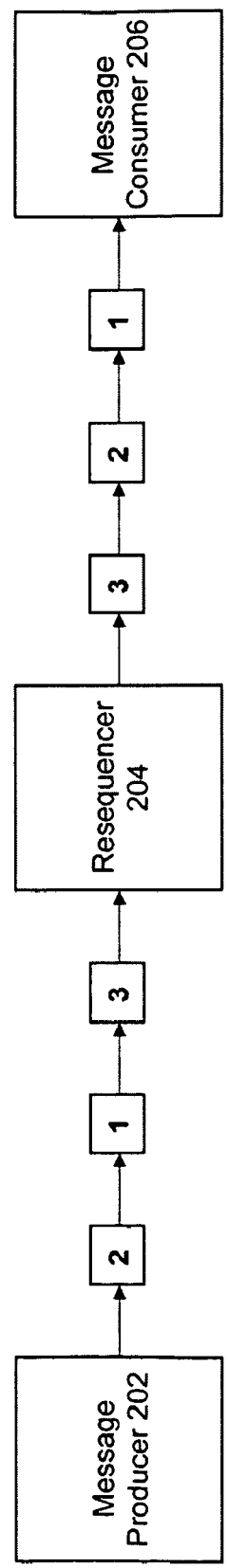
FIG. 2 illustrates resequencing of messages according to some embodiments of the invention.

FIG. 2 provides an illustration of this process for re-ordering messages. Assume that a set of messages are sent out-of-order from a message producer 204 to a message consumer 206. For example, the messages are intended to be in an ordered sequence where message 1 is first, then message 2, and then message 3 as the final message. However, due to reasons such as network routing or latency, the set of messages may actually be sent out-of-order where message 3 is sent first, then message 1, and finally message 2.

The resequencer 204 receives the messages 3, 1, 2 in the out-of-order sequence, and re-orders the messages to be in the correct sequence. The messages in the correct sequence will then be sent to the message consumer 206. Here, the messages will be sent in order of message 1 first, them message 2, and finally message 3 to the message consumer 206.

According to some embodiments of the invention, the payloads of the messages themselves will include information that may be used to decide the correct order of those message. The resequencer will use that information from the message payloads to determine the new position of the incoming message in the outgoing ordered messages stream that is delivered to the message consumer. More details regarding an example approach for performing this type of sequence analysis is described below.

In addition to the function of re-ordering messages, a resequencer may also provide the functionality of dividing the stream of incoming messages into sub-streams based on one or more groups that are associated with a message. This can provide faster performance as compared to single threaded resequencing operations that handle only a single stream of messages. Each of the substreams may comprise an independent set of messages that are to be ordered separately from other substreams of messages. Routing may be performed to deliver the substreams to the correct message consumer based upon the specific groups that is associated with each substream.

Figure 3:
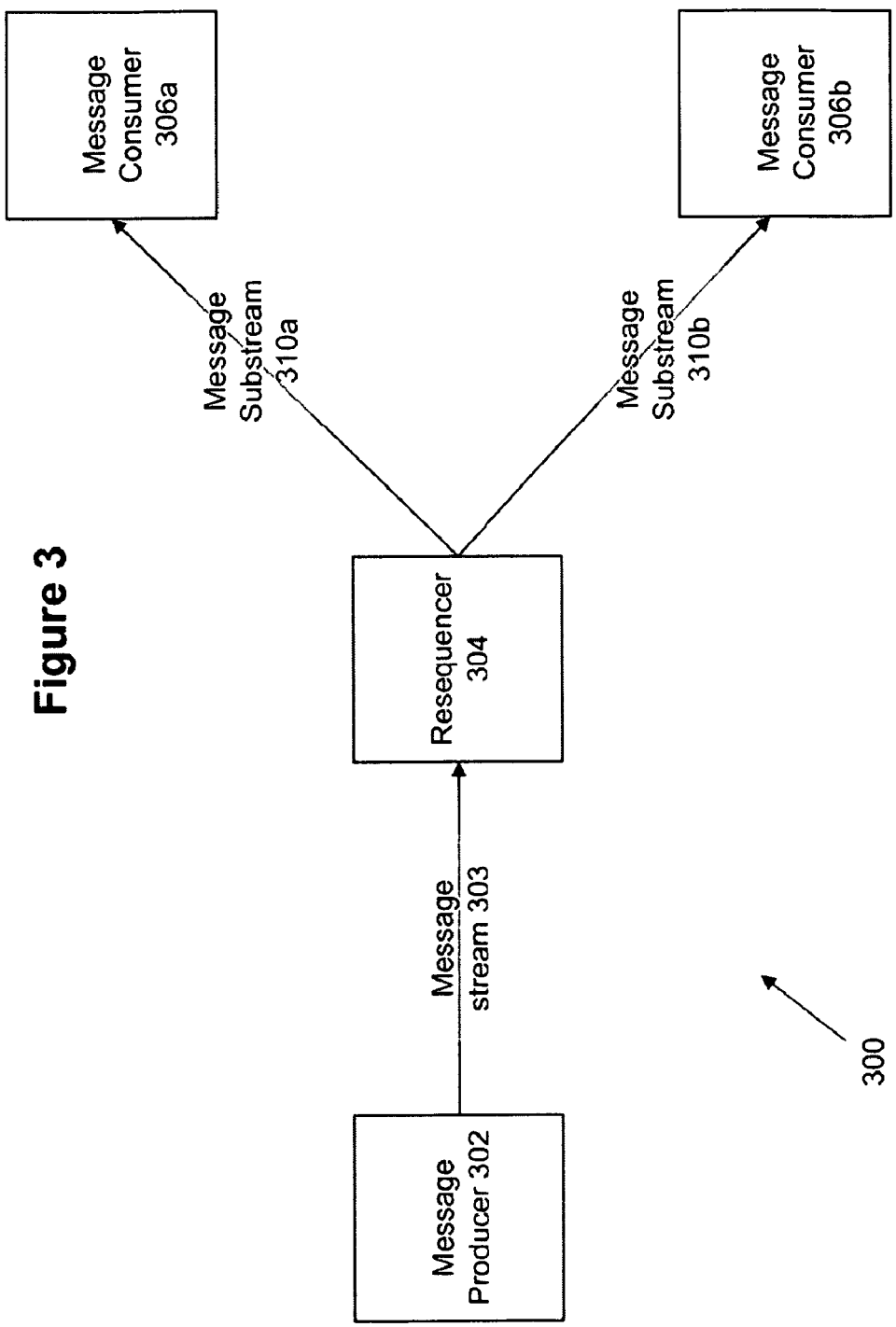
FIG. 3 illustrates a flow of message and the process of grouping messages into substreams of messages according to some embodiments of the invention.

FIG. 3 shows an architecture 300 of an example system for providing routing and grouping functionality with a resequencer according to some embodiments of the invention. A message producer 302 generates one or more messages 303 that may include multiple sets or groups of messages. In particular, the messages 303 may include multiple sets of messages intended for multiple message consumers 306a and 306b.

The resequencer 304 intercepts the message stream 303 before delivery to the message consumers 306a and 306b. The resequencer 304 will divide the message stream 303 into a set of multiple message substreams 310a and 310b. Each substream 310a and 310b will be independently ordered based upon sequencing criteria that may be different for different substreams.

Once the message stream 303 has been divided into the substreams 310a and 310b, routing can be performed to deliver the substreams 310a and 310b to appropriate message consumers. Here, message substream 310a is delivered to message consumer 306a and message substream 310b is delivered to message consumer 306b.

Figure 4:
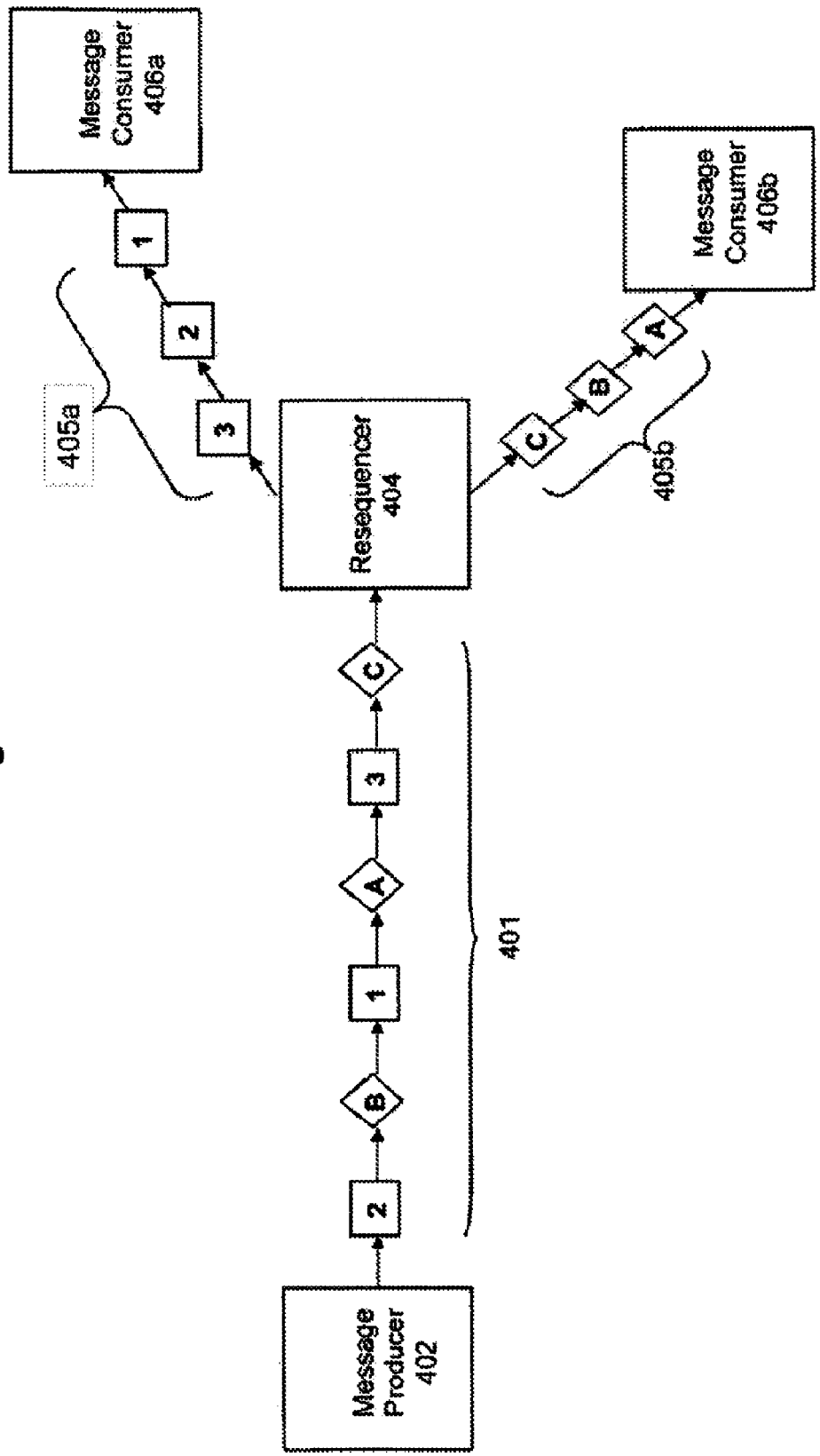
FIG. 4 illustrates grouping of messages into substreams according to some embodiments of the invention.

FIG. 4 provides an illustration of this process for subdividing a message stream. Assume that a message stream 401 containing multiple sets of messages is sent out-of-order from a message producer 402 to multiple message consumers 406a and 406b. For example, the message stream 401 is intended to be in two separate ordered sequences, where first message sequence includes a message 1 that is intended to be first, followed by a message 2 that is intended to be second, and then followed by a message 3 as the final intended message in the message sequence. The message stream 401 also includes a second message sequence that includes a message A that is intended to be first, followed by a message B that is intended to be second, followed by a message C that is intended to be last.

However, the message stream 401 may be sent where the messages for the two different substreams are mixed together in the message stream 401. Furthermore, the messages in the message stream 401 may be out-of-order. For example, as shown in the figure, message C may be sent first, followed by message 3, then message A, then message 1, followed by message B, and finally message 2.

The resequencer 404 receives the message stream 401 with the multiple mixed sequences, and sub-divides the message stream 401 into multiple substreams 405a and 405b based upon the specific group to which each message is associated. Assume that message consumer 405a is the intended recipient of the message group containing messages 1, 2, and 3 and message consumer 405b is the intended recipient of the message group containing messages A, B, and C. Here, resequencer generates the substream 405a that includes messages 1, 2, and 3 and generates substream 405b that includes messages A, B, and C. The resequencer 404 routes substream 405a containing messages 1, 2, and 3 to message consumer 405a and routes substream 405b containing messages A, B, and C to message consumer 405b.

Each of the substreams 405a and 405b are also correctly ordered before delivery to the message consumers 406a and 406b. Here, message substream 405a includes messages that arrived at the resequencer 404 in the order of message 3 first, then message 1 next, and finally message 2 last. These messages are reordered such that the message sub stream 405a delivered to message consumer 406a includes the messages in order of message 1 first, then message 2, and finally message 3 last. Similarly, message substream 405b includes messages that arrived at the resequencer 404 in the order of message C first, then message A next, and finally message B last. These messages are reordered such that the message substream 405b delivered to message consumer 406b includes the messages in order of message A first, then message B, and then finally message C last.

One issue addressed by some embodiments of the invention is how to recognize when messages should be grouped together and how to identify the particular sequence of messages within a group. Some embodiments of the invention provide an improved approach for implementing this type of information for messages for identifying such information for the messages.

One possible approach is to specify a sequence identifier and group identifier in the header of each and every message that is sent from a message producer to a message consumer. By including this information as part of the message metadata, the downstream components of the system are able to perform sequencing of the delivered messages. For example, version 1.02 of the Java Messaging Services (JMS) specification provides for setting of the JMS sequence and JMS group identifiers for messages using a (message) set*property ( . . . ) method.

One problem with this type of approach that it requires the message originator to create a message format that explicitly provides for sequence and group numbers as part of the message metadata. Every potential creator and consumer of such messages must forever be cognizant of and strictly comply with the exact format of such messages. If there is ever a need to update or upgrade the message format, then every user of that format must be made aware of the changed format. Given the possibility that such notifications may miss one or more users of the format, then there is the corresponding possibility of message failures as a result.

Moreover, this type of an approach adds an extra step in the process of generating messages, which could cause a significant amount of additional effort and expense that is required to insert such identifiers into message metadata. This is because this additional expense must be performed at runtime to each and every message that is sent within the system, creating a large amount of overhead to be incurred by the processing system. This creates a significant increase in the system overhead since each and every message will need to have the metadata created and inserted into the messages. Given the large number of messages that are generated by modern systems, the excess overhead can become quite costly.

In addition, this type of approach may also cause the size of the messages to increase. The possible increase in message size may be unacceptable to performance critical applications.

To address these issues, some embodiments of the invention utilize the payload of the message itself to provide information about the correct sequence or order of messages for resequencing, rather than relying upon header information for the message. The resequencer will use that information from the message payloads to determine the specific sequence in which the ordered messages should be delivered to the message consumer. The information from the message payload can also be used to identify the specific group or groups to which the message is associated.

Figure 5:
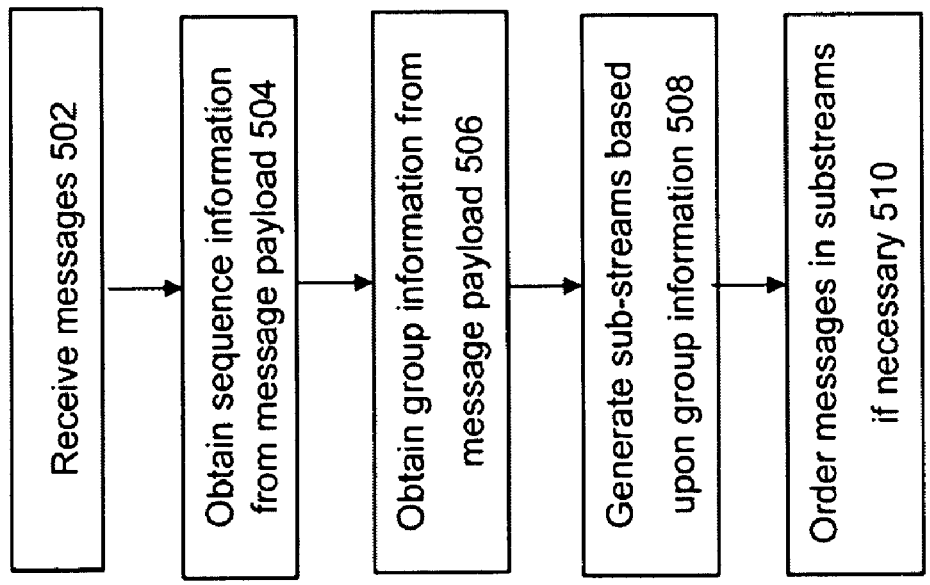
FIG. 5 shows a process for performing resequencing according to some embodiments of the invention.

FIG. 5 shows a flow of a process for obtaining sequence information from a message payload according to some embodiments of the invention. At 502, one or more messages are received which are to be operated upon by a resequencer. The one or more messages could be any type of message which may be sent or delivered in a sequence that is potentially out-of-order. For example, the received messages could be communications sent between application in an ESB architecture or through one or more middleware. Such messages could include, for example, messages in the EXTENSIBLE MARKUP LANGUAGE (XML) format.

At 504, sequence information is obtained from the message payload. According to some embodiments, expressions can be applied on the message payload to obtain the identifiers (e.g., group or sequence) that are used for resequencing. The resequencer can obtain the group identifier by applying the group identifier expression on the message payload. The sequence identifier can be obtained by applying the sequence identifier expression on the message payload. In some embodiments, expressions can be applied to the message header as well to obtain the sequence and/or group information.

It is important to note that the expressions and message data can be dynamically configured such that any portion of the message payload (or header) can be used to contain the sequence and/or group information. For example, the header portion may contain extra portions of un-configured data that can now be used to hold sequence and/or group information, which is extracted by an expressions configured to access such information. In addition, any suitable portion of the message body can be used to include the sequence and/group information, with one or more expressions being configured to extract that information.

Since the expressions can be applied at run-time, this means that the information can be dynamically configured within the message, allowing great flexibility in the way that the sequence and group information are transmitted. This allows the present approach to avoid the absolute requirement of fixed and unchanging fields in the message or message header to hold the sequence and/or group information. The expressions would be configured to access whatever portion of the message is configured to hold the sequence/group information. Moreover, the group and sequence identifiers can be easily changes in a dynamic way, e.g., at runtime. This provides numerous advantages. For example, the content and organization of the messages in specific message substreams can now be changed dynamically. This feature is also helpful when message interfaces are changed and the sequence/group information still needs to be extracted from the messages.

According to some embodiments, the invention can be implemented using XPath (XML path language) expressions that are applied on messages. XPath is a standard language defined by the World Wide Web Consortium (W3C) for selecting nodes from an XML document. The XPath language may also be used to compute values from the content of an XML document. XPath is an expression language that allows the processing of values conforming to the data model defined in die XQuery and XPath Data Model (XDM) Specification. Further information about the XPath language can be found in the XPath Language Specification, available from the W3C website at www.w3c.org, which is hereby incorporated by reference in its entirety. Information about the XPath Data Model and the XDM Specification are also available from the W3C website at www.w3c.org, which is hereby incorporated by reference in its entirety.

The XPath data model provides a tree representation of XML documents as well as atomic values such as integers, strings, and booleans, and sequences that may contain both references to nodes in an XML document and atomic values. The result of an XPath expression may be a selection of nodes from the input documents, or an atomic value, or any sequence allowed by the data model. The XPath language provides a way of performing hierarchic addressing of the nodes in an XML tree.

By selecting the appropriate node within an XML-based message, the XPath expression would be used to extract the appropriate sequence information from the message. Under certain circumstances, the sequence information may be related to multiple nodes within the XML-based message, where the combination of the multiple fields are analyzed to generate the sequence information for the message. In addition, the XPath expression may perform mathematical or transformative operations upon the retrieved information in the process of extracting the sequence information from the message.

Using this approach, at 506, the group information for the message can also be extracted from the message payload. As with the sequence information, the group information may be embedded at a node within an XML-based message which is extracted using an XPath expression.

At 508, multiple sub-streams of messages may be created by the resequencer based upon the group information. The group identifier information extracted from the message payload is used to group different sets of messages together such that each set of messages having the same group identifier are placed within the same message substream.

If the messages within the substreams are out-of-order, then at 510, the messages in the substreams are correctly ordered. The messages in the message substreams are ordered based upon the sequence information that was extracted from the message payload, e.g., as described with respect to 504.

Figure 6:
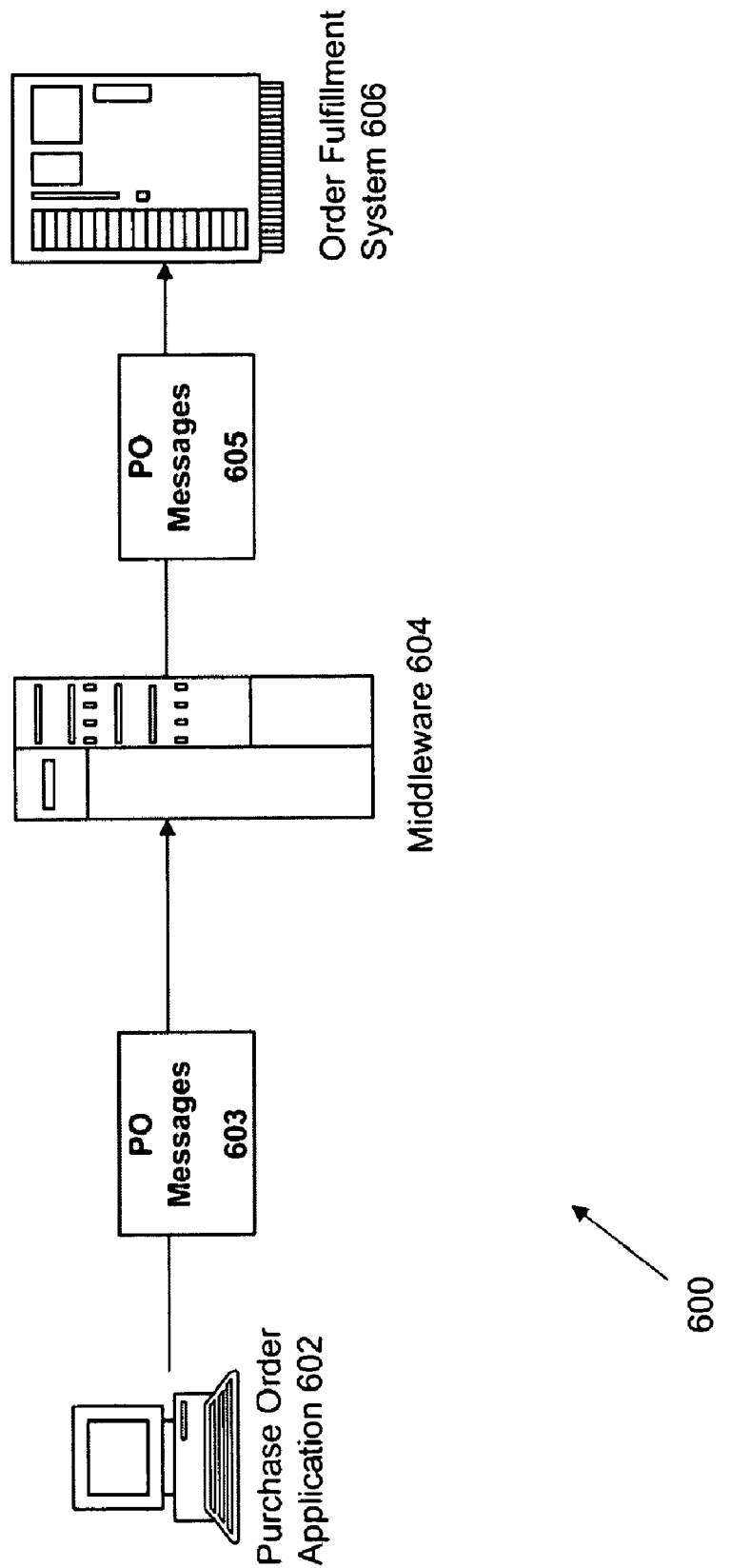
FIG. 6 illustrates an example resequencer architecture according to some embodiments of the invention.

To illustrate this process, consider the example of a system that is set up by a company to create and process customer purchase orders. FIG. 6 shows the architecture of an example system 600 in a purchase order application 602 that may be used to generate purchase order messages 603 based upon sales activities initiated by customers at an e-commerce site. There are multiple customers that may be using the purchase order application 602 at the e-commerce site, and therefore the purchase order messages 603 may be in a stream containing messages corresponding to multiple customers.

The purchase order messages may be sent to an order fulfillment system 606 to process the customer orders. The purchase order messages may be handled and forwarded by middleware 604 that reside on one or more middle tier server devices, which sends resequenced purchase order messages 605 to the order fulfillment system 606.

Assume that the purchase order messages are sent in groups of two messages, such that the messages in any particular substream may be either the first ("1 of 2") or last ("2 of 2") of a set of two messages in a substream. Further assume that the substreams are grouped based upon the name or ID of the customer corresponding to the purchase order.

Figure 7:
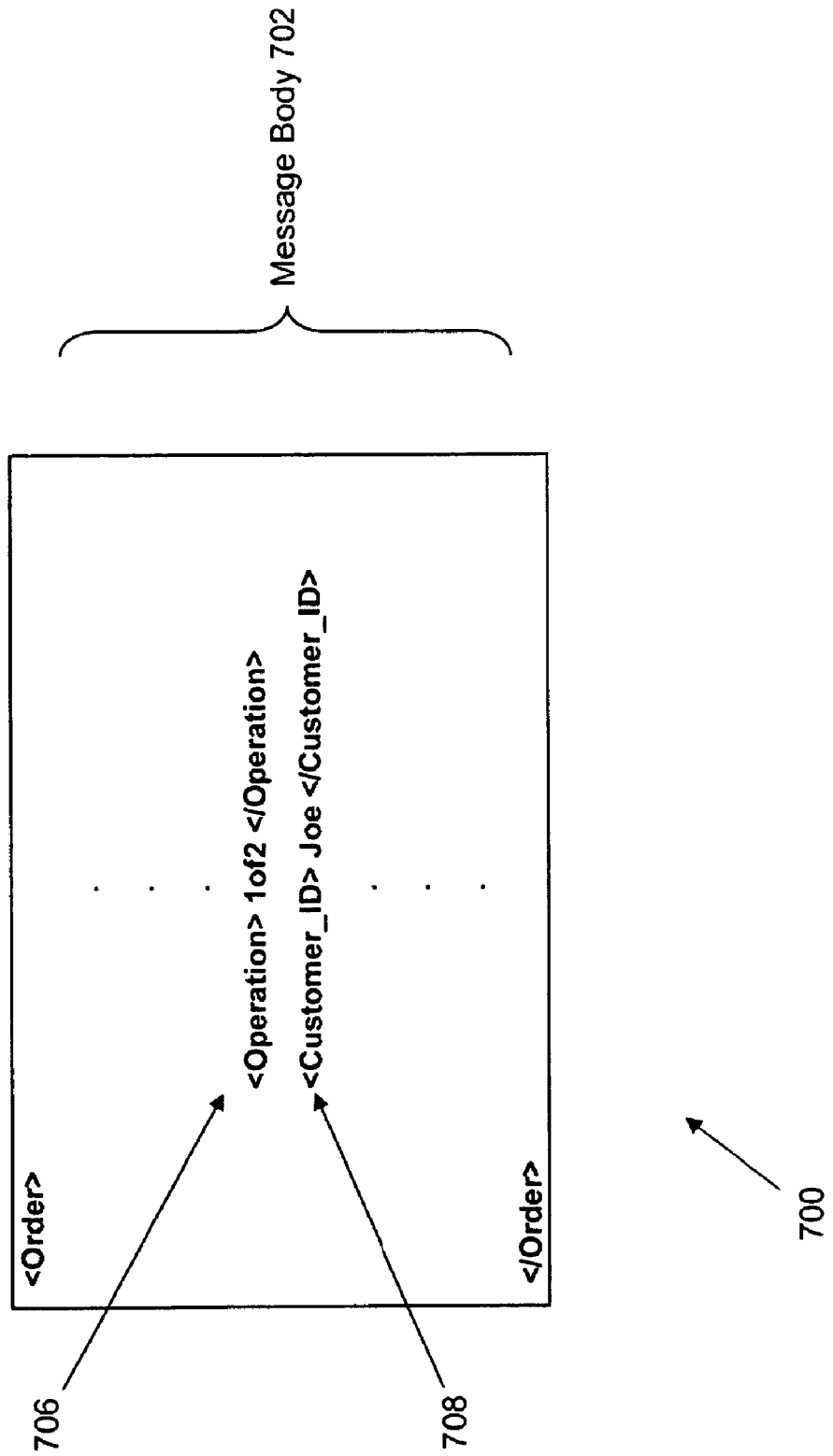
FIG. 7 illustrates an example message that includes group and sequence identifier information in the message body according to some embodiments of the invention.

FIG. 7 shows an example XML message format 700 that can be used to implement messages for this purchase order example. Each message includes a message body 702 containing the message payload as well as a separate message header. The message body 702 includes nodes that contain the sequence and group information for the message.

In the present example, the <Operation> node 706 corresponds to the sequence identifier for the message. Therefore, the value of this field in the XML message will include sequence information for the message, e.g., "1 of 2" or "2 of 2". The value of the expression for this node will be used to extract the sequence identifier for the message. In this example, the following XPath expression would be used to extract the sequence identifier:

/Order/Operation

The result of applying this XPath expression to the message 700 of FIG. 7 would result in the sequence identifier value "1 of 2" being extracted from the message.

The <Customer_ID> node 708 corresponds to the group identifier for the message. As such, the value of this field in the XML message will include group information for the message, e.g., the name or identifier for the particular group that is associated with the message. The value of the expression for this node will be used to extract the group identifier for the message. In this example, the following XPath expression would be used to extract the group identifier:

/Order/Customer_ID

The result of applying this XPath expression to the message 700 of FIG. 7 would result in the group identifier value "Joe" being extracted from the message.

Assume that the following four messages are generated by the illustrative purchase order system and are received by a resequencer in the order of Message 1, then Message 2, followed by Message 3, and finally Message 4:

Message 1:

```
<Order>
    .
    .
    <Operation> 2 of 2 </Operation>
    <Customer_ID> Bob </Customer_ID>
```

-continued

```
        .
        .
        .
    </Order>
```

Message 2:

```
    <Order>
        .
        .
        <Operation> 1 of 2 </Operation>
        <Customer_ID> Steve </Customer_ID>
        .
        .
    </Order>
```

Message 3:

```
    <Order>
        .
        .
        <Operation> 2 of 2 </Operation>
        <Customer_ID> Steve </Customer_ID>
        .
        .
    </Order>
```

Message 4:

```
    <Order>
        .
        .
        <Operation> 1 of 2 </Operation>
        <Customer_ID> Bob </Customer_ID>
        .
        .
    </Order>
```

By applying the XPath expression "/Order/Customer_ID" to the messages, the group identifier for each message can be extracted to identify the substreams to which each message belongs. Here, extracting the information from the "Customer_ID" field of each message, it can be seen that both message 1 and message 4 correspond to the same group identifier associated with user "Bob". It can also be seen that both messages 2 and 3 correspond to the same group identifier associated with user "Steve". Therefore, the above messages can be sub-divided into two separate message substreams, with a first message substream for messages 1 and 4 for group "Bob" and a second message substream for messages 2 and 3 for group "Steve".

Within each message substream, the messages are ordered if necessary to make sure that the messages sent to the order fulfillment system are delivered in the correct order. For the message substream for user "Bob", the messages are received at the resequencer in the order of first Message 1 and second message 4. By applying the XPath expression "/Order/Operation" to the messages, the sequence identifier for each message can be extracted to identify the ordering and sequence of the messages in the substreams.

Here, extracting the sequence information from the "Operation" field of each message, it can be seen that message 1 has a sequence identifier of "2 of 2" and message 4 has a sequence identifier of "1 of 2". Therefore, message 4 is the first message in the sequence and message 1 is the second message in the sequence for user "Bob". However, the messages were received in the opposite order—message 1 was received at the resequencer before message 4. Therefore, re-ordering is performed before the messages for user "Bob" are delivered to downstream components of the system, such as the order fulfillment system for purchase order messages. In this situation, re-ordering is performed to make sure that message 4 is delivered prior to deliver of message 1 to the downstream components.

Similarly, for the message substream for user "Steve" that includes messages 2 and 3, the messages payloads are reviewed to determine whether or not the messages should be re-ordered. As before, by applying the XPath expression "/Order/Operation" to the messages associated with user "Steve", the sequence identifier for each message can be extracted to identify the ordering and sequence of the messages in the substream.

Extracting the sequence information from the "Operation" field of each message, it can be seen that message 2 has a sequence identifier of "1 of 2" and message 3 has a sequence identifier of "2 of 2". Therefore, message 2 is the first message in the sequence and message 3 is the second message in the sequence for user "Steve". In this example, the messages were received in the correct order, since message 2 was received at the resequencer before message 3. Therefore, re-ordering does not need to be performed before the messages for user "Steve" are delivered to downstream components of the system. This is because the original ordering of the messages is correct as received by the resequencer, and can therefore be sent out from the resequencer in that order to downstream components.

This aspect of the invention simplifies the process of specifying the group and sequence identifiers for resequencing. Instead of specifying the sequence and group identifier for every message by inserting the information into the message headers, the users of a resequencer only have to specify a sequence identifier expression and a group identifier expression. This provides a significant improvement for obtaining sequence and group identifiers and provides the users the flexibility of using expressions to generate sequence or group identifiers that are a combination of different parts of the message.

The above text describes how to extract and use sequence and group information from a message payload. This document will now describe a process for creating messages having this information in the message payload. It is noted that while the present embodiment discloses a process for inserting this information, in other embodiments this information is in and part of the payload itself and does not need to be specifically inserted. Instead, the resequencer user only needs to provide an expression which is applied upon the payload to obtain sequence and group information. Therefore, the following explanation is only used in certain embodiments for which it is desired to perform an explicit insertion of such data into the payload.

Figure 8:
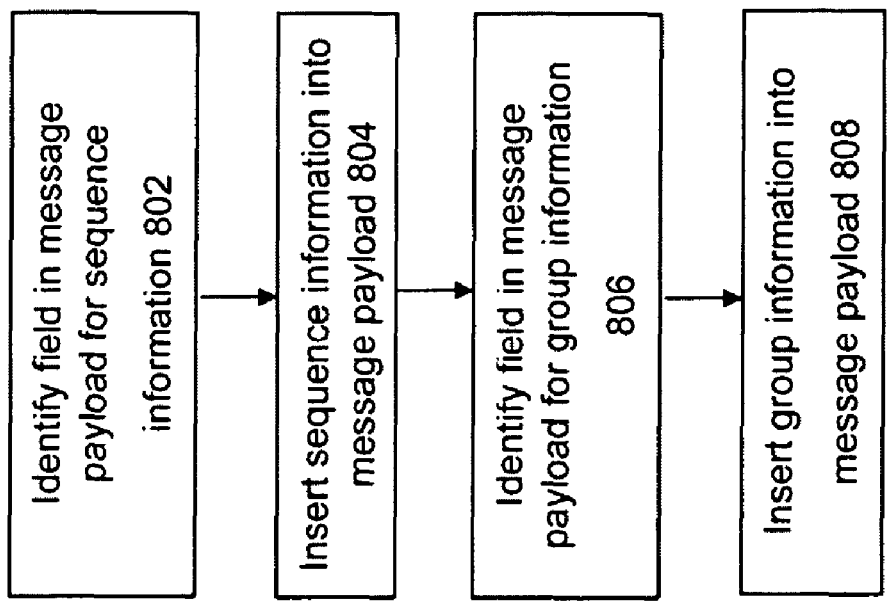
FIG. 8 shows a process for inserting group and sequence identifier information into the message body according to some embodiments of the invention.

FIG. 8 shows a flow of a process for generating messages having sequence and group information in a message payload, according to some embodiments of the invention. At 802, the process begins by identifying the specific field or fields in the message which relate to the sequence information. For messages that are implemented with XPath-compliant XML, one or more nodes within the messages are designated as the fields that correspond to the sequence information.

Next, at 804, the sequence information for the message is inserted into the identified field within the message payload. As previously noted, it is possible that the sequence information for a message is based upon a combination of multiple information items spread within a message. Therefore, 804 may involve insertion of multiple data items into different fields within a message payload. For a message that is analyzed using XPath expressions, the sequence information should be inserted into the message in a manner that is compliant with XPath formats and specifications. XPath can be used to compute the sequence information from data already placed into the message. For example, one or more items of information in the message, not specifically inserted into message payload as extra data, can be combinatorially, mathematically, textually, or sequentially changed to compute the desired sequence information.

At 806, the process identifies the specific field or fields in the message which relate to the group information. If the message is implemented with XPath-compliant XML, one or more nodes within the messages are designated as the fields that correspond to the group information.

The group information for the message is included, at 808, into the identified field within the message payload. Similar to sequence information, it is possible that the group information for a message is based upon a combination of multiple information items spread within a message. Therefore, 808 may involve multiple data items in different fields within a message payload. For a message that is analyzed using XPath expressions, the group information should be inserted into the message in a manner that is compliant with XPath formats and specifications. As with the sequence information, XPath can be used to compute the group information from data already placed into the message. For example, one or more items of information in the message not specifically inserted into message payload as extra data can be combinatorially, mathematically, textually, or sequentially changed to compute the desired group information.

A resequencer operates based upon a specified order for a group of messages. For a series of messages having numerical identifiers without gaps, it is an easy exercise to analyze the messages to determine the order of the messages. For example, if the messages must always be in a sequential numbered order, and the sequence identifiers are integers starting with the number "1", then the order of the messages proceed from the message having the sequence identifier "1", followed by the message having the sequence identifier "2", then "3", then "4", and proceeding through each successive number in order.

However, in the real-world, it may not always be sufficiently convenient, efficient, or user-friendly to employ sequence identifiers that are numeric in nature without any gaps. In many cases, a developer or user would like the option of being able to define the specific values that are used to identify the sequence of messages in a way that can be readily applied or understood in the context of the application being implemented.

For example, consider the typical database application for implementing purchase orders. Rather than using a set of numerical sequence identifiers that fail to provide intrinsic meaning, the developer or user may wish to use identifiers that intelligently correspond to the purpose or context of the message. Examples of meaningful identifiers that may be used to sequence purchase order messages include terms such as "create purchase order", "delete purchase order", and "update purchase order".

Any such messages that correspond to these contexts must be handled by downstream components in the correct order. Clearly, it is important that the message to "create" a purchase order be processed prior to any subsequent messages to either "update" or "delete" that same purchase order. If not, then a significantly fatal or otherwise damaging error may occur in the processing system.

One possible approach is to inform the resequencer of the sequence of messages is to provide a user implemented callback function. The callback function is used to inform the resequencer about the new order for incoming messages. In operation, the resequencer would call the callback function to determine the next sequence identifier in the sequence.

Another possible approach is to provide sequence metadata that is used by the resequencer to analyzer the sequence information in the messages. The sequence metadata is used to determine an ordering of the messages being resequenced.

Figure 9:
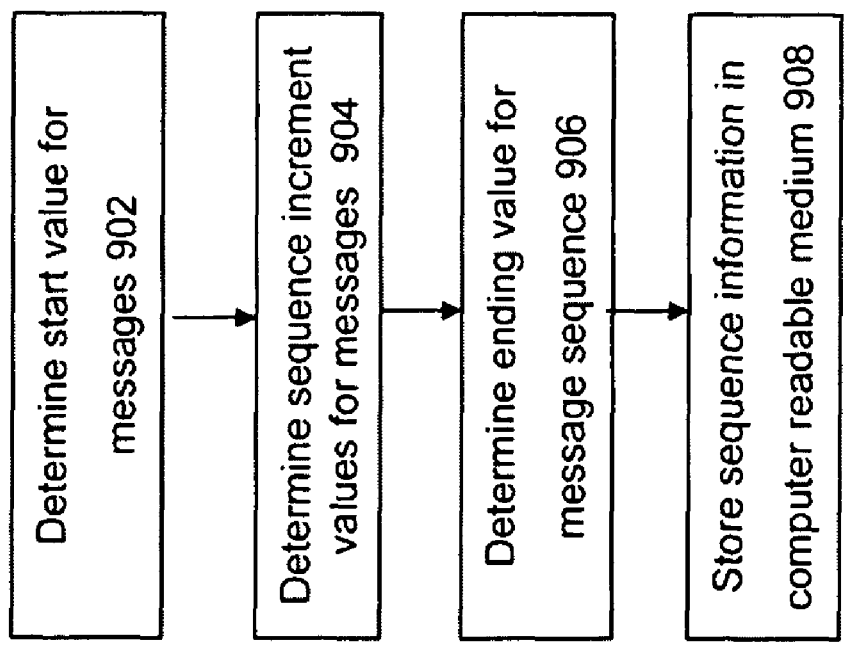
FIG. 9 shows a process for setting sequence information for messages according to some embodiments of the invention.

FIG. 9 shows a flowchart of a process for implementing this embodiment of the invention. According to this process, at 902, a determination is made of the start value for a sequence of messages. The start value corresponds to the sequence identifier for the first message of a sequence of messages.

At 904, sequence increment values are determined for the sequence of messages. The sequence increment values identify the incremental ordering of the messages within the sequence of messages. For example, a developer or user for a purchase order application may decide to that the sequence identifier "update" should be identified as the subsequent incremental value after the sequence identifier "create".

The incremental values do not have to be absolute values. According to some embodiments, numerical or combinatorial calculations or formulations may be performed to generate comparative sequence values that are used to decide the incremental nature of the messages in a sequence. For example, date fields may be extracted from the message body and employed as all or part of the sequence identifiers. Since the date values for specific messages are likely not known at the time that the sequence metadata is created, the sequence metadata would not only include absolute values as the incremental sequence values. Instead, the sequence metadata would specify these types of identifiers as sequence values that should be ordered based upon common ordering conventions, e.g., a message dated Oct. 2, 2008 would be ordered to be subsequent to a message dated Oct. 1, 2008.

At 906, there could be a determination of the ending value for a message sequence. The ending sequence value is used to identify the last message in a sequence. According to some embodiments, messages sequences can be defined which do not have an ending sequence values. Such open-ended sequences may be used for messages streams that could theoretically extend without an ending.

At 908, the sequence metadata is stored in a computer readable medium accessible by the resequencer. When messages are being processed by the resequencer, the message metadata would be accessed to analyze messages, and to determine the correct sequence in which the messages are to be ordered.

Figure 10:
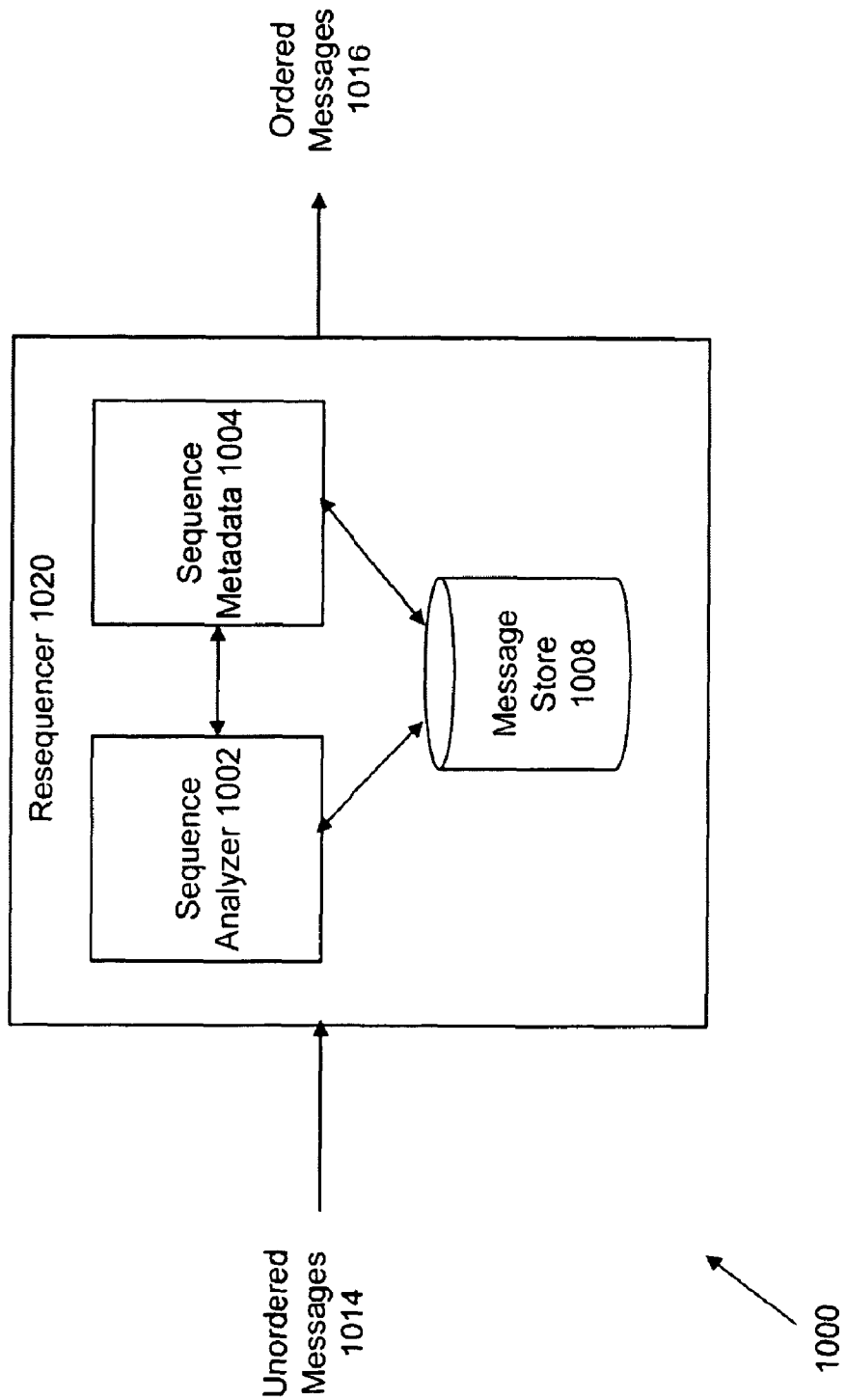
FIG. 10 illustrates internal architectural details for a resequencer according to some embodiments of the invention.

FIG. 10 shows an architecture of a system 1000 for utilizing sequence metadata to resequence a stream of messages according to some embodiments of the invention. System 1000 includes a resequencer 1020 that receives an unordered message stream 1014, and orders the messages to create an ordered stream 1016 of messages. A message store 1008 exists to cache the messages from the message stream 1014.

Resequencer 1020 has access to sequence metadata 1004 that has been created to inform the resequencer of an order of messages to be analyzed by the resequencer 1020. The sequence metadata 1004 comprises sequence increment information, as well as possibly sequence start and end information for the sequence of messages 1014.

A sequence analyzer 1002 is responsible for extracting sequence information from the incoming message stream 1014, e.g., using the approach described with respect to FIG. 5. The extracted sequence information is then analyzed using the sequence metadata 1004 to determine whether any of the received messages from the message stream 1014 are out-of-order. If so, then the resequencer 1020 will re-order the messages prior to delivering an ordered message stream 1016 to any downstream components.

Figure 11:
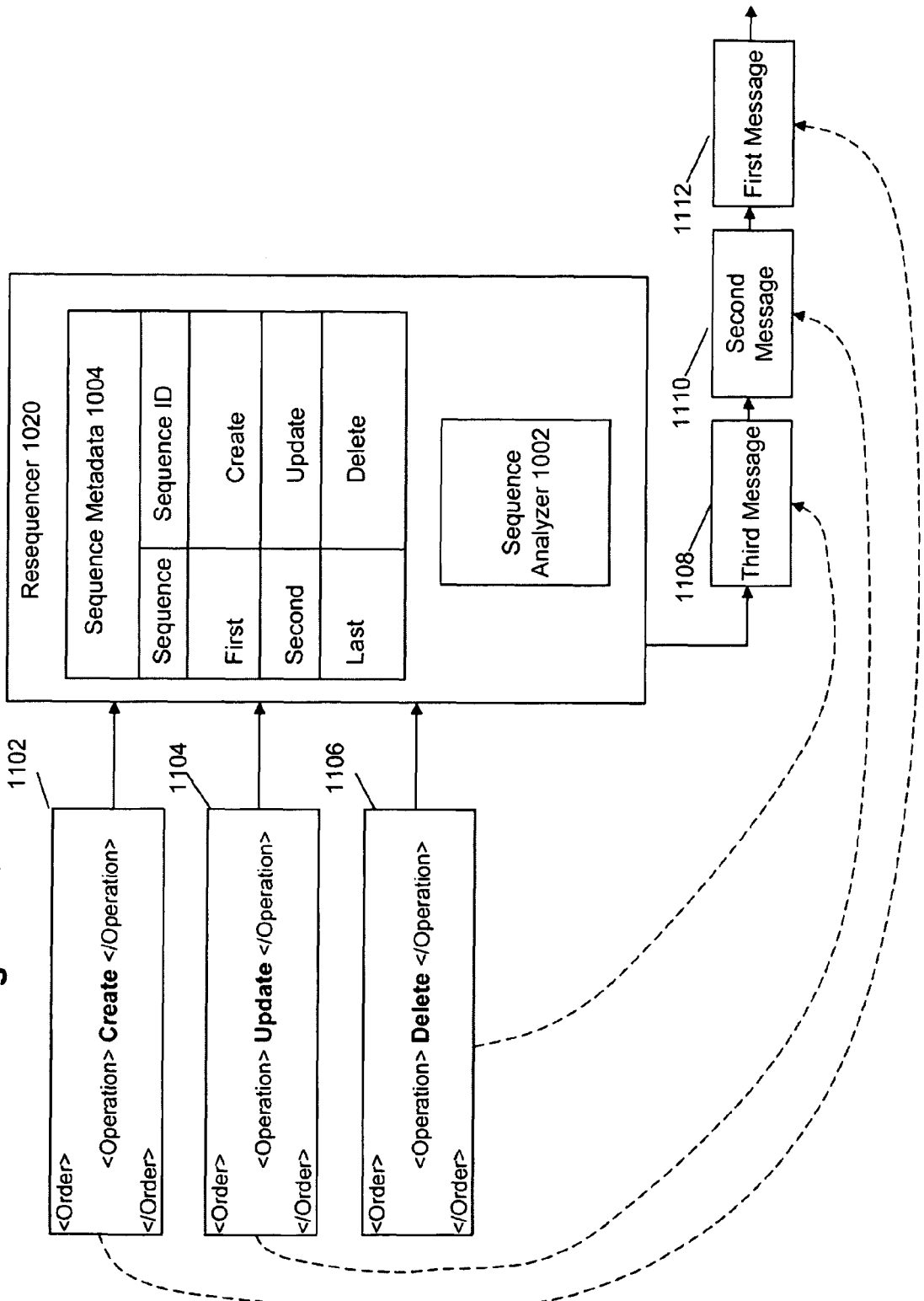
FIG. 11 illustrates an example message sequence according to some embodiments of the invention.

FIG. 11 illustrates this approach used to process a set of messages having non-numeric sequence identifiers. For purposes of this example, assume that an upstream application is creating a stream of messages 1102, 1104, 1106 relating to a purchase order, in which the messages may be used to create, update, or delete the purchase order.

Sequence metadata 1004 is created to inform the resequencer of the order that should be imposed on the incoming messages 1102, 1104, 1106. The sequence metadata 1004 in this example identifies the sequence values corresponding to the first, second, and last messages in the sequence. Here, the sequence identifier "create" corresponds to the first message in the sequence, the sequence identifier "update" corresponds to the second message in the sequence (if it exists), and the sequence identifier "delete" corresponds to the final message in the message sequence. Therefore, when the upstream component creates the messages 1102, 1104, and 1106, these are the sequence identifier values that should be inserted into the messages 1102, 1104, and 1106. The approach described in conjunction with FIG. 8 may be used to insert these sequence identifiers into the messages.

The resequencer 1020 will extract these sequence identifiers from each of the messages 1102, 1104, and 1106. Here, message 1102 is associated with the "create" sequence identifier, the message 1104 is associated with the "update" sequence identifier, and the message 1106 is associated with the "delete" sequence identifier.

The sequence analyzer 1002 within resequencer 1020 analyzes the extracted sequence identifiers to determine whether the messages 1102, 1104, and 1106 need to be resequenced. If so, then the incoming messages are re-ordered to ensure that the first message 1112 delivered by the resequencer is message 1102 corresponding to the "create" sequence identifier. The first outbound message 1112 is followed by the second message 1110 is the message 1104 corresponding to the "update" sequence identifier. The final message 1108 delivered by the resequencer 1020 is message 1106 corresponding to the "delete" sequence identifier.

Multiple fields within a message may be considered in combination to generate a sequence identifier. This may be desirable, for example, if the developer or user wishes to order the sequence of messages based upon multiple fields in message payload. This may also be desirable if the main sequence identifier field is susceptible to duplicate values across multiple messages.

FIG. 12 provides an illustration of this approach used to process a set of messages using multiple message fields. For purposes of this example, assume that an upstream application is creating a stream of messages 1202, 1204, 1206 relating to a purchase order, in which the messages are all used to update the purchase order. The <Operation> node within the messages is used to hold sequence information for the messages.

In this situation, since all the messages are used to update the purchase order, the XPath expression "/Order/Operation" will return the exact same value of "update" when application to the three messages 1202, 1204, and 1206. This is because the <Operation> node for all three messages 1202, 1204, and 1206 are identical, since all three messages are performing update operations.

To address this issue, multiple nodes/fields within the messages can be used to generate a sequence identifier. In particular, another node <Operation_No> is employed in conjunction with the <Operation> node to create the sequence identifier. The <Operation_No> node identifies the numeric order of an update operation relative to other update operations. Alternatively, other types of values may also be used to identify the relative order of the update operations. For example, timestamp values could be embedded as nodes/fields in the message and used in conjunction with the <Operation> node values to create a sequence identifier.

The sequence metadata 1004 informs the resequencer 1020 of the order that should be imposed on the incoming messages. In this example, the "Next" field in the sequence metadata 1004 identifies a combination of the <Operation> node value plus the <Operation_No> node value as the combined sequence identifiers for the incremental messages between the start and end messages.

Based upon the combination of the <Operation> node value and the numeric <Operation_No> node values, the resequencer 1020 in this example can determine that message 1202 should be delivered first, followed by message 1204, and lastly by message 1206.

FIG. 13 shows the internal architecture of a resequencer 1302 according to some embodiments of the invention. The resequencer 1302 performs work using any suitable processing entity (e.g., threads, processes, or tasks) which is hereinafter referred to as "threads". The threads perform the work of processing incoming messages 1314 received from upstream components to create one or more ordered sets of messages 1316 for deliver to downstream components. Multiple types or categories of threads maybe employed in conjunction with the resequencer 1302. For example, worker threads 1304 may be employed to perform the actual work of analyzing and sequencing messages. Lock threads 1302 may be used to handle locking of resources to avoid inconsistent access or changes to data. Other and additional types of threads may also be employed in conjunction with the invention. For example, as described in a section further below in this document, "heartbeat" threads may be employed to check the status of other threads, and to perform error handling upon the failure of other threads.

Messages that are received by the resequencer are stored in a message store 1308. The message store 1308 may comprise any type of hardware/software structure that is capable of storing a set of messages. According to some embodiments, the message store 1308 is a relational database product that stores data onto a hardware-based computer storage medium. An exemplary database product that may be used to implement the message store 1308 is the Oracle 11G database product, available from Oracle Corporation of Redwood Shores, Calif. The message store 1308 may be an internal component of the resequencer 1302, or it may be implemented as a mechanism that is external to the resequencer 1302.

The resequencer comprises a group status structure 1312 that stores status information for the different groups of messages corresponding to the different substreams undergoing processing by the resequencer 1302. Such status information includes, for example, information about the last message that was sent for the group such as sequence identifier information and timestamp information. The information can be used to decide the next message that should be delivered.

The message map can be used to find a message given a group identifier and a sequence identifier. A message map 1310 contains information about the messages received by the resequencer 1302, e.g., the messages received and stored in the message store 1308. Information that could be stored in the message map 1310 includes, for example, the group identifier and sequence identifier for the messages.

FIG. 14 shows a flow of a process for handling incoming messages received by the resequencer using the architecture of FIG. 13, which is also referred to as the "enqueue" process for new messages. At 1332, an incoming message from a message producer is received by the resequencer. When a message arrives at the resequencer, that message is placed for storage into the message store (1334).

At 1336, the sequence and group identification information are extracted for the message. According to some embodiments, XPath expressions are applied to extract this information from the message payload of XML-based messages, where the sequence and group information are stored within nodes or fields of the XML-based messages. The message map is modified to include an entry for the new message. The extracted group and sequence information is stored within the entry for the new message in the message map (1338).

A determination is made at 1340 whether the new incoming message corresponds to an existing group already recognized at the resequencer, or whether the message corresponds to a new group that has not yet been processed by the resequencer. If the message corresponds to a new group identifier, then a new entry is created in the group status structure for the group identifier (1342). On the other hand, if the message corresponds to a known group identifier which already has an entry in the group status structure, then a new entry does not needs to be created in that structure for the new message. Instead, the arrival of the message may cause a change in group status that could require a modification of the entry for that group in the group status structure, e.g., a change to the timestamp of a latest message to be sent out for subsequent delivery.

FIG. 15 shows a flow of a process for processing messages by the resequencer after the messages have been enqueued by the process of FIG. 14 (also referred to as the "dequeue" process). The process is performed on a group-by-group basis to avoid creating inconsistencies in the message data. Therefore, at 1502, a lock thread locks the metadata associated with the particular group being handled. Any suitable locking approach may be employed within the scope of the invention. According to some embodiments, a lock column is implemented within the group status table, where the lock thread uses the lock column to exclusively lock the group metadata such that only one worker thread at a time can hold the lock and be permitted to operate upon the group. The group identifier can be placed into a shared queue, where a worker thread can then obtain that group identifier to begin processing.

At 1504, the worker thread accesses the group status table to obtain the latest status information for the group being operated upon. Such status information includes, for example, information about the last message that was delivered to a downstream component for that group, such as the sequence identifier or timestamp for that last delivered message. According to one embodiment, after the group is locked, it is at this point that the worker thread accesses the information places it into the shared queue.

At 1508, the worker thread uses the group status information to iterate through the messages in the message store to identify the next one or more messages from the message store that should be sequentially processed for delivery to downstream components. The messages are processed based upon any number of different sequence methodologies (1510). Examples of different sequencing methodologies that may be employed in conjunction with embodiments of the invention include first-in-first-out (FIFO) sequencing 1512, standard ordered sequencing 1514, and best efforts sequencing 1516.

FIFO sequencing generally refers to a sequencing approach in which messages are processed in the order in which they arrive. FIG. 16 shows an example process that may be used to implement FIFO sequencing. The process begins by obtaining the unprocessed messages for the particular group under examination (1602). This can be accomplished by searching through the message store for any messages corresponding to the group identifier for the group being processed. The message map can be used to identify the messages, since it includes group identifier information that allows searching and mapping of the messages that correspond to a specific group identifier.

Next, at 1604, the unprocessed messages for the group are sorted in the order of their arrival times (1604). On approach for performing this sorting task is to sort the messages based upon their incoming timestamps.

At 1606, a set of one or more messages are selected to be delivered. Any number of messages may be selected for delivery to the downstream components. However, given the expense of perform database and message processing operations, it is often more efficient to process multiple messages at the same time for delivery. Therefore, at 1606, the top N messages will normally be selected for delivery, where N corresponds to a suitably efficient number of messages to be processed, depending upon the specific system, network, and environmental parameters for the system with which the resequencer is implemented. By appropriately configuring N the resequencer provides load balancing. The selected messages are then delivered in the FIFO order at 1608.

Standard sequencing is performed sequencer a set of messages in a standard numerical or user-specified order. FIG. 17 shows an example process that may be used to implement standard sequencing. The process begins by identifying the last message for the group that was delivered to the downstream components (1702). The group status table can be accessed to obtain this information, including the sequence identifier for that last message which was delivered.

At 1704, a determination is made of the sequence identifier for the next message in the specified ordering of messages. For example, if the messages are numerically ordered in sequence, and if the last message that was delivered was message number "2", then the next expected message to deliver will have a sequence number of "3". If no previous message has yet been delivered for the group, then the next sequential messages for the present processing should be the message corresponding to the very first sequence number/identifier.

As previously discussed, any number of messages may be selected for delivery to the downstream component, since given the expense of perform database and message processing operations, it is often more efficient to process multiple messages at the same time for delivery. Therefore, at 1706, the sequence identifier for the Nth message in the sequence of messages is identified, where N corresponds to a suitably efficient number of messages to be processed, depending upon the specific system, network, and environmental parameters for the system with which the resequencer is implemented.

At 1708, a selection is made of the unprocessed messages corresponding to sequence identifiers that are in the range from the next expected message (identified at 1704) to the Nth message (identified at 1706). The message map can be searched to identify the messages for a given group having sequence identifiers in this range. The selected messages are retrieved from the messages store, and are delivered at 1710 to the downstream components.

Best efforts sequencing is another sequencing approach that can be used to group messages together for delivery. It is often desirable to wait until the entire set of messages is collected together before undergoing processing. This avoids the situation in which an important message is left out from the group processing because it arrives later than the other messages.

The problem is that it is often difficult or impossible to know if there are any messages that are missing from the set of messages to be processed. This is because there may be a non-contiguous sequence of identifiers for the messages in the message stream. For example, consider a set of messages in which the messages are created with a timestamp as the sequence identifier. A first message arrives that has 1:00 PM as its sequence identifier and a second message arrives that has 1:02 PM as the second message's sequence identifier. Because these are non-contiguous identifiers, it is completely unknown whether or not there are any other messages that may be arriving which correspond to a timestamp between 1:00 PM and 1:02 PM.

Because it is unknown whether any further messages will arrive for the group, it becomes very impractical to wait for an unlimited period of time for additional messages to arrive. One possible approach to address this problem is to implement a skip on time Out facility to handle non-contiguous identifier sequences. In this approach, the non-contiguous sequence is approximated by a contiguous sequence. The resequencer waits for every identifier in the contiguous sequence for a configurable time-out period. If the resequencer does not receive a message with the specific sequence identifier in the time-out period then it presumes that message will never arrive and moves over to handle message with the next identifier in the sequence. Another approach is to wait for N time units to create a batch of messages. The resequencer sorts the messages in the batch on the sequence identifier and processes the messages in the increasing order of the sequence identifier. The problem with these approaches is that they ignore a key characteristic often seen in messages, where the messages are delivered in a somewhat "bursty" in nature, in which multiple individual messages that are linked together are sent over the network over a very short duration of time. Therefore, a static time-out or N unit waiting facility may fail to catch all the late messages if the burst of messages begin arriving towards the tail end of the time-out or waiting periods.

According to some embodiments of the invention, the problem is addressed by keeping a time window open for new messages if a new message is received during the duration of that time window. If no new messages are received in the time window, then the window is closed and the messages already received are processed. If, however, any new messages are received while the window is open, then the time window restarts and waits for additional new messages.

This approach is based upon the resequencer creating a batch of messages that are ready to be processed. The batch of messages is processed if no new messages are received in N time units after the last message in the batch. The resequencer sorts the messages in this batch on the sequence identifier, picking up the messages with the smallest sequence identifier and processes it for delivery. According to some embodiments, the resequencer will wait for every identifier in the contiguous sequence for a configurable time-out period. If the resequencer does not receive a message with the specific sequence identifier in the time-out period then it presumes that message will never arrive and moves over to handle the message with the next identifier in the sequence.

FIG. 18 shows a flow of a process for implementing best efforts sequencing according to some embodiments of the invention. At 1802, a waiting period of N time units is selected for the best efforts sequencing. Any suitable number of time units can be selected for the waiting period.

At 1804, a check is performed to determine if any new messages have been received for the group under examination. This check can be accomplished by analyzing the message store to see if new messages have been received and deposited into the message store. Alternatively, the message map can be reviewed to identify if any messages having a recent timestamp has been received and entered as a new entry in the message map. If any new messages have been identified at 1806, then the waiting period is restarted at 1808 to allow further waiting for new messages.

If no new messages have been received, then a check of the time period is made at 1810. If the time period is not yet over, then the process returns back to 1804 to continue to check for new messages. A suitable waiting period may occur before returning back to 1804 to check for new messages. If the time period has completed without any new messages, then at 1812, the unprocessed messages that have already arrived are selected for processing and delivery.

The present best efforts approach provides a sequencing approach that much more closely approximates real-life usage pattern of messages, where sets of messages are generated in a short period of time and send to the resequencer for ordered delivery. The solution provides better performance compared to the approach of approximating the non-contiguous sequence with a contiguous sequence.

According to some embodiments, a smart filter can be implemented to extend the best efforts time period under certain conditions. The smart filter checks for the presence of any missing messages in the local message store, which may be caused, for example, by having messages arrive out-of-sequence. For example, a sequence of messages may require a first message in the sequence to be a "Create" operation, followed in sequence by an "Update" operation message, and followed by a "Delete" operation message. If the local message store only includes the "Update" and "Delete" messages and has not yet received the "Create" message, then it is clear that the messages have arrived out of order, but that it is likely the "Create" message will be arriving in the near future. Upon detection of this circumstance, the best efforts time period can be extended until the missing message has been received. According to an alternate embodiment, a threshold time limit is implemented, such that the best efforts time period is extended only up to the time limit even if the missing message has not been received.

An illustrative example will now be provided of sequence processing by a resequencer using the above-described architecture and processes. FIG. 19A shows an example sequence of messages that may be received in a message stream 1440 by a resequencer. The message stream 1440 contains multiple groups of messages that may have been received out-of-order from a message producer. For example, the message stream 1440 in FIG. 19A is intended to be in two separate ordered group sequences, where first message sequence includes a message 1 that is intended to be first, followed by a message 2 that is intended to be second, and then followed by a message 3 as the final intended message in the message sequence. The message stream 1401 also includes a second message group sequence that includes a message A that is intended to be first, followed by a message B that is intended to be second, followed by a message C that is intended to be last.

FIG. 19B shows the architecture of a resequencer 1402 that receives the message stream 1440 and which processes the messages in the message stream for delivery to message consumers 1450 and 1452. Assume that the group of diamond messages (A, B, C) is to be delivered to message consumer 1450 and the group of square messages (1, 2, 3) is to be delivered to message consumer 1452.

The incoming messages from message stream 1440 are received by the resequencer 1402 and are stored into a message store 1408. A group status table 1412 stores status information for the different groups of messages corresponding to the different substreams undergoing processing by the resequencer 1402. A message map table 1410 contains information about the messages received by the resequencer 1402, e.g., the messages received and stored in the message store 1408. Threads may be used by the resequencer 1302 to perform processing work. Worker threads 1404 are used to perform the actual work of analyzing and sequencing messages. Lock threads 1402 are used to handle locking of resources to avoid inconsistent access or changes to data.

FIG. 19C shows the first message being received by the resequencer 1402 from the incoming message stream 1440. In particular, diamond message C is the first message received by the resequencer 1402.

FIG. 19D shows the effects upon the structures within the resequencer 1402 after receipt of diamond message C. A copy of the message C is stored into the message store 1408. According to some embodiments, the message store 1408 is a database table in which messages are stored as entries within unstructured (e.g., LOB) or structured columns. Alternatively, the message store 1408 can include partitioned areas to separately store messages for different groups apart from other groups. In any case, the message C is stored in an area that includes a location 1430 for the diamond messages.

Because this is the first message for the group (i.e., diamond group) associated with message C, a new entry is created in the group status table 1412 for this group. In particular, entry 1413 is created in the group status table that includes status information about this group. Such status information includes, for example, information about the last message that was sent for the group such as sequence identifier information and timestamp information. Here, no previous message has been sent for the group. Therefore, entry 1413 in the group status table 1412 will not include information for any prior message deliveries.

The message map table 1410 will be modified to include a new entry 1461 for the receipt of message C. Information that could be stored for message C in the message map table 1410 includes, for example, the group identifier and sequence identifier for message C. In this case, the group identifier for message C is the fact that message C is part of the diamond group. The sequence identifier for this message identifies message C as the third message in a sequence of messages A-B-C.

Turning to FIG. 19E, this figure shows the next message being received by the resequencer 1402 from the incoming message stream 1440. In particular, square message 3 is the next message to be received by the resequencer 1402.

FIG. 19F shows the effects upon the structures within the resequencer 1402 after receipt of square message 3. A copy of the message 3 is stored as a new entry into the message store 1408. The message 3 is stored in an area that includes a location 1432 for the messages that are part of the square group.

Because this is the first message for the square group of messages, a new entry is created in the group status table 1412 for this group. In particular, entry 1415 is created in the group status table that includes status information about this group. As before, such status information could include information about the last message that was sent for the group such as sequence identifier information and timestamp information. Since no previous message has been sent for the group, entry 1415 in the group status table 1412 will not include information for any prior message deliveries for the group.

The message map table 1410 will be modified to include a new entry 1463 for the receipt of message 3. Information that could be stored for message 3 in the message map table 1410 includes, for example, the group identifier and sequence identifier for message 3. Here, the group identifier for message 3 is the identifier that indicates that message 3 is part of the square group. The sequence identifier for this message identifies message 3 as the third message in a sequence of messages 1-2-3.

FIG. 19G shows the next message being received by the resequencer 1402 from the incoming message stream 1440. Specifically, diamond message A is the next message to be received by the resequencer 1402.

FIG. 19H shows the effects upon the structures within the resequencer 1402 after receipt of diamond message A. A copy of the message A is stored as a new entry into the message store 1408. The message A is stored into location 1430 that already includes the previous message C from the same group.

Since message A is not the first message from its group that was received at the resequencer 1402, a new entry is not created in the group status table 1412 for this group. Instead, to the extent receipt of message A changes the status for this group, the previous entry 1413 for this group in the group status table 1412 is modified to include the updates status.

The message map table 1410 will be modified to include a new entry 1465 for the receipt of message A. As before, the group identifier and sequence identifier for message A is stored in the new entry 1465 in the message map table 1410. The group identifier for message A is the identifier that indicates that message A is part of the diamond group. The sequence identifier for this message identifies message A as the first message in a sequence of messages A-B-C.

At this point, the resequencer can identify message A as being the first message in its group sequence. Therefore, as shown in FIG. 19I, message A can be delivered by the resequencer 1402 to the downstream message consumer 1450. The entry 1413 for message A's group in the group status table 1412 is updated to reflect message A as the last delivered message for the group.

If batch processing is being employed, then it is possible that message A will not be immediately delivered to message consumer 1450. Instead, there may be a delay period in which an attempt is made to collect a set of messages to process together as a group such that message A is sent to message consumer 1450 as part of a group of delivered messages.

FIG. 19J shows the next message being received by the resequencer 1402 from the incoming message stream 1440. Here, square message 1 is the next message to be received by the resequencer 1402.

FIG. 19K shows the effects upon the structures within the resequencer 1402 after receipt of square message 1. A copy of the message 1 is stored as a new entry into the message store 1408. The new message 1 is stored into location 1432 that already includes the previous message 3 from the same group.

Since message 1 is not the first message from its group that was received at the resequencer 1402, a new entry is not created in the group status table 1412 for this square group. Instead, to the extent receipt of message 1 changes the status for this group, the previous entry 1415 for this group in the group status table 1412 is modified to include the updated status.

The message map table 1410 will be modified to include a new entry 1467 for the receipt of message 1. The group identifier and sequence identifier for message 1 is stored in the new entry 1467 in the message map table 1410. The group identifier for message 1 is the identifier that indicates that message 1 is part of the square group. The sequence identifier for this message identifies message 1 as the first message in a sequence of messages 1-2-3.

The resequencer 1402 can now identify message 1 as being the first message in its group sequence. Therefore, as shown in FIG. 19L, message 1 can be immediately delivered by the resequencer 1402 to the downstream message consumer 1452. The entry 1415 for message 1's group in the group status table 1412 is updated to reflect that message 1 is the last delivered message for the group. If batch processing is being employed, then it is possible that message 1 will not be immediately delivered to message consumer 1452, where instead, there is a delay period in which an attempt is made to collect a set of messages to process together as a group such that message 1 is sent as part of a group of delivered messages.

FIG. 19M shows the next message being received by the resequencer 1402 from the incoming message stream 1440. Diamond message B is the next message to be received by the resequencer 1402.

FIG. 19N shows the effects upon the structures within the resequencer 1402 after receipt of diamond message B. A copy of the message B is stored as a new entry into the message store 1408. The message B is stored into location 1430 that already includes the previous messages A and C from the same group.

Since message B is not the first message from its group that was received at the resequencer 1402, a new entry is not created in the group status table 1412 for this group. At this point, the entry 1413 for the group includes information about message A being the last message from the group that was delivered to the downstream message consumer 1450. However, to the extent receipt of message B changes the status for the group, the previous entry 1413 for this group in the group status table 1412 is modified to include the updated status.

The message map table 1410 will be modified to include a new entry 1469 for the receipt of message B. As before, the group identifier and sequence identifier for message B is stored in the new entry 1469 in the message map table 1410. The group identifier for message B is the identifier that indicates that message B is part of the diamond group. The sequence identifier for this message identifies message B as the second message in a sequence of messages A-B-C.

At this point, the resequencer can identify message B as being the next message in its group sequence for delivery, since message A has already been delivered to message consumer 1450. If batch processing is being employed, then it is can be seen that message B and message C are the next two messages in sequence for delivery for the group. Therefore, both messages can be delivered at this point to the downstream consumer 1450.

FIG. 19O shows delivery of message B to the downstream message consumer 1450. The entry 1413 for message B's group in the group status table 1412 is updated to reflect message B as the latest message in the group sequence A-B-C to be delivered for the group. If batch processing is being performed to deliver both messages B and C at the same time, then it is possible that entry 1413 is updated in batch mode such that only the information for the last delivered message in the batch (i.e., message C) is inserted into the entry 1413.

FIG. 19P shows delivery of message C to the downstream message consumer 1450. The entry 1413 for message C's group in the group status table 1412 is updated to reflect message C as the last message in the group sequence A-B-C to be delivered for the group.

FIG. 19Q shows the next message being received by the resequencer 1402 from the incoming message stream 1440. Square message 2 is the next message to be received by the resequencer 1402.

FIG. 19R shows the effects upon the structures within the resequencer 1402 after receipt of square message 2. A copy of the message 2 is stored as a new entry into the message store 1408. The message 2 is stored into location 1432 that already includes the previous messages 1 and 3 from the same group.

Since message 2 is not the first message from its group that was received at the resequencer 1402, a new entry is not created in the group status table 1412 for this group. At this point, the entry 1415 for the group includes information about message 1 being the last message from the group that was delivered to the downstream message consumer 1452. However, to the extent receipt of message 2 changes the status for the group, the previous entry 1415 for this group in the group status table 1412 is modified to include the updated status.

The message map table 1410 will be modified to include a new entry 1471 for the receipt of message 2. The group identifier and sequence identifier for message 2 is stored in the new entry 1471 in the message map table 1410. The group identifier for message 2 is the identifier that indicates that message 2 is part of the square group. The sequence identifier for this message identifies message 2 as the second message in a sequence of messages 1-2-3.

At this point, the resequencer can identify message 2 as being the next message in its group sequence for delivery, since message 1 has already been delivered to message consumer 1452. If batch processing is being employed, then messages 2 and 3 are the next two messages in sequence 1-2-3 for delivery for the square group to message consumer 1452. Therefore, both messages 2 and 3 can be delivered at this point to the downstream consumer 1452.

FIG. 19S shows delivery of message 2 to the downstream message consumer 1452. The entry 1415 for message 2's group in the group status table 1412 is updated to reflect message 2 as the latest message in the group sequence 1-2-3 to be delivered for the group. If batch processing is being performed to deliver both messages 2 and 3 at the same time, then it is possible that entry 1415 can be updated in batch mode so that only the information for the last delivered message in the batch (i.e., message 3) is inserted into the entry 1415.

FIG. 19T shows delivery of message 3 to the downstream message consumer 1452. The entry 1415 for message 3's group in the group status table 1412 is updated to reflect message 3 as the last message in the group sequence 1-2-3 to be delivered for the group.

FIG. 19U shows the final status of the strictures for the resequencer 1402 after delivery of the messages A, B, and C to message consumer 1450 and messages 1, 2, and 3 to message consumer 1452. Cleanup can also be performed to remove out-dated messages from the message store 1408 and outdated message information from the message map table 1410.

It is possible that errors may occur during the process of delivering messages to message consumers. To explain, consider a sequence of messages 1-2-3-4-5, where the process of delivering this sequence of messages to a downstream message consumer has already begun when an error occurs. For example, messages 1 and 2 may have already been delivered when the error occurs, such that message 3 does not get delivered.

According to one approach, when the processing of a message in a message stream generates an error, the processing of the subsequent messages in the stream is not stopped. However, this is problematic since the processing of the subsequent messages is typically not useful unless the cause of the error has been analyzed and resolved. When an error occurs, blocking the entire stream may severely impact the messaging performance and the performance of the applications using the messaging solution.

According to some embodiments of the invention, an improved approach is described for handling an error when the processing of a message in a message stream fails. When the processing of a message in the stream generates an error, the processing of related messages in the stream is blocked. For example, the related messages could constitute a substream. Corrective actions can then be taken to address the problem.

Embodiments of the invention are specifically described below with respect to messages handled by a resequencer. It is noted, however, that the inventive concept may be applied to any messaging system and is not limited in its application to resequencers. Indeed, the inventive concepts may be generally applied to any integration domain.

FIG. 20 shows a flow of a process for performing this type of error handling according to an embodiment of the invention. At 3202, an incoming message stream is sub-divided into multiple substreams. Group identifiers are used to sub-divide the messages into different groupings or substreams of messages. An XPath expression may be defined to be applied on the message payload to obtain a group identifier. Alternatively the user may pass a group identifier as a part of the meta-data associated with the message. All the messages with the same group identifier belong to the same group.

At 3204, a determination is made regarding whether an error is detected during the delivery of a message. Any type of error or failure that interrupts message delivery may be the subject of this process. Examples of such errors/failures include the failure or crash of a downstream computing system, server failure, corruption of one or more messages, or failure of a routing service for delivery. If no error is detected, then the messages will continue to be processed (3218).

When an error is identified, then at 3206, identification is made of the specific message substream which is associated with the error. This can be accomplished by performing a lookup of the group identifier for the message that is related to the error or failure.

Thereafter, at 3208, a hold is placed on further deliveries of messages for the identified substream. Essentially, no further messages for the identified substream would be immediately delivered to downstream consumers involved in the error or failure.

However, messages for the unaffected substreams will still be delivered to their respective message consumers (3210). This maintains a high level of efficiency for the system to continue delivering messages, even if an error is detected, since the messages for non-error related substreams are being delivered.

Error handling is performed at 3212 to address the error or failure. According to some embodiments, a user interface can be provided that lists the failed messages and allows the user to retry delivery of the message after correcting the underlying problems of the failure. In the user interface embodiment, the user can see the message that generated the error and the error details, can take corrective actions to address those errors. If the error has been adequately corrected (3214), then the user and then restart the processing of the messages in the sub-stream (3216).

According to one embodiment, dynamic rules may be implemented to handle error conditions. For example, the dynamic rule may check to see if the error occurs to a first stream. If so, then a first sequence of actions is performed. If the error occurs to a second stream, then a second sequence of actions is performed.

Figure 21A:
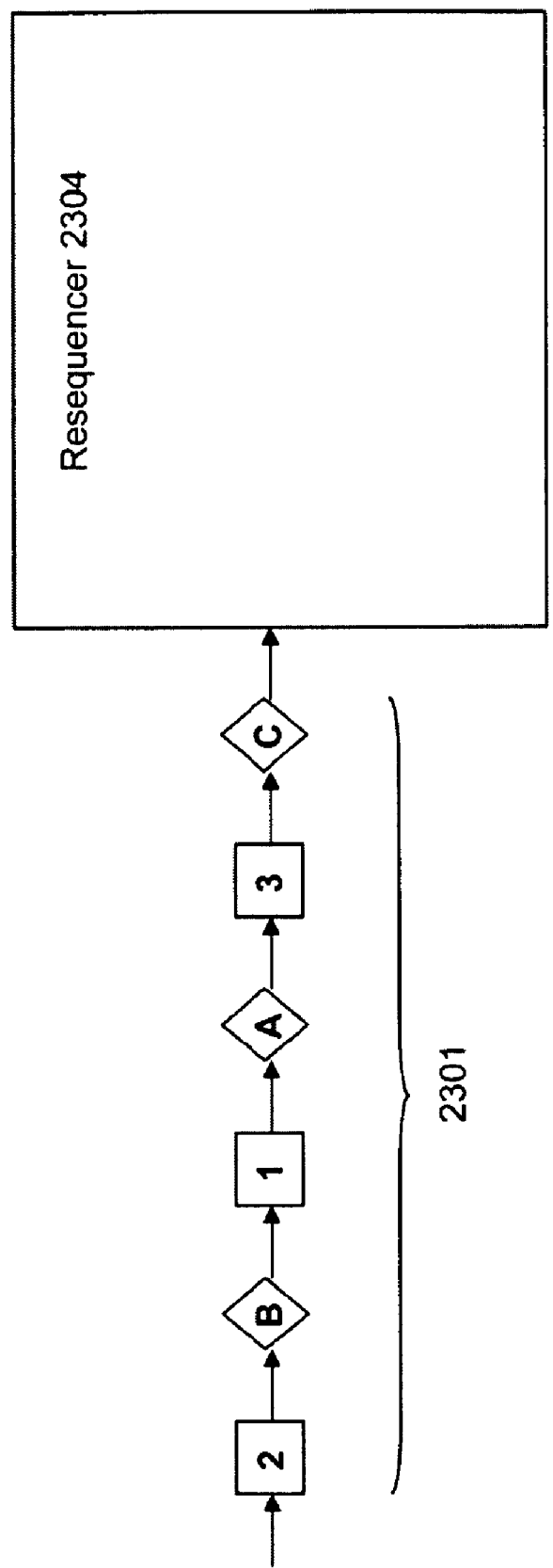

FIG. 21A provides an illustrative example of how this process can be applied to perform error handling for a sequence of messages in a resequencer 2304. This figure shows an example sequence of messages that may be received in a message stream 2301 by a resequencer 2304. The message stream 2301 includes multiple groups of messages that may have been received from a message producer. For example, the message stream 2301 is intended to be in two separate ordered group sequences, where first message sequence includes a message 1 that is intended to be first, followed by a message 2 that is intended to be second, and then followed by a message 3 as the final intended message in the message sequence. The message stream 2301 also includes a second message group sequence that includes a message A that is intended to be first, followed by a message B that is intended to be second, followed by a message C that is intended to be last.

Figure 21B:
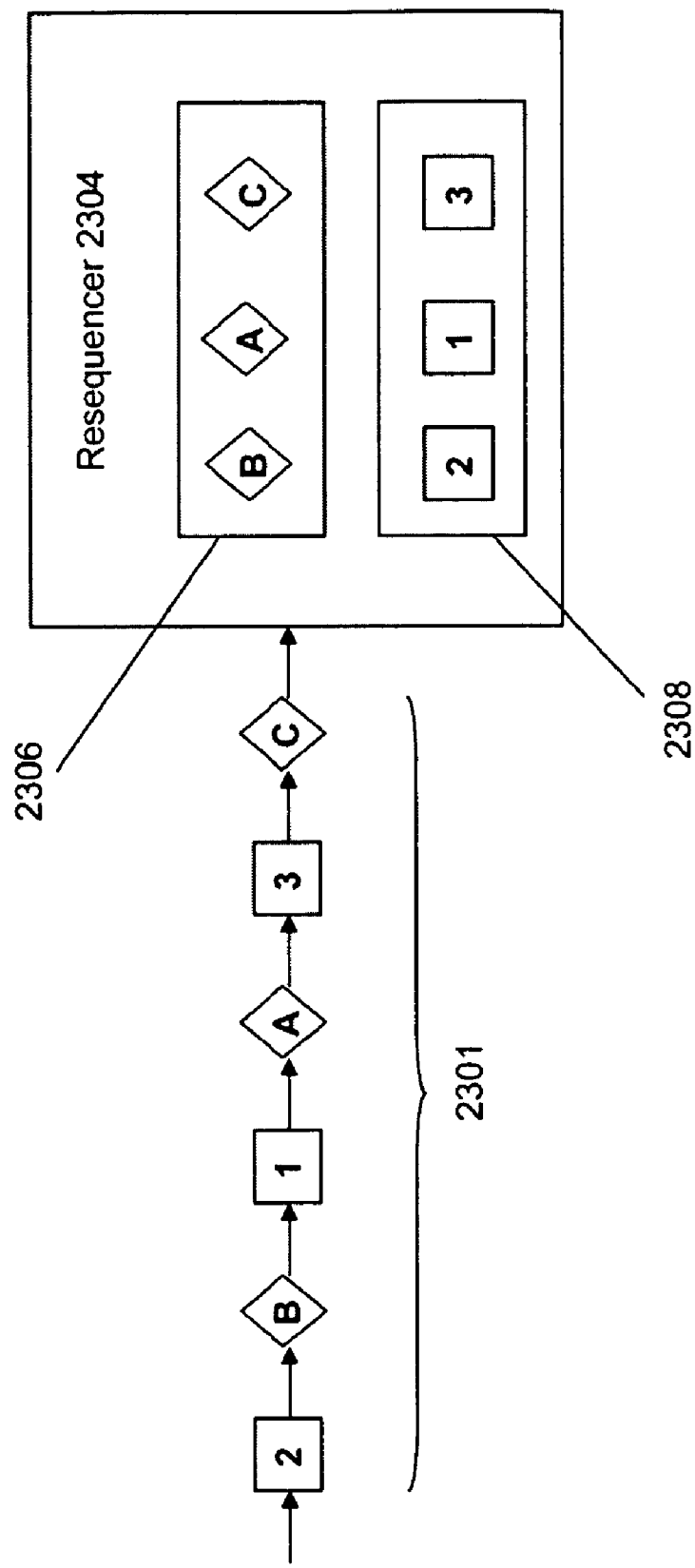

FIG. 21B shows the message stream 2301 after it has been received by the resequencer 2304, and in which the message stream 2301 has been sub-divided into two substreams 2306 and 2308. Message substream 2306 corresponds to a first group of messages containing messages A, B, and C. Message substream 2308 corresponds to a second group of messages containing messages 1, 2, and 3.

Figure 21C:
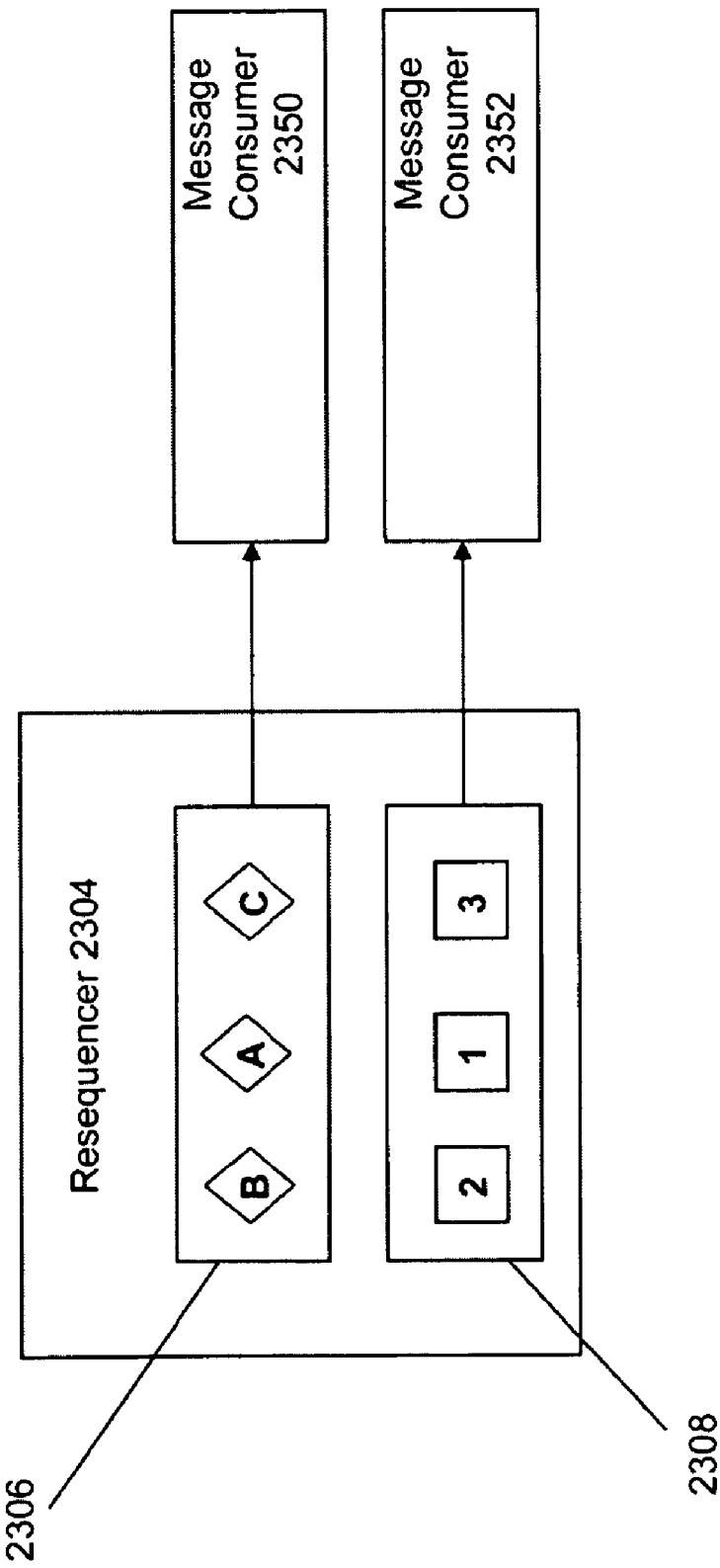

Assume that it is desired to deliver the messages in these message substreams 2306 and 2308 to downstream message consumers 2350 and 2352, as shown in FIG. 21C. In particular, the messages in message substream 2306 are to be delivered to message consumer 2350 and the messages in message substream 2352 are to be delivered to message consumer 2352.

Figure 21D:
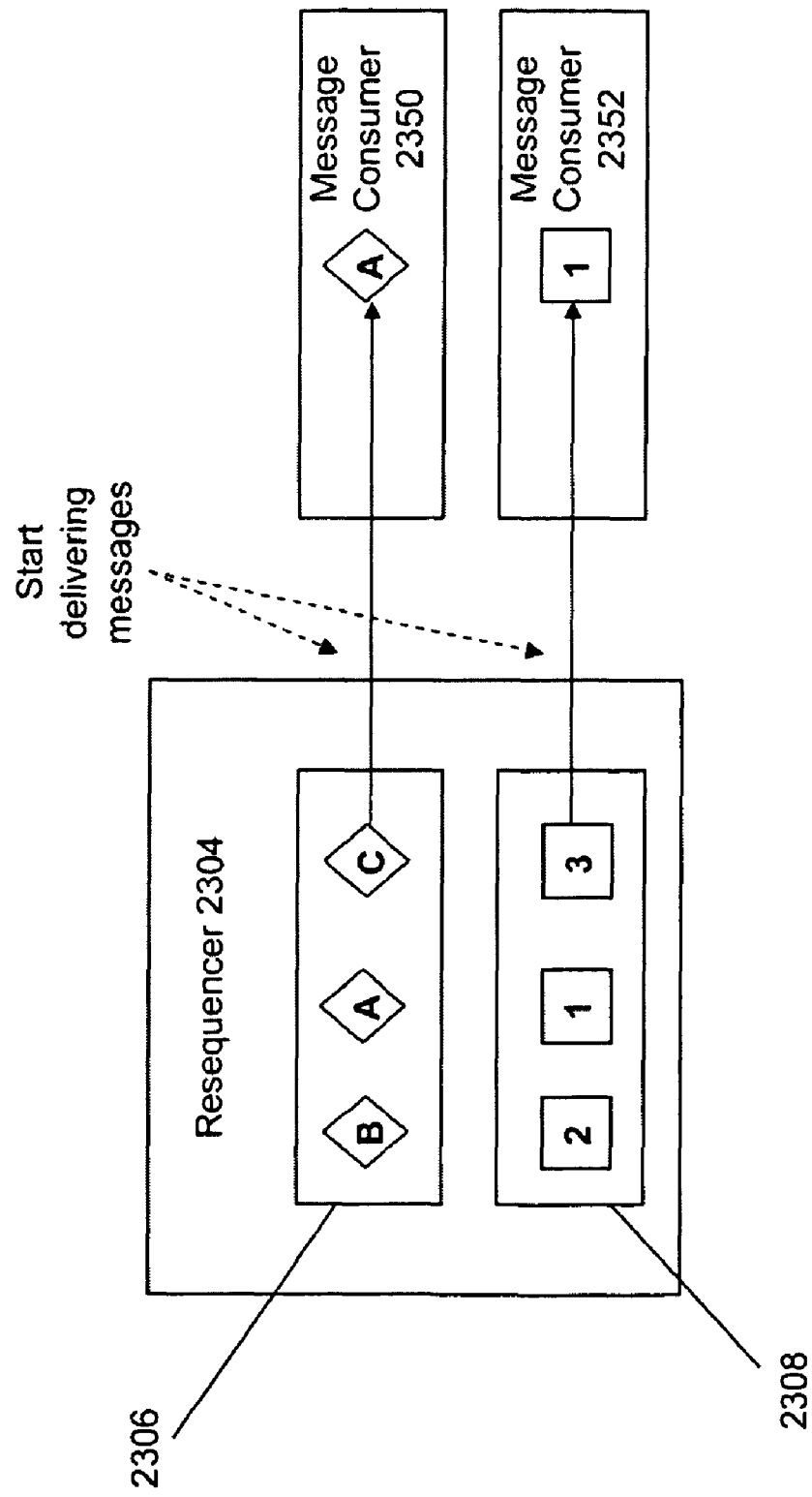

FIG. 21D shows the messages in the message substreams 2306 and 2308 beginning to be delivered to downstream message consumers 2350 and 2352. Here, message A from message substream 2306 has already been delivered to message consumer 2350. In addition, message 1 from message substream 2308 has already been delivered to message consumer 2352.

Figure 21E:
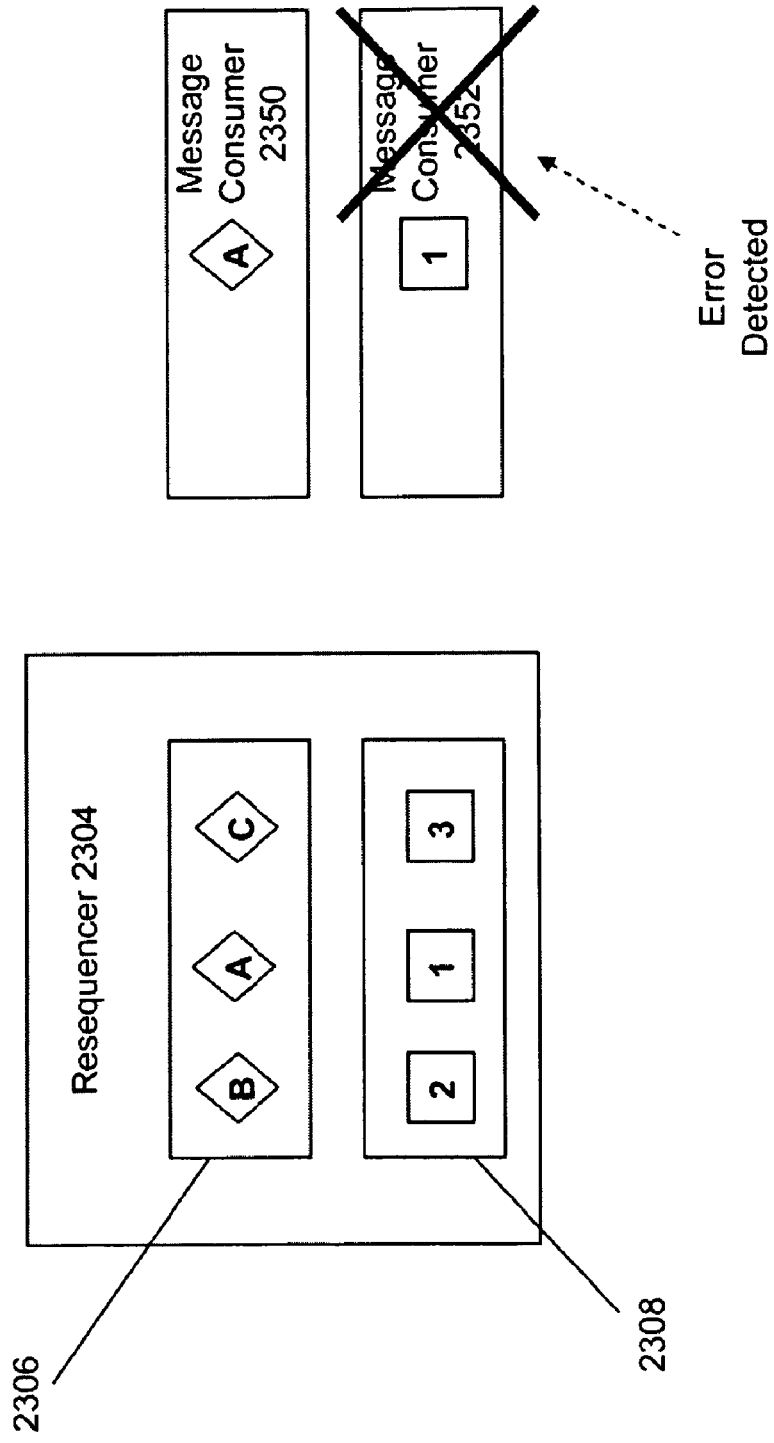

One possible type of error that may occur is the failure of a downstream message consumer. This type of error is illustrated in FIG. 21E, in which message consumer 2352 has undergone some type of failure such that it will not be able to receive any further messages from the resequencer 2304. The error may be detected, for example, based upon failure of delivery of the next message intended for message consumer 2352 (i.e., message 2).

Figure 21F:
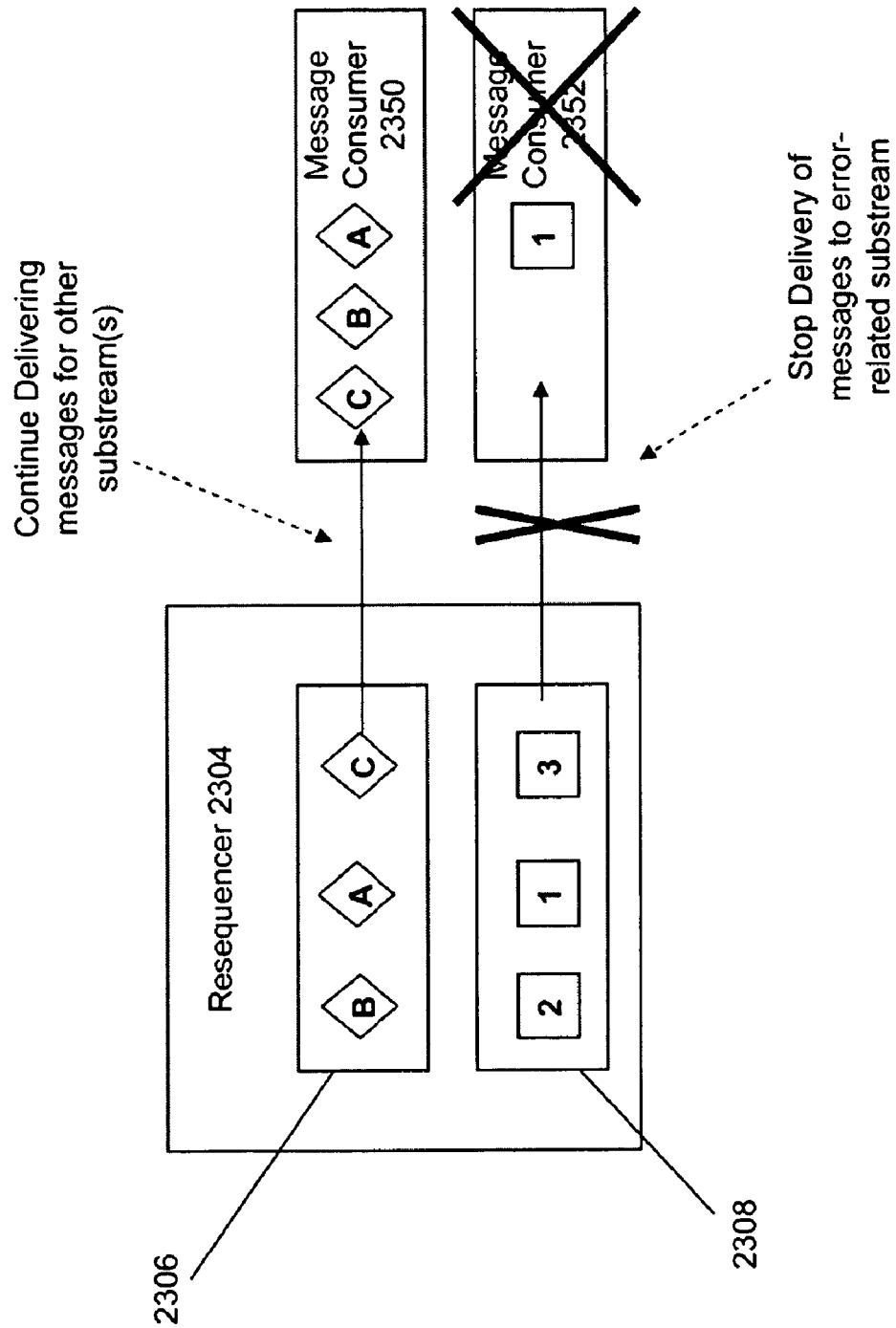

Upon recognition of the error condition, further messages will not be delivered for the substream associated with the failure or error. In this situation, the error is associated with delivery of messages in substream 2308. Therefore, as shown in FIG. 21F, messages from that message substream 2308 will be blocked from further deliveries in the direction of message consumer 2352.

However, messages will still be delivered for other substreams not affected by the error or failure. In the present situation, delivery of messages for message substream 2306 is not affected by the failure of message consumer 2352.

Therefore, messages B and C in message substream 2306 will be delivered to their respective message consumer 2350.

Figure 21G:
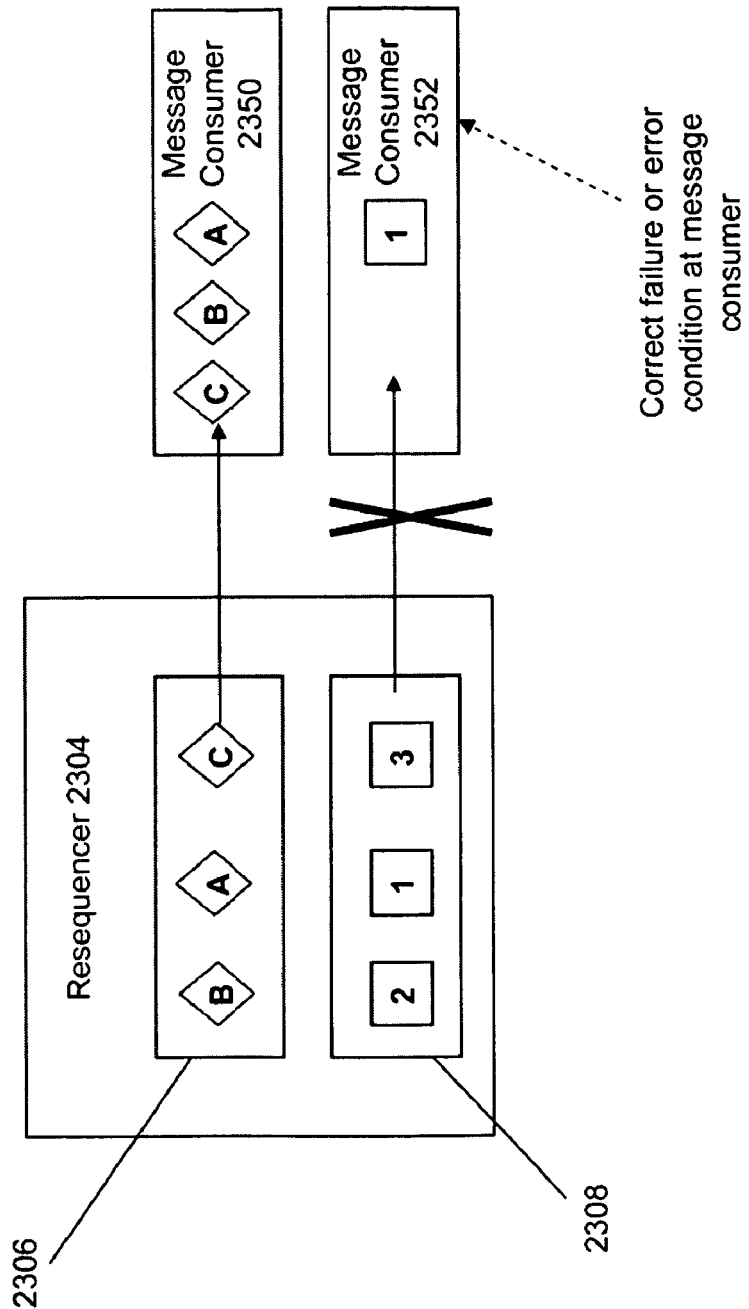
Figure 21H:
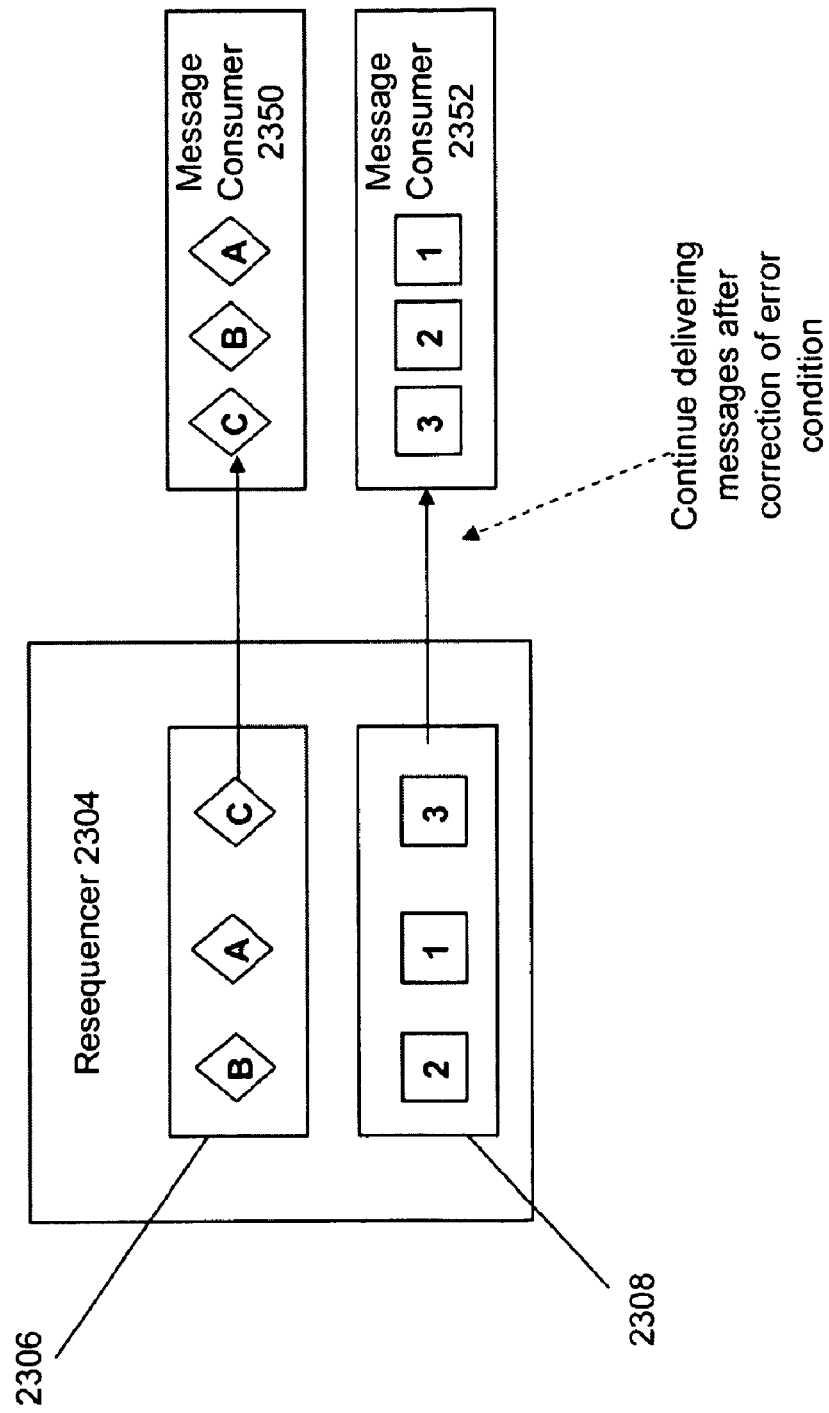

FIG. 21G illustrates that some type of corrective action may be performed to try and correct the error or failure condition. In the present example, corrective actions may be taken to restore message consumer 2352 to an operative state that is capable of receiving messages again. Thereafter, as shown in FIG. 21H, the flow of messages for the affected message substream 2308 may restart with messages from the substream 2308 being delivered to message consumer 2352.

Therefore, what has been described is a significantly improved approach for handling errors and failures related to message delivery. The failure of a message in the stream would typically mean that the subsequent related messages in the stream would also fail. After resolving the cause of the error the user will have to handle all the failed messages in the stream. Instead, with the present approach, the number of failed messages that the user has to handle is significantly reduced.

The above description has provided the details of approaches for implementing an improved resequencer, along with related mechanisms and processes. For example, a process and mechanism was described for specifying sequence information for a set of messages. An improved error handling method and system for messages is also described.

The present invention(s) may be employed in any suitable computing architecture. For example, the inventions may be applied to facilitate message delivery for systems that employ middleware or ones that implement an enterprise service bus. While examples of the inventions were described relative to resequencers, it is noted that inventions should not be limited to resequencers unless claimed as such.

System Architecture Overview

FIG. 22 is a block diagram of an illustrative computing system 2400 suitable for implementing an embodiment of the present invention. Computer system 2400 includes a bus 2406 or other communication mechanism for communicating information, which interconnects subsystems and devices, such as processor 2407, system memory 2408 (e.g., RAM), static storage device 2409 (e.g., ROM), disk drive 2410 (e.g., magnetic or optical), communication interface 2414 (e.g., modem or Ethernet card), display 2411 (e.g., CRT or LCD), input device 2412 (e.g., keyboard), and cursor control.

According to one embodiment of the invention, computer system 2400 performs specific operations by processor 2407 executing one or more sequences of one or more instructions contained in system memory 2408. Such instructions may be read into system memory 2408 from another computer readable/usable medium, such as static storage device 2409 or disk drive 2410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 2407 for execution. Such a medium may take many forms, including but not limited to, non-volatile media and volatile media. Non-volatile media includes, for example, optical or magnetic disks, such as disk drive 2410. Volatile media includes dynamic memory, such as system memory 2408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 2400. According to other embodiments of the invention, two or more computer systems 2400 coupled by communication link 2415 (e.g., LAN, PTSN, or wireless network) may perform the sequence of instructions required to practice the invention in coordination with one another.

Computer system 2400 may transmit and receive messages, data, and instructions, including program, i.e., application code, through communication link 2415 and communication interface 2414. Received program code may be executed by processor 2407 as it is received, and/or stored in disk drive 2410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer implemented method for handling errors related to messages in a computing system, comprising:
   using at least one processor that is programmed or configured for performing a process, the process comprising:
   dividing a stream of messages into a first substream for a first destination and a second substream for a second destination;
   determining whether an error for delivery or an error associated with delivery of a message from the first substream is detected before delivery of the message;
   holding further delivery of messages from the first substream to the first destination if the error for delivery or the error associated with delivery of the message from the first substream is detected such that the first destination no longer receives the delivery of messages until a condition is satisfied; and
   continuing to deliver messages for the second substream even after holding further delivery of the messages for the first substream.

2. The computer implemented method of claim 1, further comprising performing error handling to correct the error.

3. The computer implemented method of claim 2, in which delivery of the messages from the first substream is re-started after the error is corrected.

4. The computer implemented method of claim 1, in which the first substream and the second substream are sequenced and delivered by a resequencer.

5. The computer implemented method of claim 1, in which the error comprises machine failure, routing failure, or message corruption.

6. The computer implemented method of claim 1, in which the stream of messages are divided into the first substream and the second substream based at least in part upon group identifier information, wherein the message comprises a message payload and a message header, and the group information is located in the message payload.

7. The computer implemented method of claim 6, in which the group information is stored as one or more fields in the message payload.

8. The computer implemented method of claim 6, in which the group information is stored as a node or field in an XML document, wherein the node or field is accessible with an or XQuery expression.

9. A computer program product that includes a non-transitory computer readable storage medium, the non-transitory computer readable storage medium having stored thereupon a plurality of computer instructions which, when executed by at least one processor, cause the at least one processor to execute a process for handling errors related to messages in a computing system, the process comprising:
dividing a stream of messages into a first substream for a first destination and a second substream for a second destination;
determining whether an error for delivery or an error associated with delivery of a message from the first substream is detected before delivery of the message;
holding further delivery of messages from the first substream to the first destination if the error associated with delivery of the message from the first substream is detected such that the first destination no longer receives the delivery of messages until a condition is satisfied; and
continuing to deliver the messages for the second sub stream even after holding further delivery of the messages for the first substream.

10. The computer program product of claim 9, the process further comprising performing error handling to correct the error.

11. The computer program product of claim 10 in which delivery of the messages from the first substream is re-started after the error is corrected.

12. The computer program product of claim 9 in which the first substream and the second substream are sequenced and delivered by a resequencer.

13. The computer program product of claim 9 in which the error comprises machine failure, routing failure, or message corruption.

14. The computer program product of claim 9 in which the stream of messages are divided into the first substream and the second substream based upon group identifier information, wherein the message comprises a message payload and a message header and the group information is located in the message payload.

15. The computer program product of claim 14 in which the group information is stored as one or more fields in the message payload.

16. The computer program product of claim 14 in which the group information is stored as a node or field in an XML document, wherein the node or field is accessible with an XPath or XQuery expression.

17. A system for handling errors related to messages in a computing system, comprising:
a processor;
a memory for holding programmable code; and
wherein the programmable code includes instructions executable by the processor for:
dividing a stream of messages into a first substream for a first destination and a second substream for a second destination;
determining whether an error for delivery or an error associated with delivery of a message from the first substream is detected before delivery of the message;
holding further delivery of messages from the first substream to the first destination if the error associated with delivery of the message from the first substream is detected; and
continuing to deliver the messages for the second substream even after holding further delivery of the messages for the first substream.

18. The system of claim 17, the process further comprising performing error handling to correct the error.

19. The system of claim 18 in which delivery of the messages from the first substream is re-started after the error is corrected.

20. The system of claim 17 in which the first substream and the second substream are sequenced and delivered by a resequencer.

21. The system of claim 17 in which the error comprises machine failure, routing failure, or message corruption.

22. The system of claim 17 in which the stream of messages are divided into the first substream and the second substream based upon group identifier information, wherein the message comprises a message payload and a message header and the group information is located in the message payload.

23. The system of claim 22 in which the group information is stored as one or more fields in the message payload.

24. The system of claim 22 in which the group information is stored as a node or field in an XML document, wherein the node or field is accessible with an XPath or XQuery expression.

* * * * *

UNITED STATES PATENT AND TRADEMARK OFFICE
CERTIFICATE OF CORRECTION

| | | |
|---|---|---|
| PATENT NO. | : 8,254,391 B2 | Page 1 of 1 |
| APPLICATION NO. | : 12/418583 | |
| DATED | : August 28, 2012 | |
| INVENTOR(S) | : Singh et al. | |

It is certified that error appears in the above-identified patent and that said Letters Patent is hereby corrected as shown below:

In column 4, line 19, delete "them" and insert -- then --, therefor.

In column 5, line 36, delete "sub stream" and insert -- substream --, therefor.

In column 7, line 26, delete "die" and insert -- the --, therefor.

In column 10, line 11, delete "deliver" and insert -- delivery --, therefor.

In column 17, line 30, delete "Out" and insert -- out --, therefor.

In column 22, line 57, delete "strictures" and insert -- structures --, therefor.

In column 27, line 9, in Claim 8, before "XQuery" delete "or".

In column 27, line 24, in Claim 9, after "error" insert -- for delivery or the error --.

In column 27, line 30-31, in Claim 9, delete "sub stream" and insert -- substream --, therefor.

Signed and Sealed this
Twelfth Day of February, 2013

Teresa Stanek Rea
*Acting Director of the United States Patent and Trademark Office*